US010869575B2

(12) United States Patent
He

(10) Patent No.: US 10,869,575 B2
(45) Date of Patent: Dec. 22, 2020

(54) AUTOMATIC COOKING SYSTEM

(71) Applicant: Zhengxu He, Reno, NV (US)

(72) Inventor: Zhengxu He, Reno, NV (US)

(*) Notice: Subject to any disclaimer, the term of this patent is extended or adjusted under 35 U.S.C. 154(b) by 181 days.

(21) Appl. No.: 16/155,895

(22) Filed: Oct. 10, 2018

(65) Prior Publication Data
US 2019/0038071 A1 Feb. 7, 2019

Related U.S. Application Data

(63) Continuation-in-part of application No. 15/839,600, filed on Dec. 12, 2017, which is a continuation-in-part of application No. 15/924,749, filed on Mar. 19, 2018.

(60) Provisional application No. 62/480,334, filed on Mar. 31, 2017.

(51) Int. Cl.
| | |
|---|---|
| *A47J 43/04* | (2006.01) |
| *A47J 43/07* | (2006.01) |
| *A47J 36/16* | (2006.01) |
| *A47J 36/34* | (2006.01) |
| *A47J 44/00* | (2006.01) |
| *A47J 37/10* | (2006.01) |
| *A47J 37/12* | (2006.01) |

(52) U.S. Cl.
CPC ............ *A47J 36/165* (2013.01); *A47J 36/34* (2013.01); *A47J 37/101* (2013.01); *A47J 37/108* (2013.01); *A47J 37/1266* (2013.01); *A47J 43/04* (2013.01); *A47J 44/00* (2013.01)

(58) Field of Classification Search
CPC .... A47J 27/12; A47J 36/16–165; A47J 36/34; A47J 43/04–044; A47J 2043/04409; A47J 2043/04454; A47J 43/07; A47J 44/00–02
See application file for complete search history.

(56) References Cited

U.S. PATENT DOCUMENTS

| | | | |
|---|---|---|---|
| 2004/0159244 A1* | 8/2004 | Leason | A47J 36/165 99/348 |
| 2016/0029844 A1* | 2/2016 | Pineda | A47J 43/046 366/142 |
| 2016/0128503 A1* | 5/2016 | Xu | A47J 36/2483 99/326 |
| 2019/0011019 A1* | 1/2019 | Huerta-Ochoa | A47J 43/082 |
| 2019/0329419 A1* | 10/2019 | Farid | B25J 9/02 |
| 2020/0054173 A1* | 2/2020 | Chung | F16H 1/2854 |

(Continued)

*Primary Examiner* — Michael A LaFlame, Jr.

(57) ABSTRACT

The present application discloses an automated cooking system comprising: a cooking apparatus comprising a cooking container and a stirring motion mechanism configured to produce a motion in the cooking container; ingredient containers; an dispensing apparatus to dispense the food ingredients from an ingredient container into the cooking container; a transfer apparatus to move an ingredient container; food canisters; a cooking container unloading mechanism to dispense cooked food from the cooking container to a food container; a receiving apparatus to hold a plurality of food containers; a transfer apparatus to move a food container; a cyclic transport apparatus configured to move food containers; a lid apparatus; and, a cleaning apparatus to wash or otherwise clean the cooking container after a cooked food is produced. A computer system with algorithms is configured to control these mechanisms and apparatuses.

23 Claims, 57 Drawing Sheets

(56) References Cited

U.S. PATENT DOCUMENTS

| | | | |
|---|---|---|---|
| 2020/0069109 A1* | 3/2020 | Kuo .................. | A47J 27/002 |
| 2020/0113376 A1* | 4/2020 | Lee .................. | A47J 37/047 |
| 2020/0160463 A1* | 5/2020 | He .................. | B25J 11/0045 |

* cited by examiner

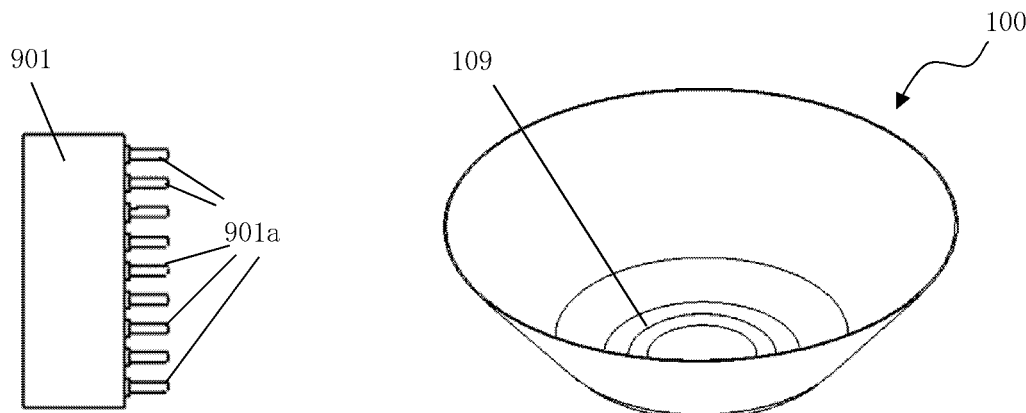
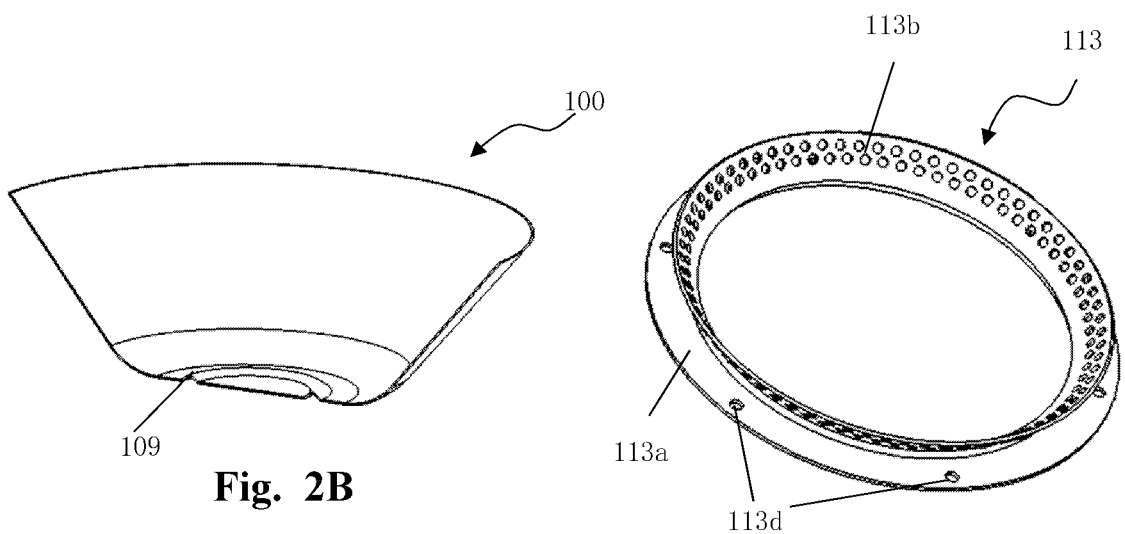
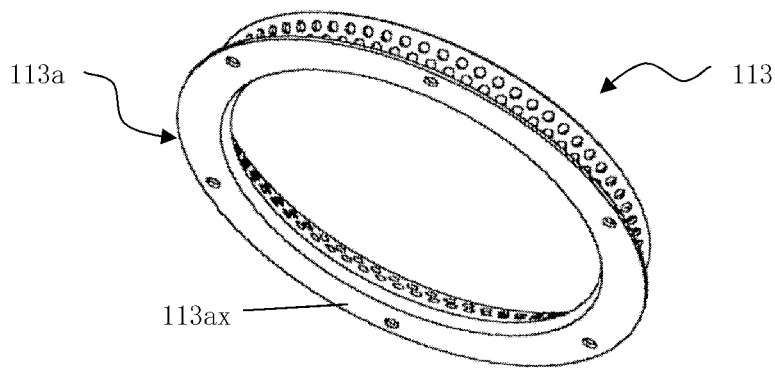

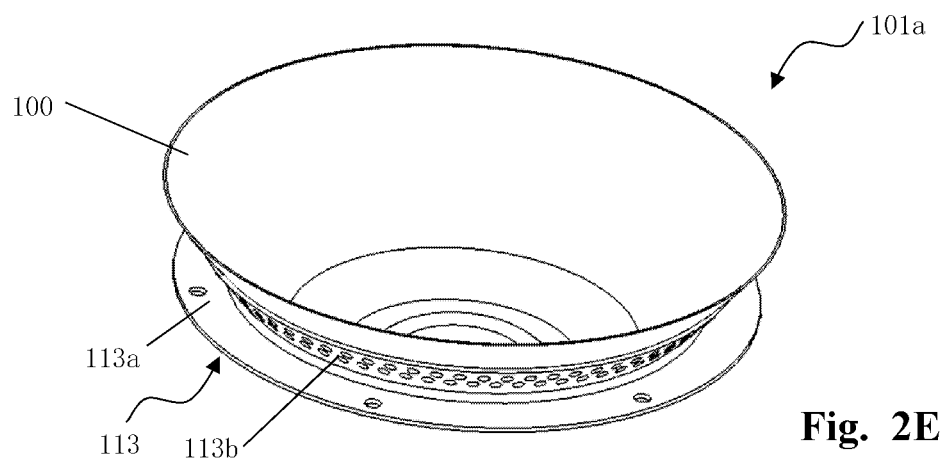
Fig. 2E
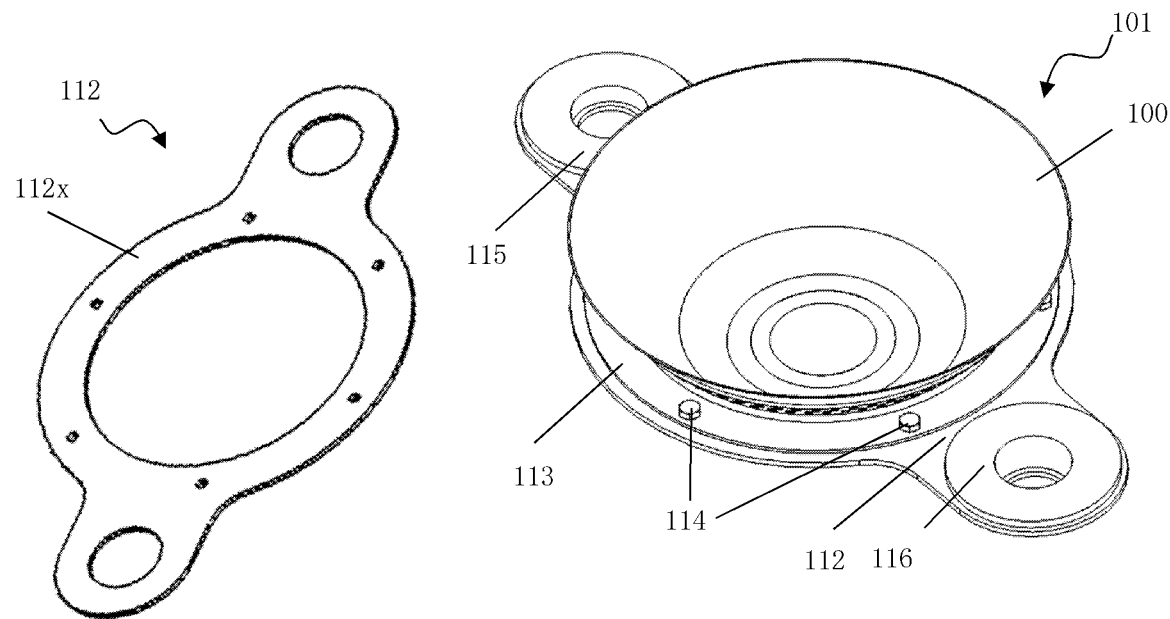
Fig. 2F
Fig. 2G
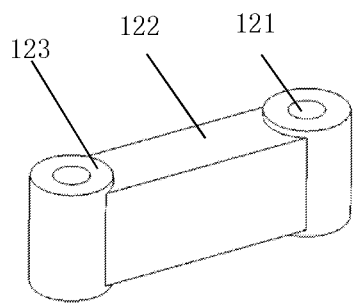
Fig. 3A

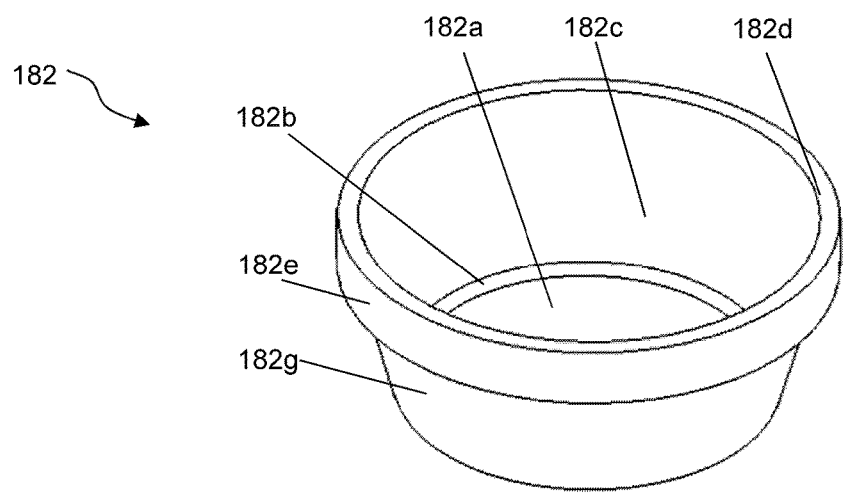
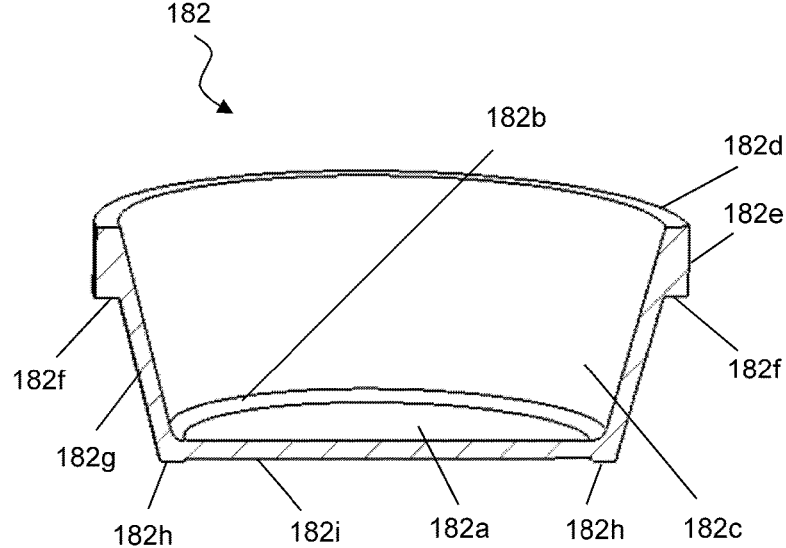
Fig. 5A
Fig. 5B
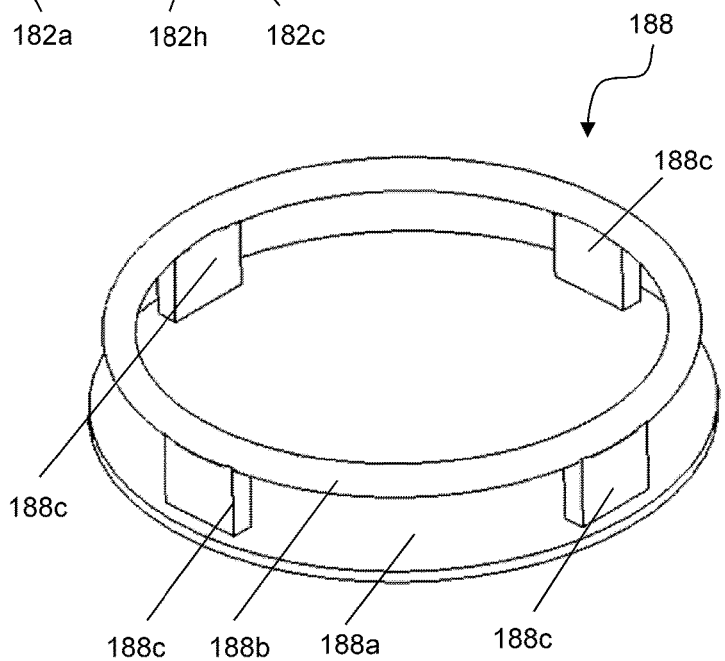
Fig. 5C

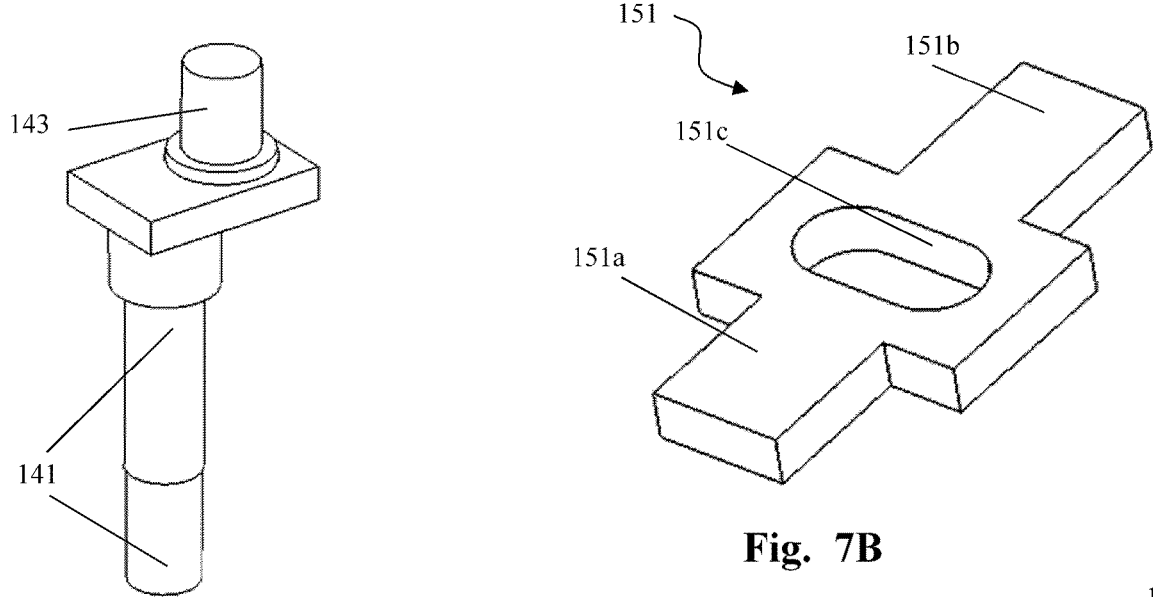
Fig. 7A
Fig. 7B
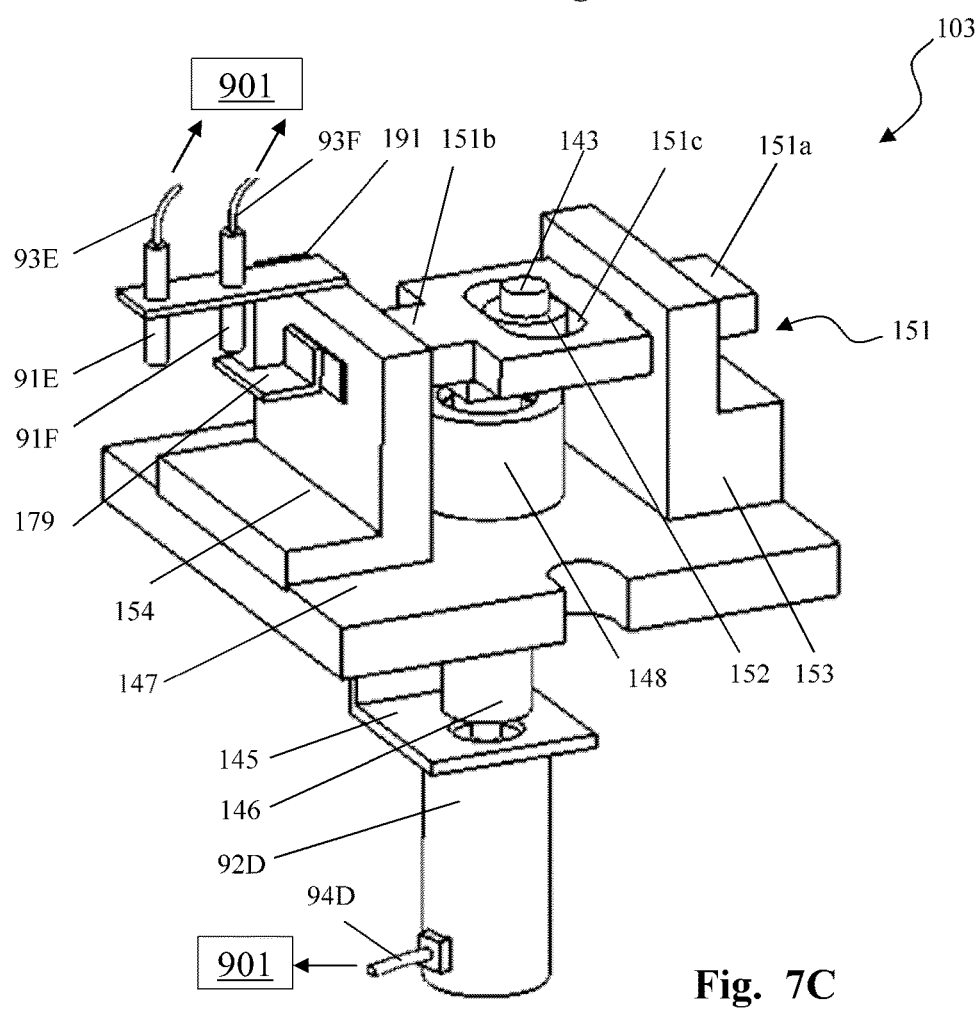
Fig. 7C

AUTOMATIC COOKING SYSTEM

This application is a continuation-in-part of the U.S. patent application Ser. No. 15/924,749 filed Mar. 19, 2018, which is a continuation-in-part of the U.S. patent application Ser. No. 15/839,600 filed Dec. 12, 2017, which claims the benefit of U.S. Provisional Application Ser. No. 62/480,334 filed Mar. 31, 2017. Entire contents of all the above applications are incorporated herein by reference.

CROSS-REFERENCE TO RELATED APPLICATIONS

U.S. Patent Applications

Ser. No. 13/770,081; Filed Feb. 19, 2013; Inventor: Zhengxu He
Ser. No. 15/157,319, Filed May 17, 2016; Inventor: Zhengxu He
Ser. No. 15/839,600; Filed Dec. 12, 2017; Inventor: Zhengxu He
Ser. No. 15/924,749; Filed Mar. 19, 2018; Inventor: Zhengxu He US Provisional Patent Application Ser. No. 62/480,334; Filed Mar. 31, 2017, Inventor: Zhengxu He

BACKGROUND OF THE INVENTION

The present application relates to an automated cooking system configured to cook a food from food ingredients.

A cooking system may comprise a cooking apparatus comprising: a cooking container configured to hold food or food ingredients for cooking; a stirring motion mechanism configured to produce a movement in the cooking container as to stir, mix or distribute the food or food ingredients held in the cooking container. The cooking system may also include a lid apparatus, a receiving apparatus which may receive a cooked food from a cooking container and a dispensing apparatus which may dispense food ingredients into a cooking container.

A cooking system may also include a food container transport apparatus which transports a food container configured to hold a cooked food to an area which is conveniently accessible by a human. The cooking system may cook specific dishes at specific times, in accordance to an order input of a computer.

BRIEF SUMMARY OF THE INVENTION

The present application discloses an automated cooking system configured to produce cooked foods from food ingredients. Implementations of our system may include one or more of the following.

Our automated cooking system may comprise a receiving apparatus comprising: a plurality of food containers, each configured to hold a cooked food; a plurality of container holders; a water passage; a cyclic transport mechanism configured to move the container holders and the water passage; a funnel; and a water spray mechanism configured to clean the funnel by spraying water or other cleaning liquid on the interior of the funnel.

Our automated cooking system may also comprise a cooking apparatus comprising a cooking container configured to hold food or food ingredients during a cooking process. The cooking apparatus may comprise a stirring motion mechanism comprising a first support component wherein the stirring motion mechanism is configured to produce a motion in the cooking container relative to the first support component, as to stir, mix or distribute the food or food ingredients in the cooking container. The motion of the cooking container produced by the stirring motion mechanism may be cyclic, oscillatory or vibratory motions, or a combination of these motions The cooking apparatus of the automated cooking system may also comprise a cooking container unloading mechanism configured to turn the cooking container upside down to dispense a cooked food from the cooking container to a food container which is positioned near to the cooking container. The automated cooking system may also comprise a transfer apparatus configured to move a food container positioned near the cooking container, to a position accessible by humans, or to a food container storage apparatus configured to store a plurality of food containers; wherein the cooked food contained in the food container, if any, may not be leaked out from the food container, during the entire time period when the food container is moved by the transfer apparatus.

The stirring motion mechanism of the cooking apparatus may comprise a first linkage mechanism and a second linkage mechanism. The first linkage mechanism may comprise: a first link; a second link; and a third link; wherein the first link is rigidly or elastically connected to the cooking container; wherein the first link and the second link are connected by bearings and accessories; wherein the second link and the third link are connected by bearings and accessories. The second linkage mechanism may comprise: a first link configured to be rigidly or elastically connected to the cooking container; a second link; and a third link; wherein the first link and the second link are connected by bearings and accessories; wherein the second link and the third link are connected by bearings and accessories. Two of the links in the first and second linkage mechanisms may each comprise a pair of shafts which are rigidly joined, wherein the axes of the shafts are configured to be coplanar (either parallel to each other or intersecting with each other).

The automated cooking system may also comprise a lid apparatus configured to limit the food or food ingredient held by the cooking container from jumping out of the cooking container, wherein the lid apparatus may also be configured to limit heat leakage or moisture leakage during a cooking process using a heater. The lid apparatus may comprise a blocking device, a motion mechanism configured to produce a relative movement between the blocking device and the said first support component. The lid apparatus also comprises a braking mechanism configured to brake or stop the movement of the blocking device relative to the first support component.

The automated cooking system may also comprise a cleaning apparatus configured to wash or otherwise clean the cooking container after a cooked food is produced.

The automated cooking system may also comprise a plurality of ingredient containers each configured to store food ingredients, and a dispensing apparatus configured to grab and move an ingredient container to dispense the food ingredients from the ingredient container into the cooking container. The automated cooking system may also comprise an ingredient container transfer apparatus configured to transport or move an ingredient container; wherein the food ingredients contained in the ingredient container, if any, may not be leaked out from the ingredient container during time periods when the ingredient container is moved by the transfer apparatus.

A dispensing apparatus may comprise: (1) a gripping mechanism comprising a support component, a pair of gripping devices, and a motion mechanism configured to produce a rotation in the gripping devices relative to the support component as to grip or release a container; (2) a motion mechanism configured to produce a rotation in the support component of gripping mechanism, wherein the axis of rotation is horizontal.

The automated cooking system may comprise a food container transport apparatus which may move a food container to an area accessible by humans. The food container transport apparatus may comprise a container holding device configured to hold food containers which are configured to hold cooked foods. A food container transport apparatus may also comprise a chain transport apparatus configured to move a plurality of container holding devices.

A cooking system may comprise a computer configured to control these mechanisms and apparatuses. The computer comprises input/output ports which are connected to the electric or electronic devices and sensors in the mechanisms and apparatuses.

BRIEF DESCRIPTION OF THE SEVERAL VIEWS OF THE DRAWINGS

FIG. 1 shows a digital computer with input and output ports.

FIG. 2A shows an aerial view of a cooking container. FIG. 2B shows a cut view of the cooking container. FIG. 2C-2D show aerial views of a connector. FIG. 2E shows an aerial view of the cooking container rigidly connecting to the connector. FIG. 2F shows an aerial view of a holder in the shape of a flat board, with round holes. FIG. 2G shows an aerial view of the cooking container and a holder which are fixedly or rigidly connected by the connector.

FIGS. 3A-3D show aerial views of parts of a cooking sub-apparatus.

FIG. 5A shows a view of a food container. FIG. 5B shows a cut view of the food container. FIG. 5C shows an aerial view of a container holder.

FIGS. 7A-7B show aerial views of some parts of a braking mechanism. FIG. 7C shows an aerial view of the braking mechanism.

DETAILED DESCRIPTION OF THE INVENTION

Figure 3B:
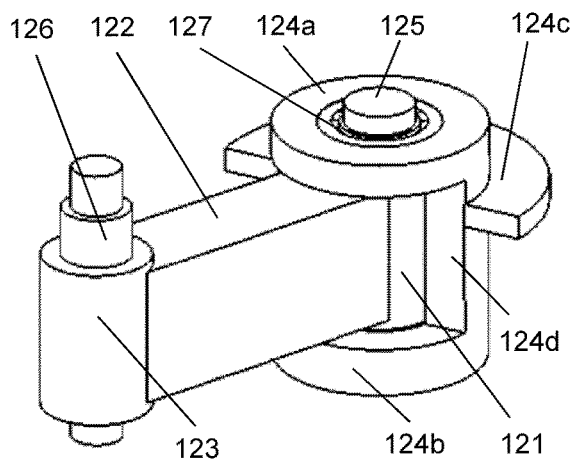

For the present patent application, a shaft always comprises an axis. A shaft can have different shapes at different sections. The shape of a cross section of a shaft can be round or rectangular, or of other shape. A bearing, except linear motion bearing, comprises an inner ring and an outer ring, and possibly other parts. One or more bearings are said to connect a shaft and a bearing housing, if the inner rings of the bearings are fixedly connected to the shaft and the outer rings of the bearings are fixedly connected to the bearing housing, so that the shaft is constrained to rotate relative to the bearing housing around the axis of the shaft. Such a connection of a shaft and a bearing housing by one or more bearings, should also include accessories; but for simplicity, we may or may not mention the accessories. It should be noted that there are many ways of installing one or more bearings connecting a shaft and a bearing housing. For example, the inner ring(s) of the bearing(s) may be fixedly connected to (and concentric with) the shaft, and the outer ring(s) of the bearing(s) may be fixedly connected to (and concentric with) the bearing housing. A bearing may be a ball or roller bearing, or of other type. In some applications, two or more bearings of the same or distinct types are configured to connect a shaft and a bearing housing. For the present patent application, a rotational movement refers to a rotational movement around an axis.

For the present patent application, a motor comprises a stationary member, a moving member, and a powered mechanism configured to produce a relative motion between the stationary member and moving member. A motor may be of different type depending on power source, e.g., electric, hydraulic, pneumatic, etc. A computer may be configured to control a motor, e.g. by controlling the timing, direction and speed of the motion of the motor. In many of the following applications, a motor comprises a base component (e.g., a frame) which is a stationary member of the motor, and a shaft which is a moving member of the motor, so that the powered mechanism of the motor can produce a rotation of the shaft relative to the base component around the axis of the shaft.

Our cooking system comprises a computer and several apparatuses and mechanisms, including a cooking apparatus, a receiving apparatus, a transfer apparatus, a dispensing apparatus, a cleaning apparatus, etc. Some of these constituents will be described first.

Referring to FIG. 1, a computer 901 comprises a plurality of i/o ports. The i/o ports 901a can be connected to a plurality of electric or electronic devices, and to sensors. The computer 901 may send and receive electric or electronic signals to the connected electric or electronic devices and to sensors. The computer 901 may control the operations of the electrical or electronic devices by sending electric or electronic signals to the electrical or electronic devices.

Referring to FIGS. 2A-2B, a cooking container 100, positioned in the upright position, is configured to hold food or food ingredients for cooking. The cooking container 100 may have the shape of a wok which is rotationally symmetric around an axis, referred to as the axis of the cooking container 100. The axis of the cooking container 100 may be configured to be vertical or nearly vertical when the cooking container 100 is positioned in the upright position. The cooking container 100 also comprises a barrier 109 in the shape of a ring, on the bottom of the cooking container.

It should also be noted that it is not a strict requirement that the cooking container 100 to be rotationally symmetric around an axis. A cooking container may have other shape.

The cooking container 100 may further comprise one or more straight or curved ridges, on its bottom, as barriers. A barrier may make food ingredients (in the cooking container) jump when the cooking container is fast moved horizontally, or in some other directions.

Referring to FIGS. 2C-2D, a connecting component 113 is comprised of a deformed metal sheet, including a flat part 113a, and a curved part 113b. The curved part 113b has some oval shaped holes. The flat part 113a has some round holes 113d. The flat part 113a and the curved part 113b may be both ring-shaped, although this is not a requirement. As shown in FIG. 2D, the flat part 113a of the connecting component 113 comprises a lower surface 113ax which is flat.

Referring to FIG. 2E, a cooking device 101a comprise the cooking container 100 and the connecting component 113, whereas the curved part 113b is welded to the cooking container 100. The flat surface 113ax of the connecting component 113 is configured to be horizontal when the cooking container 100 is in the upright position. Both the curved part 113b and the flat part 113a of the connecting component 113 are ring-shaped objects with holes which surround the cooking container 100, The flat surface 113ax is a ring-shaped surface with holes which surround the cooking container 100.

It should be noted that, without counting the holes, the ring-shaped objects 113a and 113b are perfectly round, but they may be substituted with other ring-shaped objects with holes surrounding the cooking container 100, where the "ring-shapes" are ring-shapes in topological sense. In the present patent application, "ring-shape" is meant ring-shape in topological sense.

It should be noted that the oval shaped holes in the connecting component 113 are not always needed. The presence of the oval shaped holes may possibly help with better welding between the cooking container 100 and the connecting component 113. The presence of the oval holes may also help reduce the weight in the cooking device 101a.

Referring to FIG. 2F, a flat board 112 comprises some round holes wherein the diameter of the said round holes are about the same as the diameter of the round holes 113d on the flat part 113a of the connecting component 113. The flat board 112 comprises an upper surface 112x which is flat.

Referring to FIG. 2G, a cooking device 101 comprises: the cooking device 101a; bearing housings 115 and 116; and a flat board 112. The bearing housings 115 and 116 are rigidly connected to the flat board 112. The rigid connection may be achieved by bolts and nuts, or by other means. Furthermore, the flat part 113a of the connecting component 113 of the cooking device 101a is configured to be rigidly connected with a ring-shaped area of the flat board 112 via a plurality of bolts 114 and corresponding nuts. The bolts 114 are inserted through the round holes 113d of the component 113 and the round holes of the flat board 112. The surfaces 113ax and 112x are configured to be horizontal, and hence parallel to each other. The surfaces 113ax and 112x may either touch each other or be separated by a ring-shaped heat-insulation flat board with holes.

The flat board 112 may be referred to as a holder, or a holding part. In the cooking device 101, the holder 112 is rigidly connected with the cooking container 100, if ignoring the elastic or other deformations. The flat board 112 may be made of steel or aluminum alloy or other metal, carbonate fiber, durable plastic, or other durable material. The flat board 112 may be substituted by a solid component of a different shape.

The flat part 113a may be placed either above or below the holding part 112.

The rigid connection of the flat board 112 with the cooking container 100 may be substituted by a different type of connection, such as an elastic connection comprising springs or other elastic devices, a connection comprising one or more kinematic pairs, etc.

It should also be noted that the bearing housings 115 and 116 may each comprise a flange configured to be rigidly connected with the flat board 112 by a plurality of bolts and nuts. The techniques of using bolts and nuts to rigidly connect these are well-known.

It should also be noted that heat insulation materials may be inserted to separate the flat part 113a and the holder 112.

The cooking container 100 may be configured to have a flat edge on top, e.g., a circle, which may be configured to be horizontal when the cooking container is positioned in the upright position.

Referring to FIGS. 3A-3F, a cooking sub-apparatus 110 comprises: the cooking device 101; a pair of holed cylinders 121 and 123 which are rigidly connected to a connector 122 (see FIG. 3A); two shafts 125 and 126 (see FIG. 3B). The cooking sub-apparatus 110 also comprises two bearing housings 124a and 124b and a half-circular board 124c all of which are rigidly connected to a connector 124d, wherein the connector 124d may optionally have the shape of a partial holed cylinder. The axes of the bearing housings 124a and 124b are configured to be identical. The shaft 125 is rigidly connected with the holed cylinder 121 wherein the shaft 125 is inserted in the hole of the holed cylinder 121; and the shaft 126 is rigidly connected with the holed cylinder 123, wherein the shaft 126 is inserted in the hole of the holed cylinder 123. A bearing 127 and accessories are configured to connect the shaft 125 and the bearing housing 124a and another bearing and accessories (hidden in figure) are configured to connect the shaft 125 and the bearing housing 124b, so that shaft 125 is constrained to rotate relative to the bearing housings 124a and 124b, around the axis of the shaft 125.

Figure 3C:
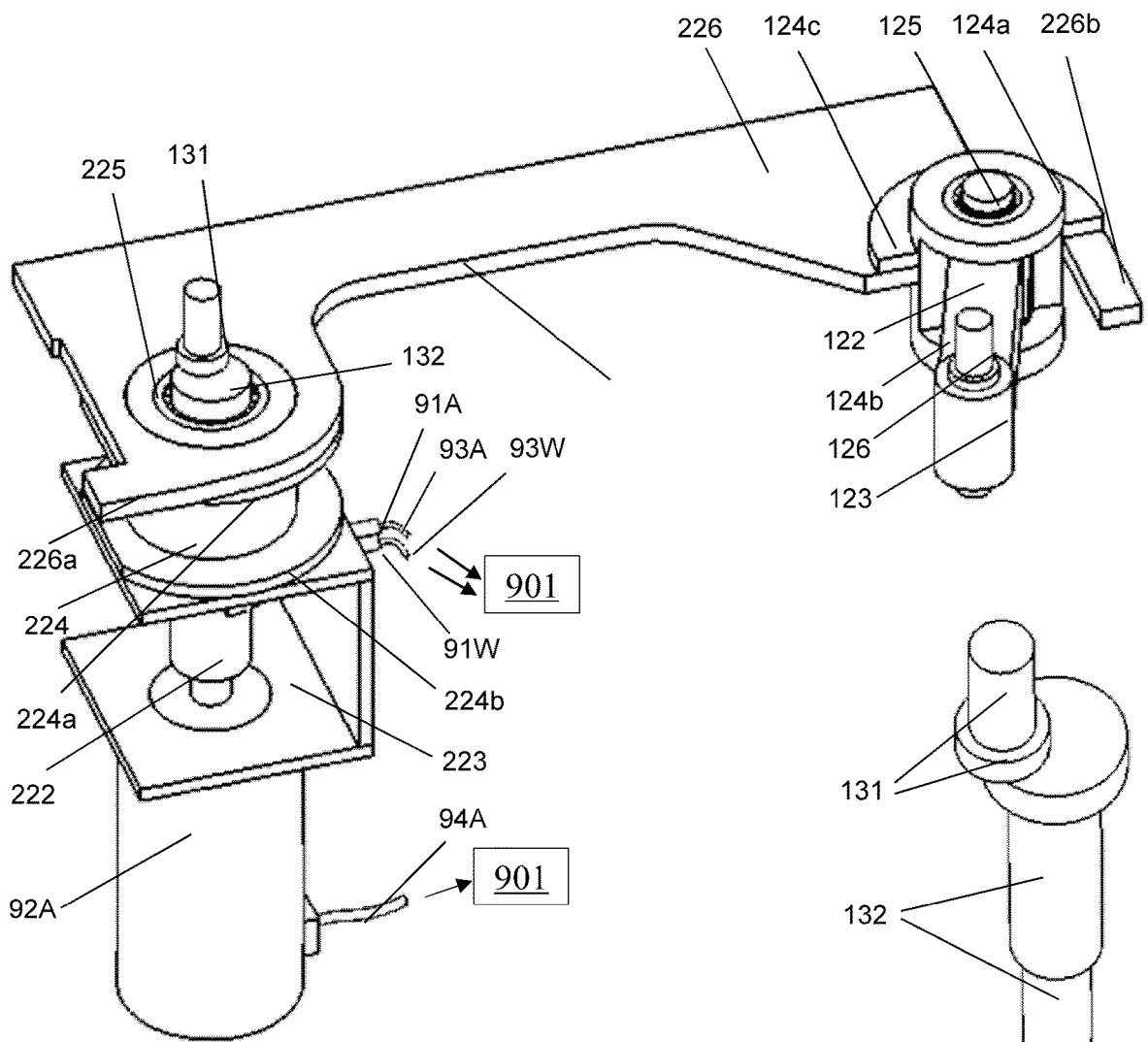
Figure 3D:
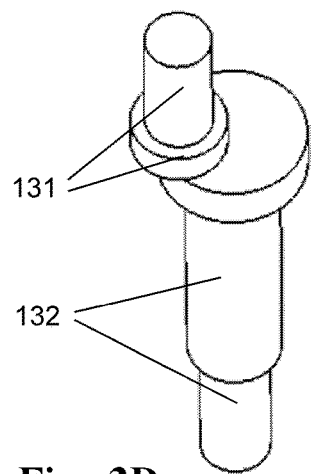

The cooking sub-apparatus 110 further comprises: a first support component 226 in the shape of a board wherein the first support component 226 comprises two sub-components 226a and 226b; a bearing housing 224; two flanges 224a and 224b which are rigidly extended from the bearing housing 224; a shaft 132, referred to as a main shaft; and a shaft 131, referred to as an eccentric shaft (see FIGS. 3C-3D). The main shaft 132 and the eccentric shaft 131 are rigidly connected to each other. The component 124c is rigidly connected to the first support component 226. The flange 224a is configured to be rigidly connected with the first support component 226; and hence the bearing housing 224 is rigidly connected with the first support component 226. A pair of bearings 225 (and accessories) are configured to connect the main shaft 132 and the bearing housing 224, so that the main shaft 132 is constrained to rotate relative to the bearing housing 224 around the axis of the main shaft 132. Thus, the eccentric shaft 131 is constrained to rotate around the axis of the main shaft 132, relative to the bearing housing 224, and equivalently, relative to the first support component 226. In other words, the eccentric shaft 131 is constrained to make an eccentric rotation, where the axis of the rotation is not identical to the axis of the eccentric shaft.

The axes of the shafts 125, 126, 132 and 131 may be parallel to each other, and the distance between the axis of the main shaft 132 and the axis of the eccentric shaft 131 is configured to be strictly less than the distance between the axis of the shaft 126 and the axis of the shaft 125. The distance between the axes of the shafts 132 and 131 is relatively small, usually not exceeding tens of millimeters. Although this is not a strict requirement, the axes of the shafts 131, 132, 125 and 126 are configured to be vertical and the top surface of the first support component 226 is configured to be horizontal, when the cooking container 100 is at the upright position.

The cooking sub-apparatus 110 further comprises: a motor 92A comprising a base component and a shaft; a connecting component 223; and a coupling 222. The base component of the motor 92A is rigidly connected to the connecting component 223. The connecting component 223 is rigidly connected to the flange 224b, and thus is rigidly connected with the first support component 226. The shaft of the motor 92A is fixedly connected to the main shaft 132 by the coupling 222. Thus, the motor 92A may drive the rotation of the main shaft 132, and hence the eccentric shaft 131 is rotated around the axis of the main shaft 132. The motor 92A is connected to the computer 901 via wires 94A. The computer 901 may be configured to send electric or electronic signals to the motor 92A as to dynamically control the timing and/or speed of the motor 92A (or indirectly the angle of rotation of the main shaft 132) The cooking sub-apparatus 110 further comprises: a pair of bearings 117 (and accessories) configured to connect the eccentric shaft 131 and the bearing housing 115, so that the eccentric shaft 131 is constrained to rotate relative to the bearing housing 115 around the axis of the shaft 131; a bearing 118 (and accessories) is configured to connect the shaft 126 and the bearing housing 116, so that the shaft 126 is constrained to rotate relative to bearing housing 116 around the axis of the shaft 126 (see FIGS. 3E-3F). When the main shaft 132 is rotated around the axis of the main shaft 132 by the motor 92A, the eccentric shaft 131 makes an eccentric rotation around the axis of the main shaft 132. This produces a cyclic, planar movement in the holder 112 and in the cooking container 100, if ignoring elastic and other deformations. The movement in the cooking container 100 may stir, mix and distribute the food or food ingredients contained in the cooking container 100. The cooking sub-apparatus 110 also comprises two proximity switches 91A and 91W both of which are fixedly connected to the connecting component 223, a target 132a with a rectangular cross section, and a target 132b in the shape of a hemi-discoidal. The targets 132a and 132b are fixedly connected to the main shaft 132. The proximity switch 91A and 91W are connected to the computer 901 separately via wires 93A and 93W. The proximity switch 91A senses the target 132a when the target 132a is rotated with the main shaft 132. The proximity switch 91W senses the target 132b when the target 132b is rotated with the main shaft 132. When one of the proximity switches 91A and 91W separately senses the targets 132a and 132b, the electric or electronic signals of the proximity switches 91A and 91W are sent to the computer 901. The computer 901 can figure out the position of the target 132a or 132b, and the position of the main shaft 132.

Figure 3E:
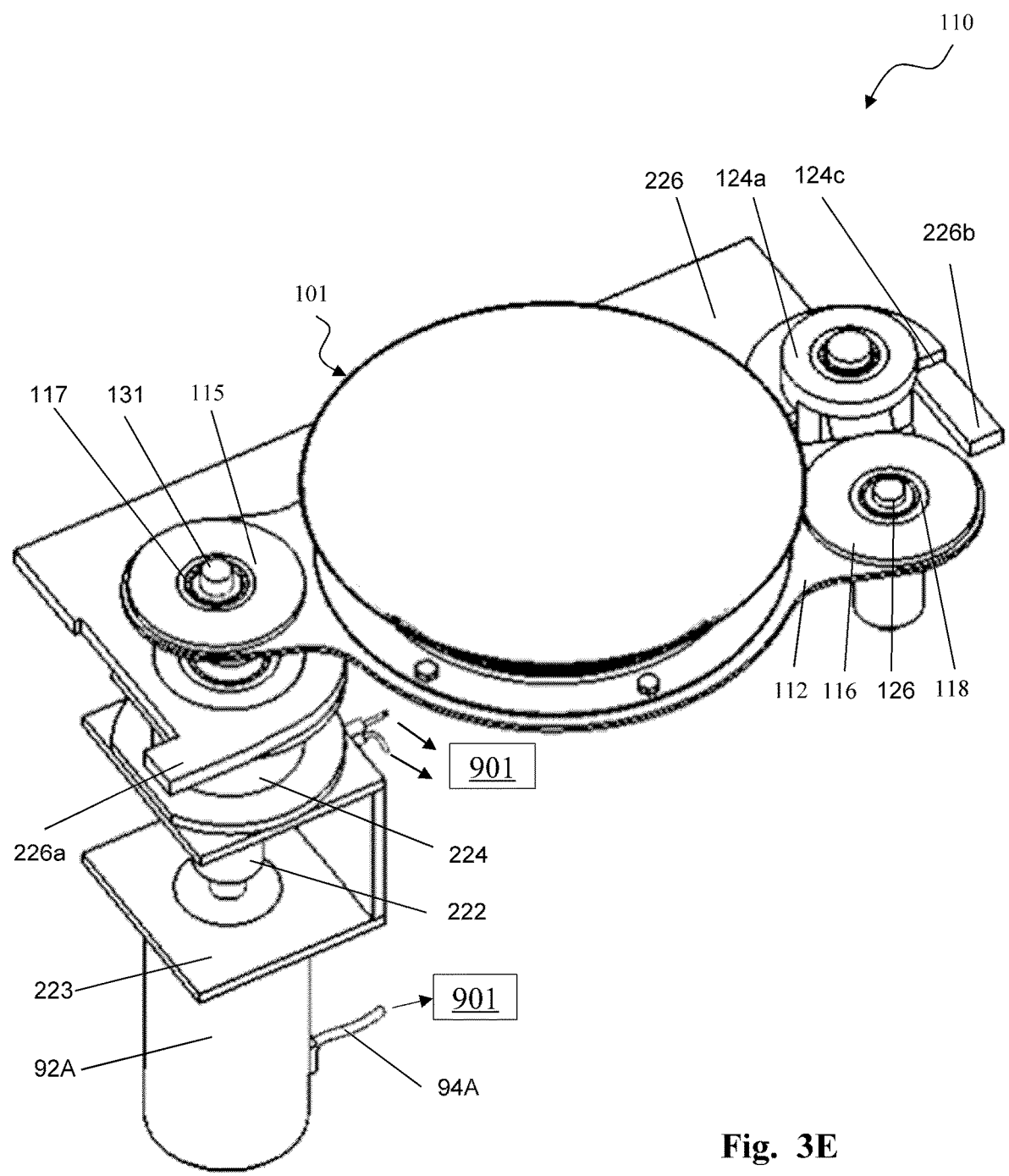
FIGS. 3E-3F show aerial views of the cooking sub-apparatus.
Figure 3F:
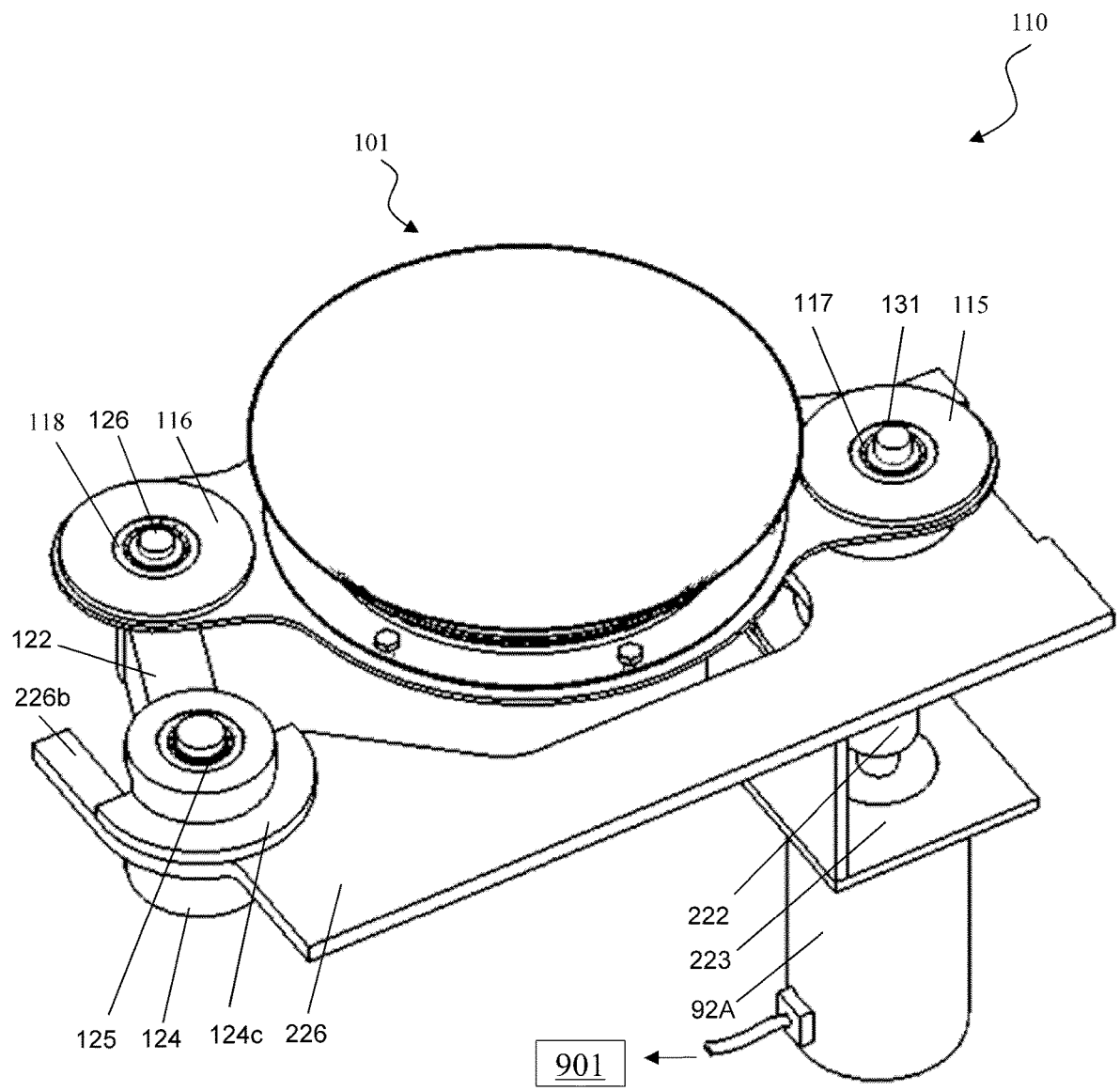
Figure 3G:
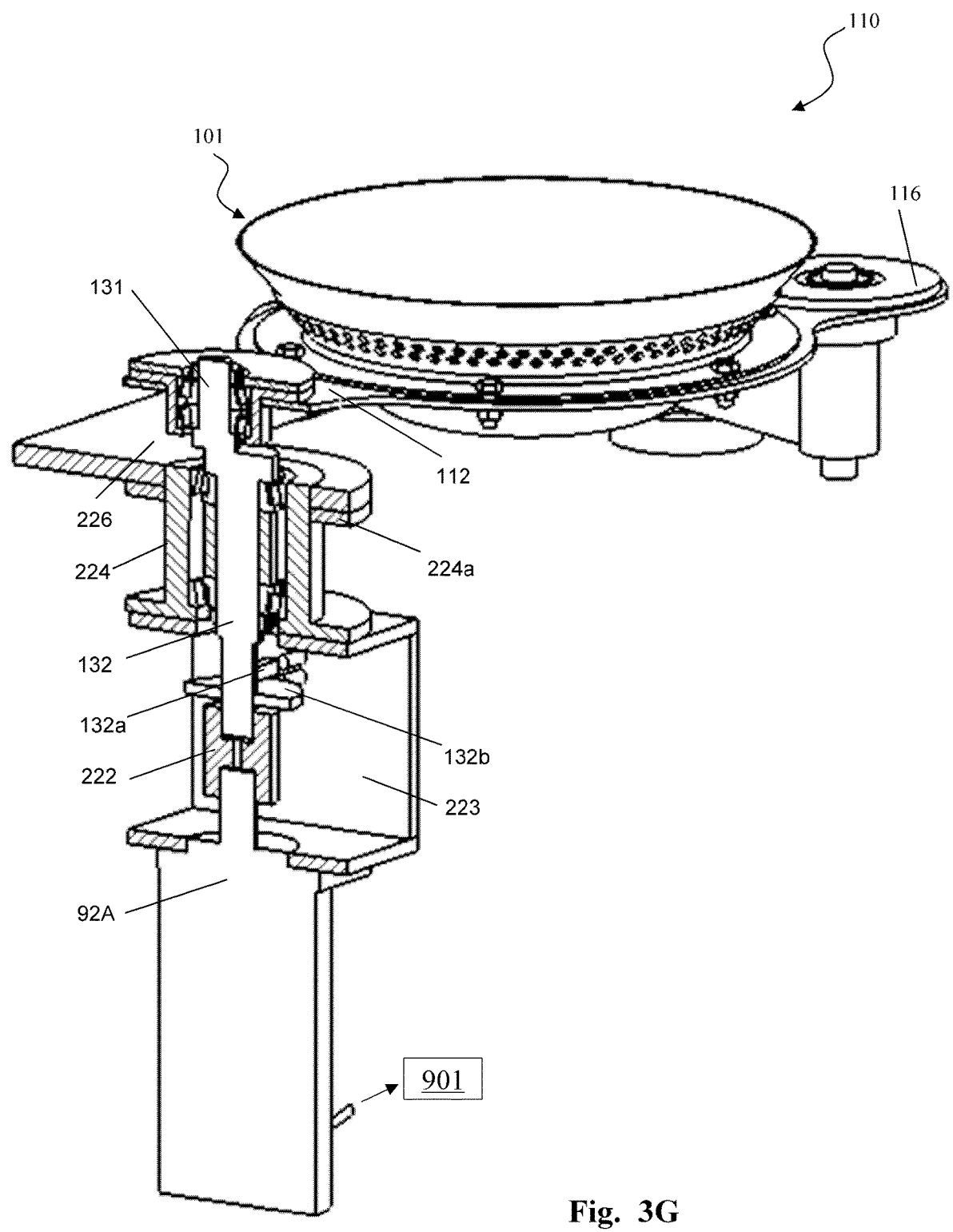
FIG. 3G shows a cut view of the cooking sub-apparatus.
Figure 3H:
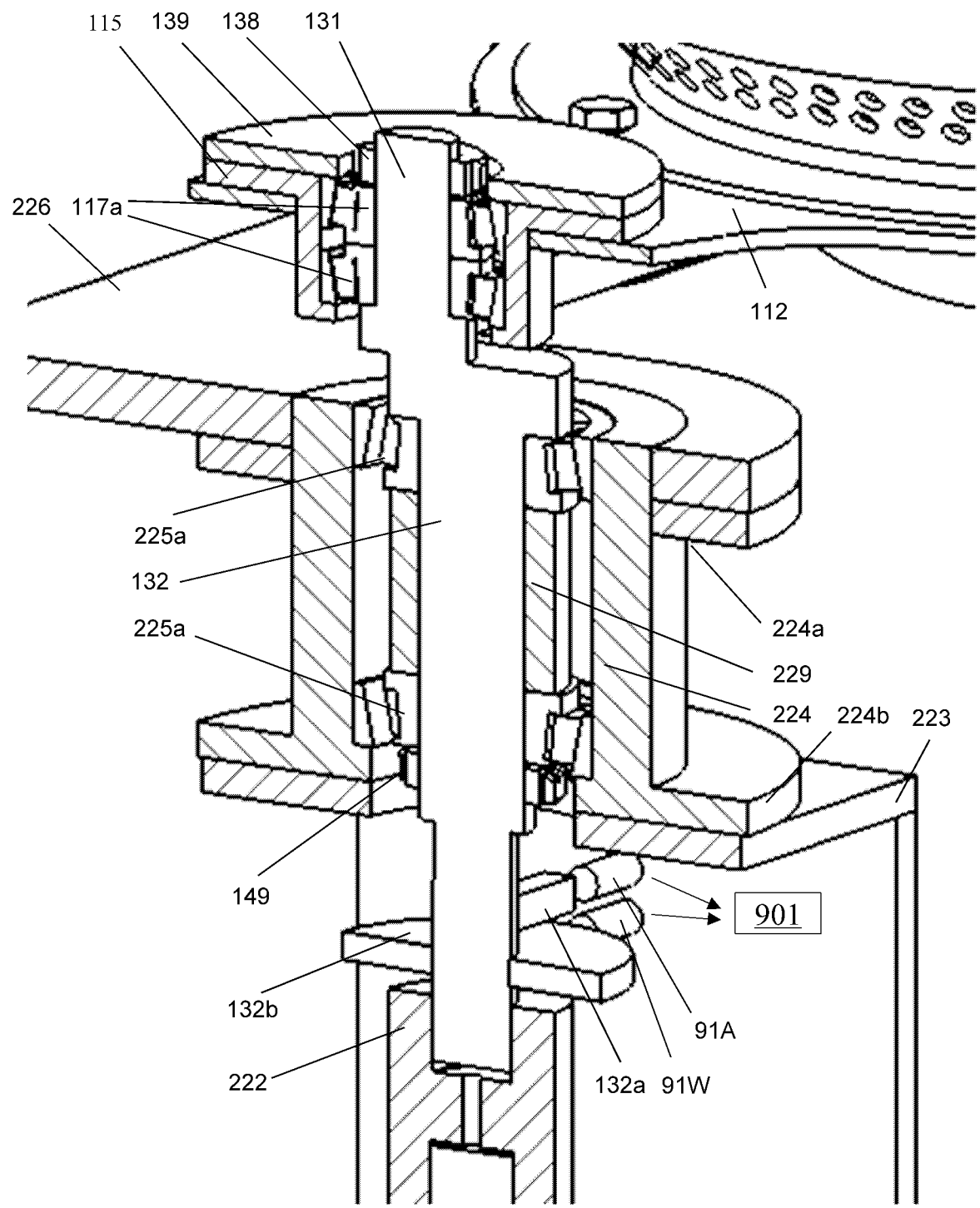
FIGS. 3H-3I show cut views of parts of the cooking sub-apparatus.

As shown in FIGS. 3E-3G, the motor 92A is connected to the computer 901 via wires 94A. The computer 901 may be configured to send electric or electronic signals to the motor 92A as to dynamically control the timing and/or speed of the motor 92A; where the speed of the motor 92A may be variable over time, per recipe. As shown in FIG. 3H, the proximity switches 91A and 91W are also connected to the computer 901 separately via wires 93A and 93W, so the computer 901 may receive electric or electronic signals from the switches 91A and 91W.

Figure 3I:
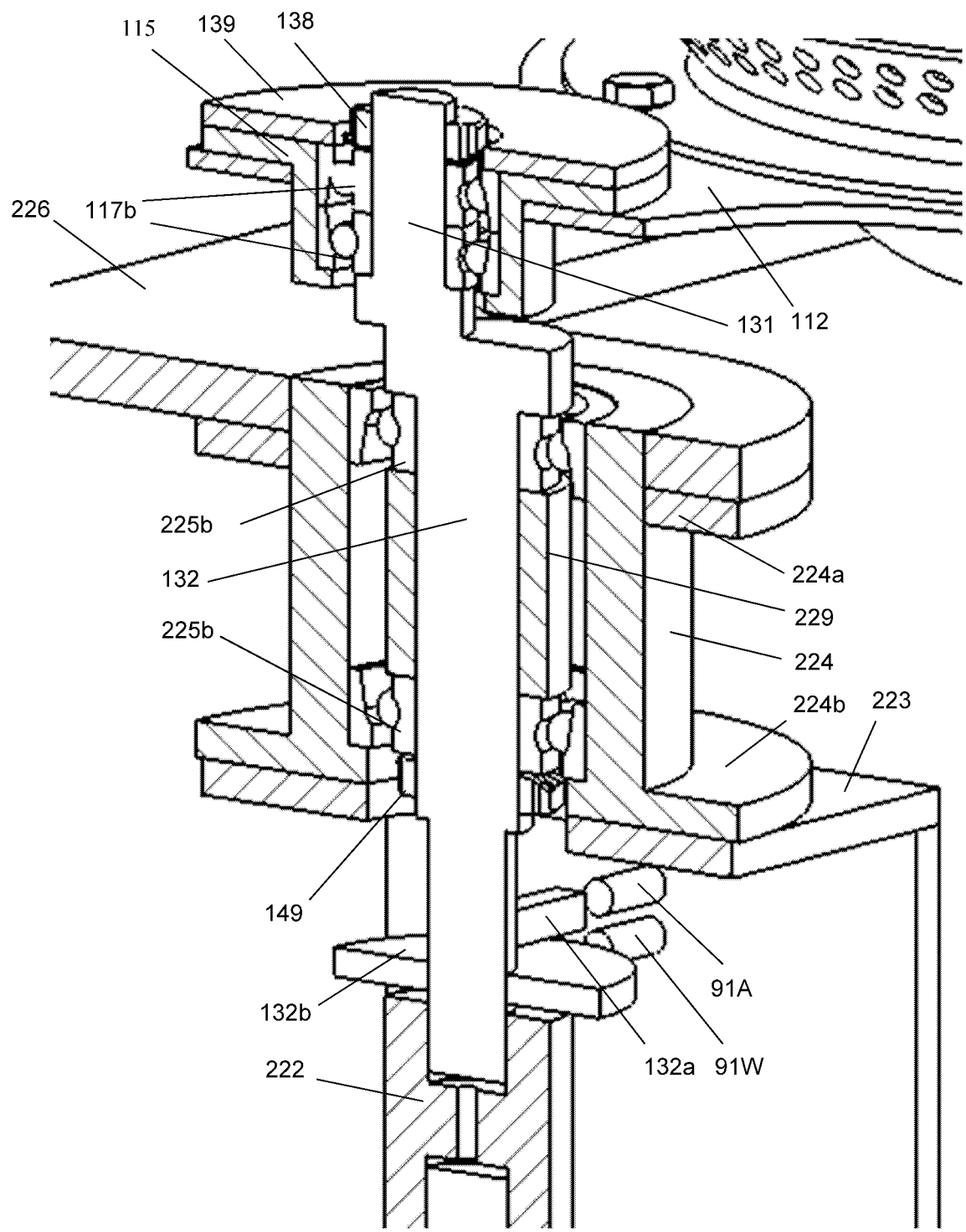

Referring to FIGS. 3G-3I, the cooking sub-apparatus 110 further comprises some accessories: lockouts 138 and 149, a ring 139 and a sleeve 229 wherein these accessories are not shown in other figures. The pair of bearings 117 which are configured to connect the eccentric shaft 131 and the bearing housing 115 may be substituted by a pair of angle contact ball bearings 117a or a pair of tapered roller bearings 117b. Similarly, the pair of the bearings 225 which are configured to connect the main shaft 132 and the bearing housing 224 may be substituted by a pair of angle contact ball bearings 225a or a pair of tapered roller bearings 225b or (see FIGS. 3H-3I). The locknut 138 and the ring 139 are used to separately fix the inner ring and outer ring of the upper angle contact ball bearings 117a or the upper tapered roller bearings 117b. The locknut 149 is used to fix the inner ring of the lower angle contact ball bearing 225a or the lower tapered roller bearing 225b. The sleeve 229 is on the main shaft 132 and is positioned between the two angle contact ball bearings 225a or tapered roller bearings 225b.

It should be noted that the angle contact ball bearings and the tapered roller bearings are used in situations of high speed and high precision, and both of the angle contact ball bearings and the tapered roller bearings have superior performance in bearing axial force. The angle contact ball bearings or the tapered roller bearings are usually configured to be paired mounting.

It should be noted that the bearing 118 which is configured to connect the shaft 126 and the bearing housing 116 may be substituted by a self-aligning ball bearing. Since the axis of the inner ring of the self-aligning ball bearing may tilt relative to the axis of the outer ring of the self-aligning ball bearing in a certain range, the self-aligning ball bearings may adjust the axis of the inner ring being concentric with that of the shaft 126 even if the axis of the shaft 126 is not entirely concentric with the axis of the bearing housing 116 by vibrations, errors or allowances.

It should be noted that the cooking sub-apparatus 110 comprises: the cooking device 101 comprising a cooking container 100 configured to hold food or food ingredients; and a stirring motion mechanism configured to produce a cyclic motion in the cooking device 101 and hence the stirring motion mechanism configured to produce a cyclic motion in the cooking container 100 as stir, mix or distribute the food or food ingredients contained in the cooking container 100. The said stirring motion mechanism comprises:

(1) a first link comprising the bearing housings 116 and 115, the holder 112, and their rigid connections, wherein the holder 112 (and the first link) is bolted to the cooking device 101;

(2) a second link comprising the first main shaft 132, the first eccentric shaft 131, and their rigid connection;

(3) a third link comprising the second main shaft 125, the second eccentric shaft 126, and their rigid connection;

(4) a fourth link composing the first support component 226, the bearing housings 224, 124a and 124b, and their rigid connections to each other;

(5) a first connection comprising the bearings 117 (and accessories) configured to connect the first eccentric shaft 131 of the second link and the bearing housing 115 of the first link, so that the first link is constrained to rotate relative to the second link around the axis of the first eccentric shaft 131;

(6) a second connection comprising the bearings 225 (and accessories), configured to connect the first main shaft 132 of the second link and the bearing housing 224 of the fourth link, so that the second link is constrained to rotate relative to the fourth link around the axis of the first main shaft 132;

(7) a third connection comprising the bearing 118 (and accessories) configured to connect the second eccentric shaft 126 of the third link and the bearing housing 116 of the first link, so that the first link is constrained to rotate relative to the third link around the axis of the second eccentric shaft 126;

(8) a fourth connection comprising the bearings 127 (and accessories) configured to connect the second main shaft 125 of the third link and the bearing housings 124a and 124b of the fourth link, so that the third link is constrained to rotate relative to the fourth link around the axis of the second main shaft 125;

(9) a motion mechanism configured to produce a rotation in the first main shaft 132 (of the second link) around the axis of the first main shaft 132 wherein the motion mechanism comprises the motor 92A, the proximity switches 91A and 91W, the targets 132a and 132b, the fixed connection of the base component of the motor 92A with the first support component 226, and the connection of the shaft of the motor 92A with the first main shaft 132, etc.

It should be noted that the first connection discussed above connects the first link and the second link, so that the first link is constrained to rotate relative to the second link; the second connection connects the second link and the fourth link so that the second link is constrained to rotate relative to the fourth link; the third connection connects the first link and the third link, so that the first link is constrained to rotate relative to the third link; the fourth connection connects the third link and the fourth link, so that the third link is constrained to rotate relative to the fourth link; the motion mechanism produces a motion of the second link relative to the fourth link.

It should also be noted that the above stirring motion mechanism comprises a crank-rocker mechanism comprising: the first link, second link, third link, fourth link, the first connection, the second connection, the third connection and the fourth connection.

It should be noted that the stirring motion mechanism comprises: (1) a first rotational mechanism comprising the second eccentric shaft 126, the bearing housing 116, and a connection comprising the bearing 118 configured to constrain the relative movement of the second eccentric shaft 126 and the bearing housing 116 to an axial rotation; (2) a second rotational mechanism comprising the first eccentric shaft 131, the bearing housing 115, and a connection comprising the bearing 117 configured to constrain the relative movement of the first eccentric shaft 131 and the bearing housing 115 to an axial rotation; (3) a third rotational mechanism comprising the first main shaft 132, the bearing housing 224, and a connection comprising the bearing 225 configured to constrain the relative movement of the first main shaft 132 and the bearing housing 224 to an axial rotation; (4) a fourth rotational mechanism comprising the second main shaft 125, the bearing housings 124a and 124b, and a connection comprising the bearings 127 configured to constrain the relative movement of the second main shaft 125 and the bearing housing 124a and 124b to an axial rotation; (5) the support component 226; (6) the holed cylinders 121 and 123, the connector 122, the motor 92A, the coupling 222, the connecting component 223; (7) the mutual connections among the above parts, if any.

The support component 226 is referred to as the support component of the stirring motion mechanism, and the stirring motion mechanism produces a planar movement in the cooking container 100 relative to the support component 226. Although this is not a strict requirement, the magnitudes of movements of points on the cooking container may be configured to be in tens of millimeters, anywhere from 10 to 99 millimeters.

The rigid connection of the holder 112 (or of the first link) with the cooking container 100 may be substituted by a flexible connection or other types of connection. The first link, second link, third link or fourth link described above may be substituted by a first solid component, a second solid component, a third solid component and respectively a fourth solid component. A solid component may comprise a rigid part or rigid component, or an elastic part or elastic component, or both rigid and elastic parts.

It should be noted that the axes of the first main shaft 132 and the first eccentric shaft 131 may be configured to parallel to each other. The distance between the two parallel axes may be kept fixed in some applications or adjustable in some other applications; where the distance may further be configured to be properly small (less than tens of millimeters).

It should be noted that the axes of the shafts 131, 132, 126 and 125 in the cooking sub-apparatus 110 may be configured to intersect at a same point, instead of being configured to be parallel to each other; and the angle between the axes of the shafts 131 and 132 is configured to be smaller than the angle between the shafts 126 and 125. The angle between the shafts 131 and 132 may be quite small, no more than several degrees in many applications. In this case, the stirring motion mechanism in the cooking sub-apparatus 110 produces a cyclic, spherical motion in the cooking container 100 and the holder 112, if ignoring elastic and other deformations.

Figure 4A:
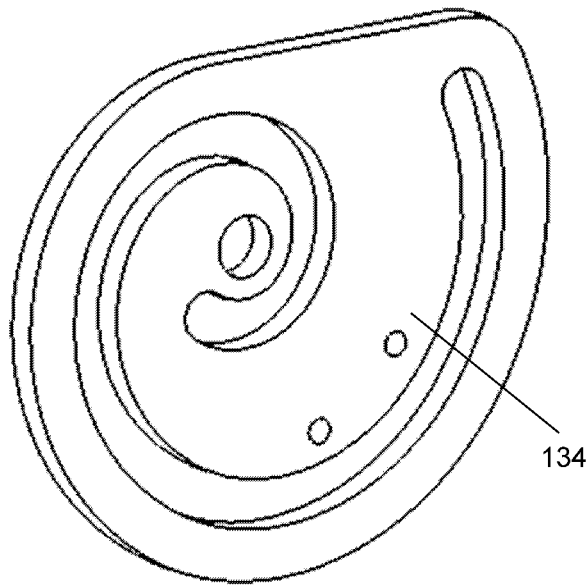
FIG. 4A shows an aerial view of a cam.
Figure 4B:
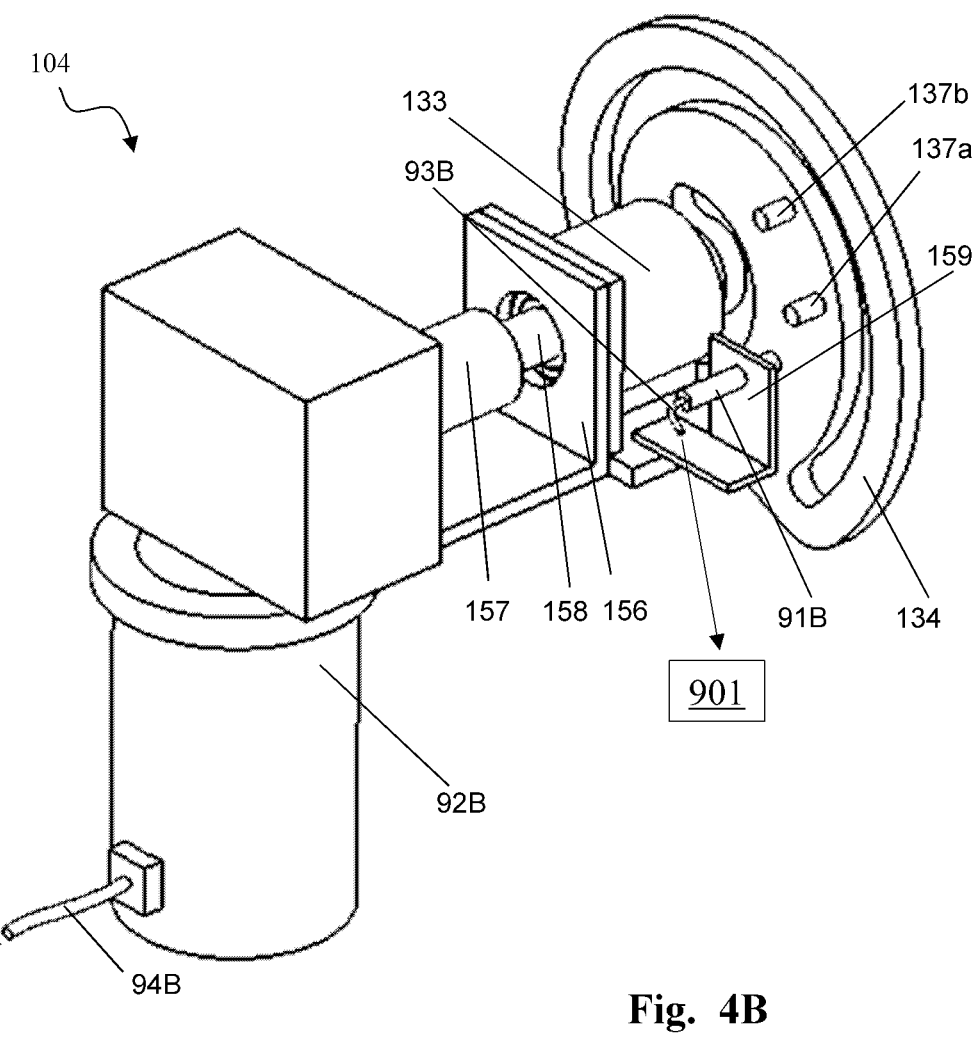
FIG. 4B shows an aerial view of a motion mechanism

Referring to FIGS. 4A-4B, a motion mechanism 104 comprises: a cam 134 comprising a curved track, wherein the cam has a shape of a board and the curved track is a curved hole of a certain width on the board; and a bearing housing 133 (with a flange and a base rigidly attached to it); a shaft 158; a connecting component 156; a coupling 157; and a motor 92B comprising a shaft and a base component. The cam 134 is rigidly connected to the shaft 158. A pair of bearings and accessories (hidden in figure) are configured to connect the shaft 158 and the bearing housing 133, so that the shaft 158 is constrained to rotate relative to the bearing housing 133, around the axis of the shaft 158. The connecting component 156 is configured to fixedly connect the bearing housing 133 and the base component of the motor 92B. The shaft of the motor 92B is connected to the shaft 158 by the coupling 157. Thus, the motor 92B may drive the rotation of the shaft 158, and hence the cam 134 is rotated around the axis of the shaft 158. The curved track of the cam 134 has a curved profile comprising a circular arc at either end of the curved profile; wherein each circular arc is a part of a circle centered at the axis of the shaft 158. The edge of the curved track of the cam 134 comprises equidistant curve to the curved profile.

The motion mechanism 104 also comprises a proximity switch 91B; a connecting component 159 configured to fixedly connect the proximity switch 91B to the bearing housing 133; and two targets 137a and 137b both of which are fixedly joined with the cam 134. As shown in FIG. 4B, the motor 92B is connected to the computer 901 via wires 94B. The computer 901 is configured to dynamically control the timing and/or speed of the motor 92B. The proximity switch 91B is also connected to the computer 901 via wires 93B, so the computer 901 may receive electric or electronic signals from the proximity switch 91B. The proximity switch 91B senses the targets 137a and 137b when the targets 137a and 137b are rotated with the cam 134. When the cam 134 is rotated to a first position (or second position) where the proximity switch 91B senses the target 137a (or respectively 137b), the electric or electronic signals are sent to the computer 901. The computer 901 can figure out the position of the target 137a (or respectively 137b), and the position of the cam 134. Then the computer 901 can send electric or electronic signals to the motor 92B as to control the rotation of the motor 92B for a time period during which the motion mechanism 104 can complete a corresponding process. After this time period, the motor 92B, under the control of the computer 901, may restart again and make a reverse rotation to rotate the cam 134 to the second position or respectively the first position.

Figure 4C:
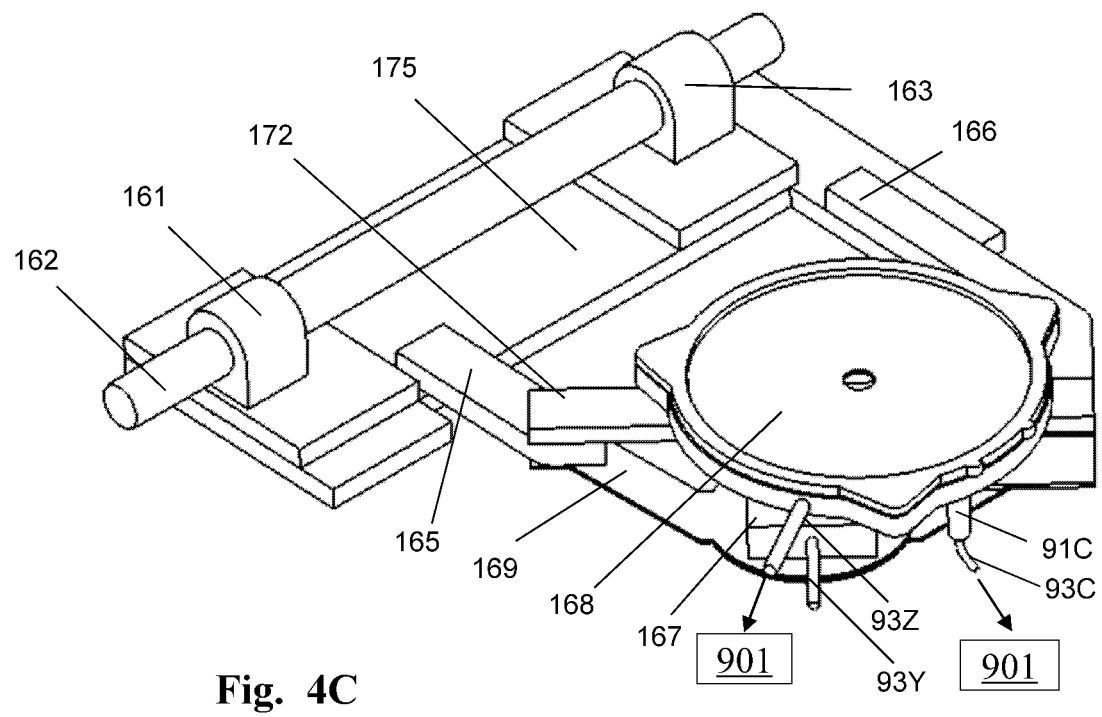
FIGS. 4C-4E show aerial views of parts of a cooking apparatus.
Figure 4D:
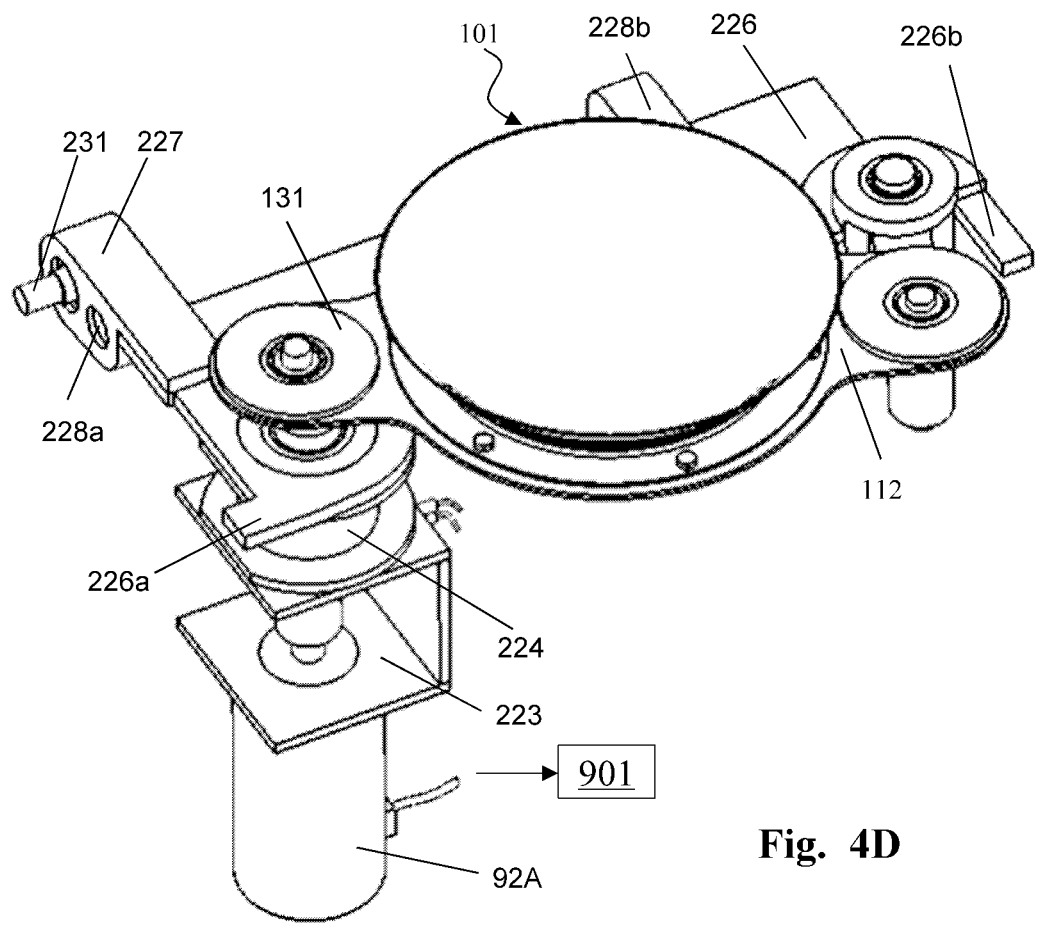
Figure 4E:
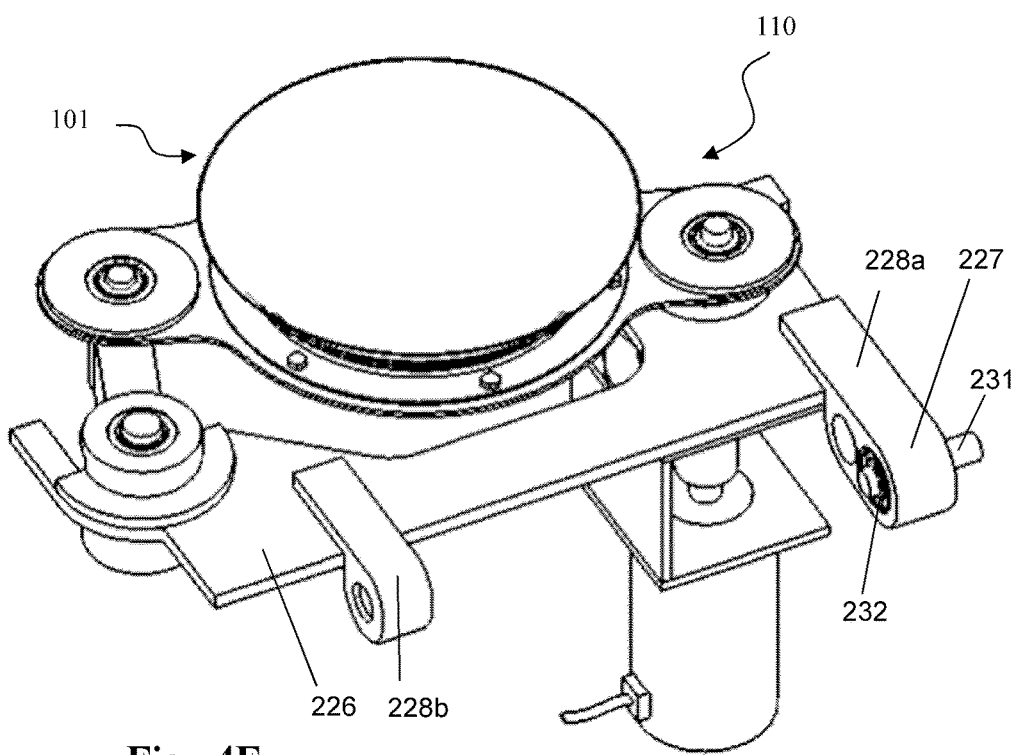

Referring to FIGS. 4C-4H, a cooking apparatus 120 comprises the cooking sub-apparatus 110 and a cooking container unloading mechanism, wherein the said cooking container unloading mechanism comprises: a support component 175 in the shape of a board; a pair of shaft seats 161 and 163; and a shaft 162; wherein the shaft seats 161 and 163 are configured to rigidly connect the shaft 162 to the support component 175 (see FIG. 4C). The said cooking container unloading mechanism further comprises: bearing housings 227, 228a and 228b; a rigid connection of the bearing housings 227, 228a and 228b to the first support component 226; a shaft 231; and bearings 232 (and accessories) configured to connect the shaft 231 and the bearing housing 227, so that the shaft 231 is constrained to rotate relative to the bearing housing 227, around the axis of the shaft 231 (see FIGS. 4D-4E). The axes of the bearing housings 228a and 228b are configured to be coincide; and the axes of the bearing housings 227, 228a and 228b are configured to be parallel to a same horizontal direction.

Figure 4F:
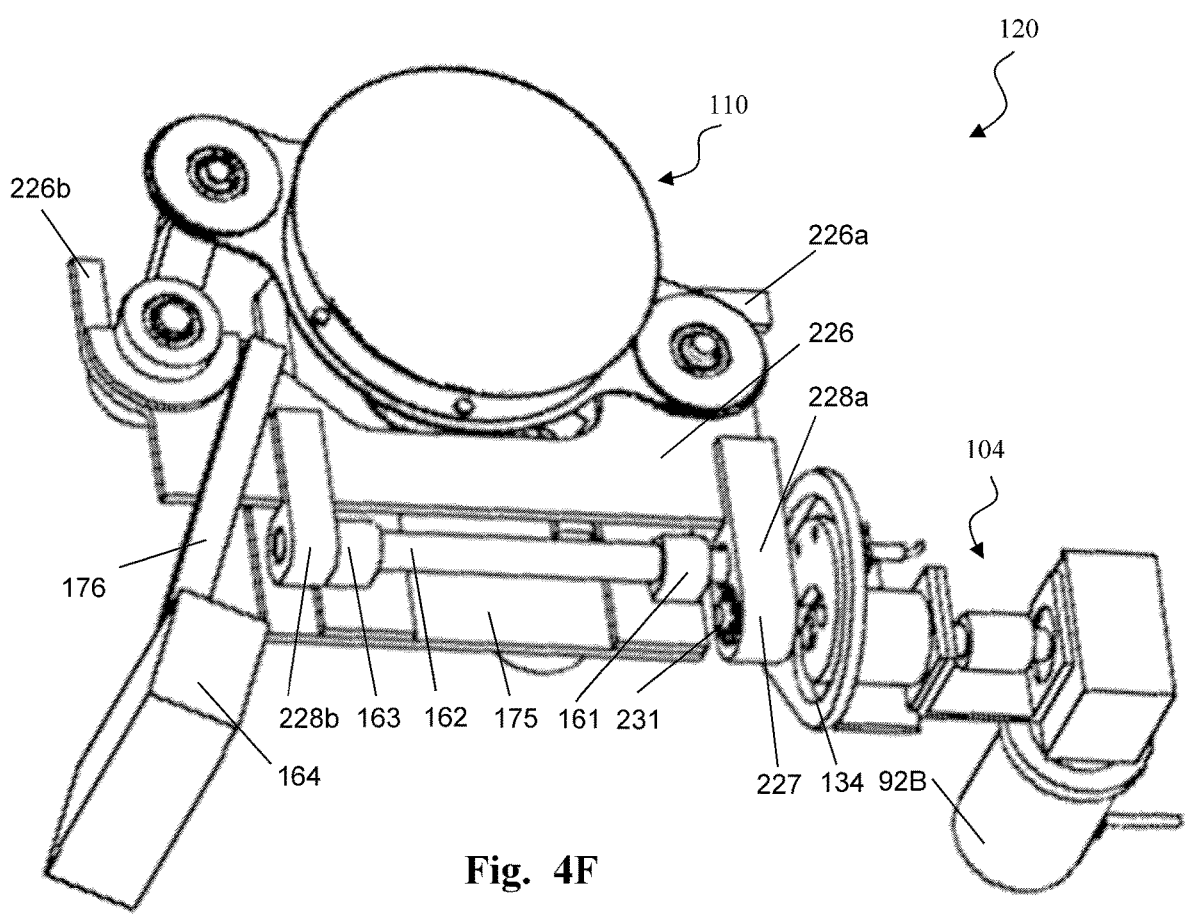
FIGS. 4F-4G show aerial views of the cooking apparatus.
Figure 4G:
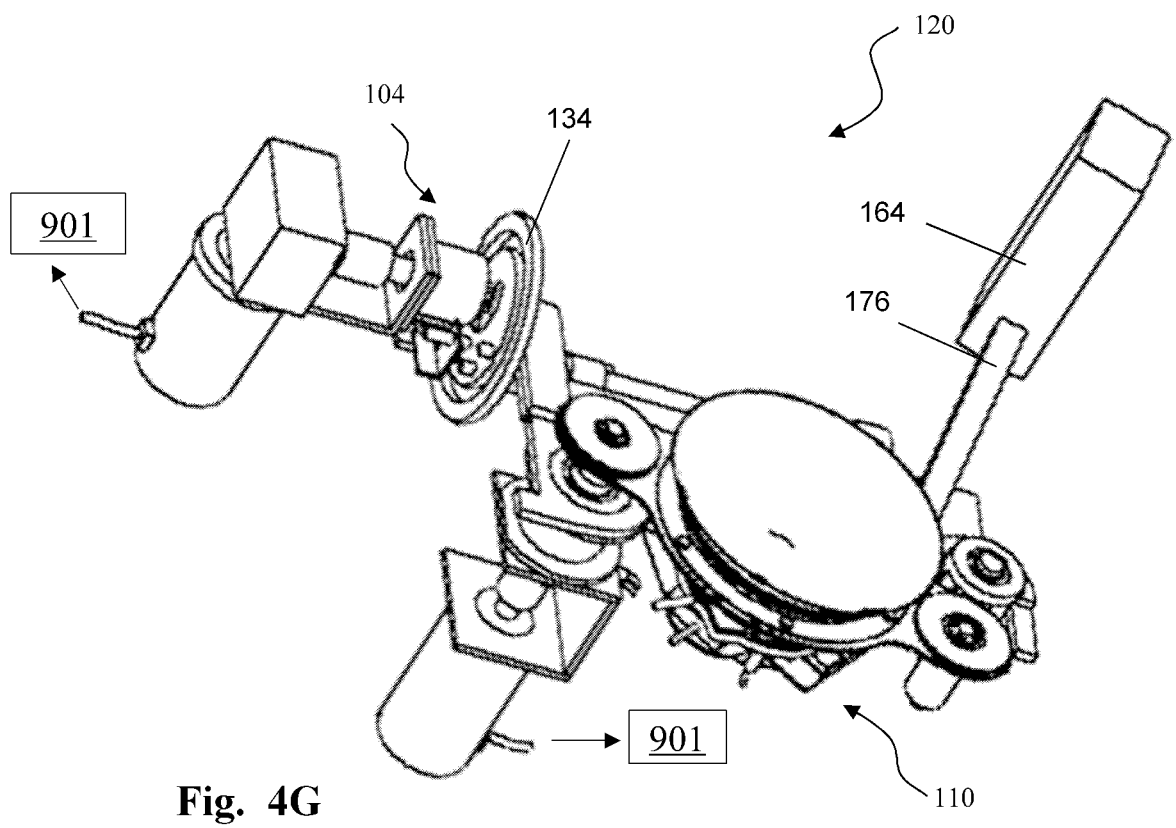
Figure 4H:
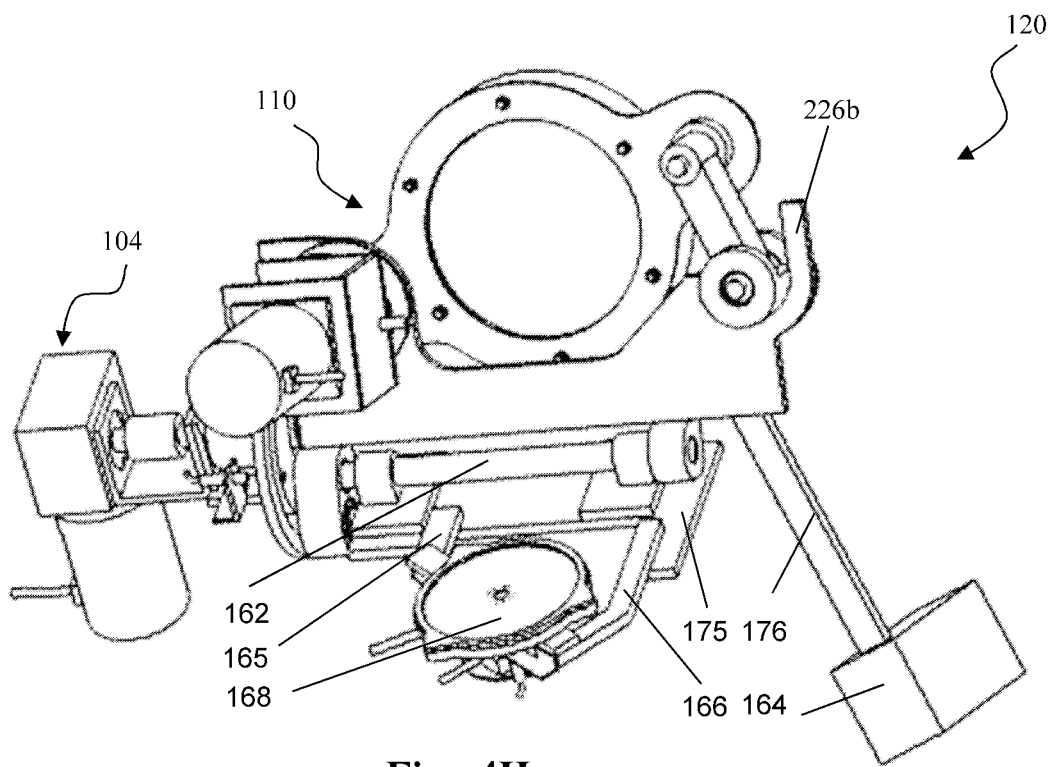
FIG. 4H show an aerial view of the cooking apparatus in a different working position.

The said cooking container unloading mechanism of the cooking apparatus 120 further comprises: the motion mechanism 104; a weight 164; a connector 176 configured to connect the weight 164 to the first support component 226 of the cooking sub-apparatus 110; two roller bearings (hidden in figures) configured to connect the shaft 162 and the bearing housing 228a and 228b respectively, so that the shaft 162 is constrained to rotate relative to the bearing housings 228a and 228b, around the axis of the shaft 162 (see FIGS. 4F-4H). Thus, the first support component 226 of the cooking sub-apparatus 110 is constrained to rotate relative to the shaft 162 (or equivalently, relative to the support component 175), around the axis of the shaft 162. The axis of the shaft 231 of the cooking sub-apparatus 110 is configured to be parallel but not identical to the axis of the shaft 162. The bearing housing 133 of the motion mechanism 104 is configured to be rigidly connected to the support component 175 (although the connection is not shown in figures). The axis of the shaft 158 is configured to be parallel but not identical to the axis of the shaft 162. The axes of the shafts 158, 162 and 231 are configured to be never co-planar. In fact, the distance between the axes of the shafts 162 and 231 is usually smaller than the distance between the axes of the shafts 162 and 158; and the distance between the shafts 231 and 158 is variable. The shaft 231 is configured to be inserted into (and be constrained by) the curved track of the cam 134 of the motion mechanism 104. As explained, the edge of the curved track of the cam 134 comprises equidistant curve to the curved profile of the cam 134. The distance of the said edge to the said curved profile is configured to be equal to (or slightly larger, usually by 0.1 mm or lesser, than) the radius of the shaft 231 in the section constrained by the curved track of the cam 134. It should be noted that the shaft 231 may be considered as a wheel which is rotatable relative to the bearing housing 227; and since the bearing housing 227 is rigidly connected to the first support component 226, the shaft 231 is rotatable relative to the support component 175, around the axis of the shaft 162. Thus, a movement of the axis of the shaft 231 may produce a rotation of the first support component 226 around the axis of the shaft 162.

As explained earlier, the curved track of the cam 134 comprises two circular profiles next to the two ends, along circles centered at the axis of the shaft 158. When the shaft 231 is constrained by any one of the circular profiles of the curved track, the distance between the axes of the shafts 231 and 158 may stay constant, and the axis of the shaft 231 may not move relative to the axes of the shafts 162 and 158. When the shaft 231 is constrained by the non-circular profiles of the curved track of the cam 134, the axis of the shaft 231 is moved relative to the axes of the shafts 162 and 158, as the distance between the axes of the shafts 231 and 158 is changed. The motor 92B of the motion mechanism 104 may produce a rotation of the cam 134 around the axis of the shaft 158. The rotation of the cam 134 induces a movement of the shaft 231. The movement of the shaft 231 induces a rotation of the first support component 226 of the sub-apparatus 110 relative to the support component 175. The rotation of the first support component 226 induces a turning in (the sub-apparatus 110 and) the cooking container 100, around the axis of the shaft 162. Moreover, the said cooking container unloading mechanism may be configured to move the first support component 226 from a first end position where the cooking container 100 is positioned upright and able to hold food or food ingredients for cooking, to a second end position so that a cooked food in the cooking container 100 may be unloaded from the cooking container 100. It should be noted that when the first support component 226 is rotated to the first end position (or second end position), the cam 134 of the motion mechanism 104 is rotated to the corresponding position where the proximity switch 91B senses the target 137a (or 137b). At the same time the computer 901 may send signals to the motor 92B as to control the rotation of the motor 92B for a time during which the cooking sub-apparatus 110 may complete a cooking process (or respectively unloading process). The range of angular rotation of the first support component 226 around the axis of the shaft 162, between the two end positions, may be configured to be an angle between 90 and 180 degrees (often between 120 to 150 degrees), although this is not a strict requirement. The weight 164 is configured to balance the sub-apparatus 110, so that the center of the gravity of the whole of the sub-apparatus 110 and the weight 164 is located at or near the axis of the shaft 162; and, as consequence, it does not require too much power for the motor 92B to produce a rotation in the first support component 226.

The cooking apparatus 120 also comprises a heating device 168, one or more temperature sensors 91C, and a fan 167. The heating device 168 is mounted on a plastic component 172 which is rigidly connected to the support component 175 by connectors 165 and 166. The temperature sensors 91C are fixedly connected to the plastic component 172 via connecting components (see FIG. 4C, also see FIG. 4H). The heating device 168 comprises an inductive stove configured to generate oscillating magnetic fields as to heat the ferromagnetic material of the cooking container 100, when the first support component 226 is position at the first end position. The inductive stove comprises coils (made by copper or other material). The temperature sensor 91C are configured to detect the temperature of the heating device 168. The fan 167 is configured to produce air flow as to cool the heating device 168. The fan 167 is mounted on aboard 169 which is connected to the connectors 165 and 166. As shown in FIG. 4C, the heating device 168 are connected to the computer 901 via wires 93Z. The computer 901 is configured to dynamically control the power and/or time of the heating device 168; where the temperature of cooking may be different in different recipe. The temperature sensor 91C is also connected to the computer 901 via wires 93C, so the computer 901 may receive electric or electronic signals from the temperature sensor 91C. When the computer 901 receives electric or electronic signals from the temperature sensor 91C and the signals show that the temperature of the heating device 168 is beyond (or below) the designed temperature range during a cooking process, the computer 901 may send signals to control the heating device 168 to increase (or respectively reduce) the power of oscillating magnetic fields to keep the temperature in the range.

It should be noted that the shaft 162 of the cooking apparatus 120 may be configured to be horizontal.

The support component 175 in the cooking apparatus 120 may be referred to as a second support component of the cooking apparatus 120. As explained before, the support component 226 is referred to as a first support component.

It should be noted that the cooking apparatus 120 comprises: the cooking sub-apparatus 110 comprising the cooking container 100, and the stirring motion mechanism comprising the first support component 226, wherein the stirring motion mechanism is configured to produce a cyclic planar motion in the cooking container 100 relative to the first support component 226, as to stir, mix or distribute the food or food ingredients contained in the cooking container 100; the heating device 168 and the fan 167, wherein the heating device 168 is mounted on the plastic component 172, wherein the plastic component 172 is rigidly connected to the second support component 175, wherein the heating device 168 is configured to heat the cooking container 100 during a cooking process.

It should also be noted that the cooking apparatus 120 further comprises the second support component 175, and the cooking container unloading mechanism configured to rotate (or otherwise move) the first support component 226 relative to the second support component 175 around the axis of the shaft 162 between a first end position and a second end position, and hence the cooking container 100 is rotated relative to the second support component 175 around the axis of the shaft 162 between a first end position and a second end position. In the first end position, the first support component 226 is so positioned that the cooking container 100 is positioned upright as to be able to hold food ingredients (as seen in FIG. 4G); and when the first support component 226 is rotated to the second end position, the cooking container 100 is turned as to be able to dispense cooked food from the cooking container 100 (as shown in FIG. 4H). From the first end position to the second end position, the axis of the cooking container 100 is turned by a certain fixed angle which can optionally be any constant chosen between 75 to 180 degrees, or in the most common applications chosen between 80 to 120 degrees.

It should be noted that the motion mechanism 104 of the cooking container unloading mechanism of the cooking apparatus 120 may be able to brake the rotation of the first support component 226 (around the axis of the shaft 162) relative to the second support component 175, when the first support component 226 is at the first end position relative to the second support component 175. As explained, the curve profile of the curved track of the cam 134 comprises a circular arc at either end; wherein each circular arc is part of a circle centered at the axis of the shaft 158 (FIGS. 4A-4B). During the time period when the shaft 231 is constrained by the curved track in the part corresponding to one of the circular arcs, the axis of the shaft 231 is not moved even if the cam is rotated around the axis of the shaft 158. The cam 134 may then be used as a braking device for the motion of the axis of the shaft 231 around the axis of the shaft 162, under the condition that the cam 134 is not forcefully moved by the motor 92B from a still position. In fact, the axis of the shaft 231 does not move, even if the cam 134 is slightly moved; the ratio of the speed of the rotational motion of the axis of the shaft 231 and the speed of the rotational motion of the cam 134 is zero, or equivalently, the ratio of the speed of the rotational motion of the cam 134 and the speed of the rotational motion of the axis of the shaft 231 is infinity. If the axis of the shaft 231 is not moved, then the first support component 226 cannot be rotated around the axis of the shaft 162, if not counting vibrations, errors or allowances.

The motion mechanism 104 of the cooking container unloading mechanism is able to brake the motion of the said first support component 226 relative to the said second support component 175 when the said first support component 226 is moved to the first position or second position relative to the said second support component 175.

It should be noted that when the proximity switch 91B senses the target 137a or 137b, the cam 134 are rotated to a corresponding potion that the shaft 231 is constrained by one of the circular profiles of the curved track of the cam 134. At this time the computer 901 sends signals to the motor 92B to control the rotation of the motor 92B. Thus, the rotation of the first support component 226 around the axis of the shaft 162 may be braked by the motion mechanism 104.

It should be noted that the above discussed cooking container unloading mechanism in the cooking apparatus 120 may be substituted by an unloading mechanism comprising: the shaft 162 which is rigidly connected with the first support component 226; the concentric bearing housings 228a and 228b which are rigidly connected with the second support component 175; bearings (and accessories) configured to connect the shaft 162 and the bearing housings 228a and 228b; a motor comprising a base component and a shaft wherein the base component is fixedly connected with the second support component 175, and whose shaft is connected to the shaft 162 by a coupling, so that a rotation of the shaft of the said motor induces a simultaneous rotation of the shaft 162. The said motor is configured to drive a rotation of the shaft 162 between a first and a second end position relative to the second support component 175, and hence the first support component 226 is rotated between the first and the second end position relative to the second support component 175. Furthermore, the motor may comprise a built-in braking mechanism configured to brake the rotation of the shaft of the motor, and hence the rotation of the shaft 162 is braked or stopped when the first support component 226 is at the first end position, and when the stirring motion mechanism in the sub-apparatus 110 is producing a motion in the cooking container 100. The motor may be a DC motor, in which case the braking mechanism of the motor may comprise the electric braking of the following types: rheostatic or dynamic braking; plugging or reverse current braking; regenerative braking, etc.

Alternatively, any of the above discussed braking mechanisms of the cooking apparatus 120 may be substituted by a mechanism comprising a C-face power-off brake, or C-face power-off brake with heavy duty enclosures, or double C-face power-off brakes, pneumatic or hydraulic brakes, shaft mounted brake, tooth brake, trailer brake, clutch brake, centrifugal brake, or caliper brake, etc. Any known braking technique may be used here to substitute the braking mechanism in the cooking apparatus 120.

Referring to FIGS. 5A-5B, a food container 182 in the shape of a bowl is configured to contain a cooked food. The interior surface of the food container 182 comprises an interior flat bottom surface 182a in the shape of a circle, a side surface 182c of conical shape, and a smooth surface 182b between the flat bottom 182a and the side surface 182c. The smooth surface 182b may be a part of a toroidal surface. The exterior surface of the food container 182 comprises a cylindrical surface 182e, a planar ring 182f, a side surface 182g of conical shape, a ring-shaped surface 182h, and an exterior bottom surface 182i. The bottom surface 182i has a flat part in the shape of a circle. The axes of the conical surfaces 182c and 182g, and the axis of the cylindrical surface 182e are configured to coincide with each other. The axis of the conical surface 182c (or 182g) is called the axis of the food container 182. The bottom surfaces 182a and 182i are configured to be perpendicular to the axis of the food container 182. The food container 182 is said to be positioned upright, if the axis of the food container 182 is positioned vertically, and the exterior bottom surface 182i is lower than the interior bottom surface 182a. The food container 182 is configured to hold a cooked food when the food container 182 is positioned upright. The lowest point of the food container 182, when positioned upright, lies in the ring-shaped surface 182h.

Although this is not a strict requirement, the food container 182 may be configured to be rotationally symmetric around the axis of the food container 182.

Referring to FIGS. 5C-5F, a receiving apparatus 310 comprises a plurality of food containers 182, a turntable 183, a funnel 181, a water passage 184 configured to pass waste water and a support component 186. The water passage 184 is rigidly connected to the turntable 183. The support component 186 is configured to reinforce the rigidity of the funnel 181. The receiving apparatus 310 also comprises a cyclic transport mechanism 107; wherein the cyclic transport mechanism 107 comprises a Geneva drive mechanism 106, a support component 185 and a motor 92C comprising a base component and a shaft, wherein the Geneva drive mechanism 106 drives an intermittent rotation of the turntable 183; wherein the motion of the driving wheel of the Genera mechanism 106 is produced by the motor 92C. The driven wheel of the Geneva drive mechanism comprises a cam 1061 which is configured to be rigidly connected with the turntable 183 (see FIG. 5D). The support component 186 may be rigidly connected to the support component 185 of the cyclic transport mechanism 107 (but the connection is not shown in figures) (see FIGS. 5D-5F). Both the driving wheel and driven wheel of the Geneva drive mechanism 106 of the cyclic transport mechanism 107 are constrained to rotate relative to the support component 185, wherein the axes of the rotations are configured to be vertical. Thus, the turntable 183 is rotatable around a vertical axis relative to the support component 185. As the motor 92C rotates one round (360 degrees), the turntable 183 are rotated synchronously by a fixed angle. This may be called a period of the intermittent motion.

The receiving apparatus 310 further comprises a plurality of container holders 188 each comprising: a horizontal board 188a in the shape of a circle, a ring 188b with a vertical axis, and a plurality of connectors 188c configured to rigidly connect the ring 188b and the horizontal board 188a (also see FIG. 5C). The container holders 188 are configured to be rigidly attached to the top of the turntable 183. A food container 182 in the upright position may be placed on a container holder 188, so that the bottom of the food container 182 may touch the horizontal board 188a, and the exterior surface 182g of the food container 182 may be (touched and/or) restrained by the ring 188b of the container holder 188. The container holders 188 and the water passage 184 may be cyclically moved in an intermittent rotation with the turntable 183 by the cyclic transport mechanism 107 which is driven by the motor 92C.

Figure 5D:
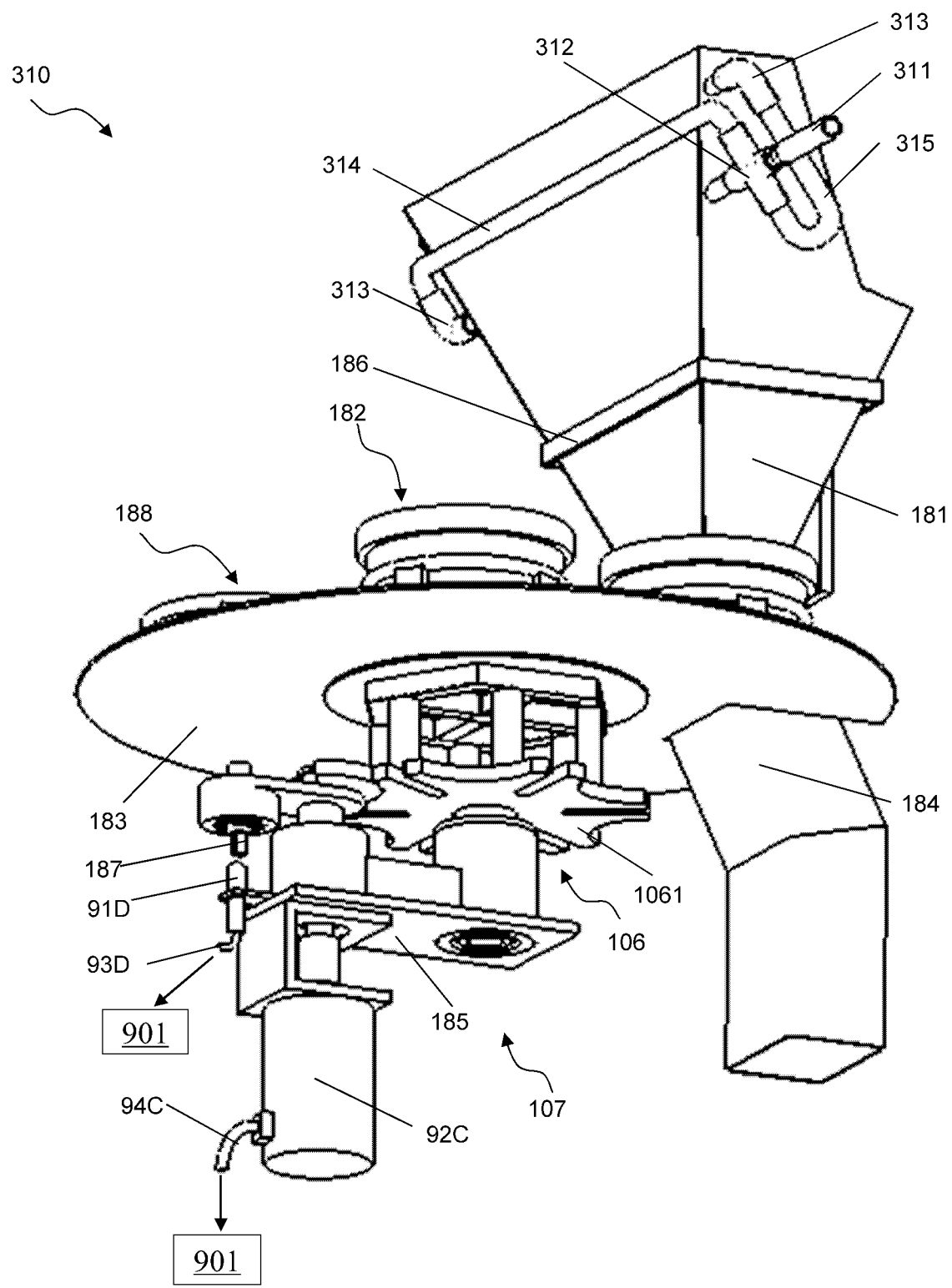
FIGS. 5D-5F show aerial views of a receiving apparatus comprising a plurality of container holders on a rotatable turntable.
Figure 5E:
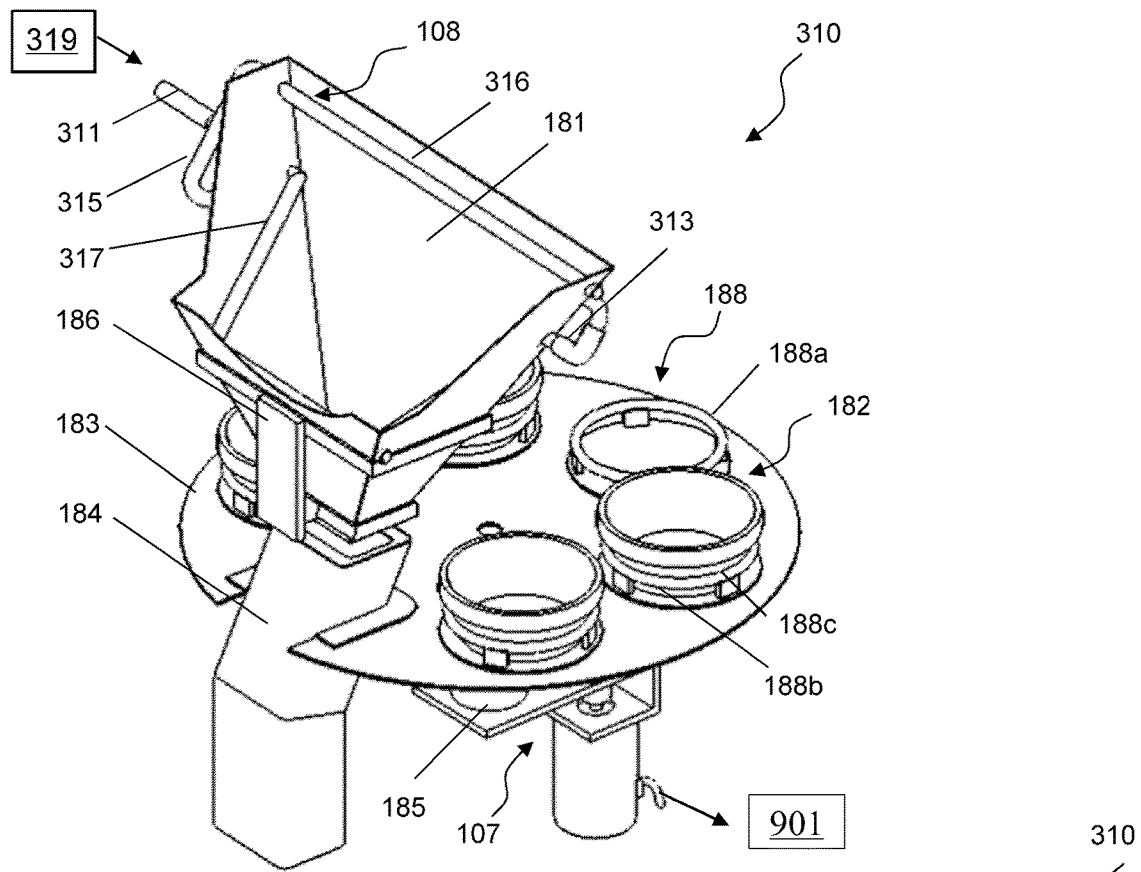
Figure 5F:
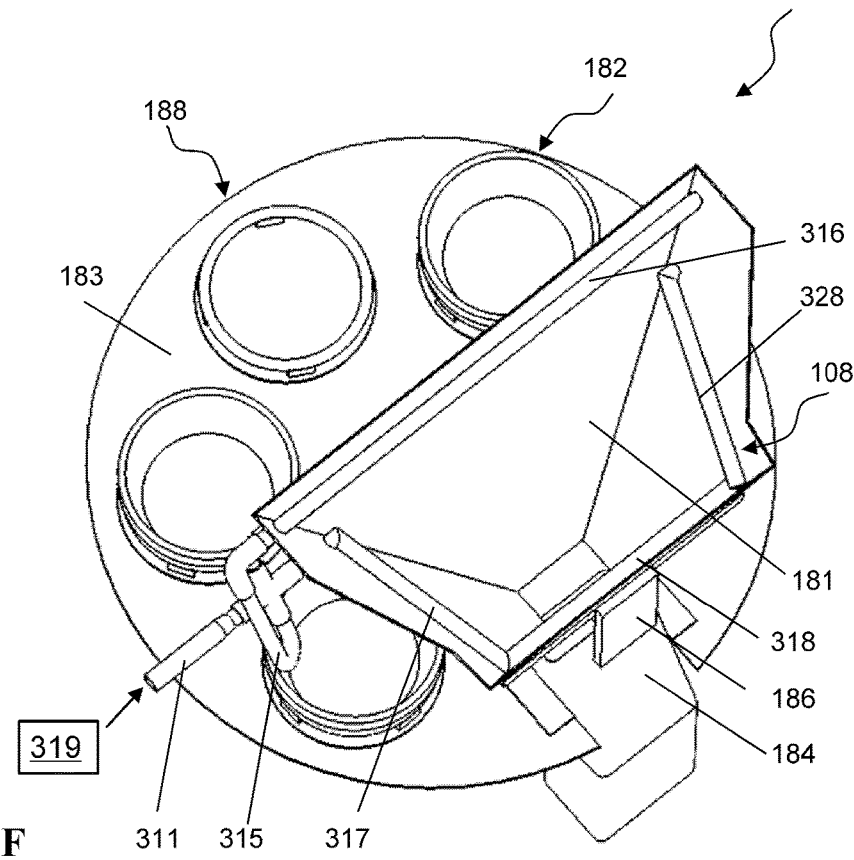

The receiving apparatus 310 also comprises a proximity switch 91D which is fixedly connected to the support component 185 via a connector, and a target 187 which is rigidly connected to a crank of the Geneva mechanism 106 of the cyclic transport mechanism 107. As shown in FIG. 5D, the motor 92C of the cyclic transport mechanism 107 is connected to the computer 901 via wires 94C. The computer 901 may be configured to dynamically control the timing and/or speed of the motor 92C. The proximity switches 91D are also connected to the computer 901 via wires 93D, so the computer 901 may receive electric or electronic signals from the proximity switch 91D. The proximity switch 91D senses the target 187 when the target is rotated with the crank of the Geneva mechanism 106. Each time the proximity switch 91D senses the target 187 and the electric or electronic signals of the proximity switch 91D are sent to the computer 901, the computer 901 can figure out the position of the target 187, and the position of the turntable 183. Then the computer 901 would send signals to the motor 92C as to control the rotation of the motor 92C. At each stop of the intermittent rotation, either a food container 182 or the water passage 184 may be positioned below the funnel 181.

The receiving apparatus 310 also comprises a water spray mechanism 108 comprising water pipes 311, 314, 315, 316, 317, 318, 328; connectors 312 and 313 etc. The water pipes 316, 317, 318 and 328 are configured to be fixedly attached on the inner of the funnel 181. All water pipes of the water spray mechanism 108 are configured to be connected to each other by a plurality of pipe connectors 313 and 312, so that water may flow from one pipe to another. The water spray mechanism 108 also comprises a water source 319 configured to flow water to the water pipe 311. The water source 319 may comprise a water heater connected to tap water, similar as a typical home water heater. Each of the water pipes 316, 317, 318 and 328 of the water spray mechanism 108 comprises a plurality of small holes or water outlets into spray devices (not shown in figures) so that water may be sprayed out from the small holes and/or spray devices, as to clean the inner surface of the funnel 181. When the turntable 183 is stopped at the position when the water passage 184 is below the funnel 181, the water passage 184 is configured to receive waste water which may flow from the interior of the funnel 181, such as water from the said small holes and/or the spray devices. When the turntable 183 is stopped at any other position, a cooked food may be dropped from the interior of the funnel 181 into a food container 182 on a corresponding container holder 188. It should be noted that the water passage 184 is not rigidly connected to the funnel 181, as the funnel 181 is configured to be fixed relative to the support component 185, while the turntable 183 can be rotated.

It should be noted that a spray device discussed above may comprise a spray head.

Figure 6:
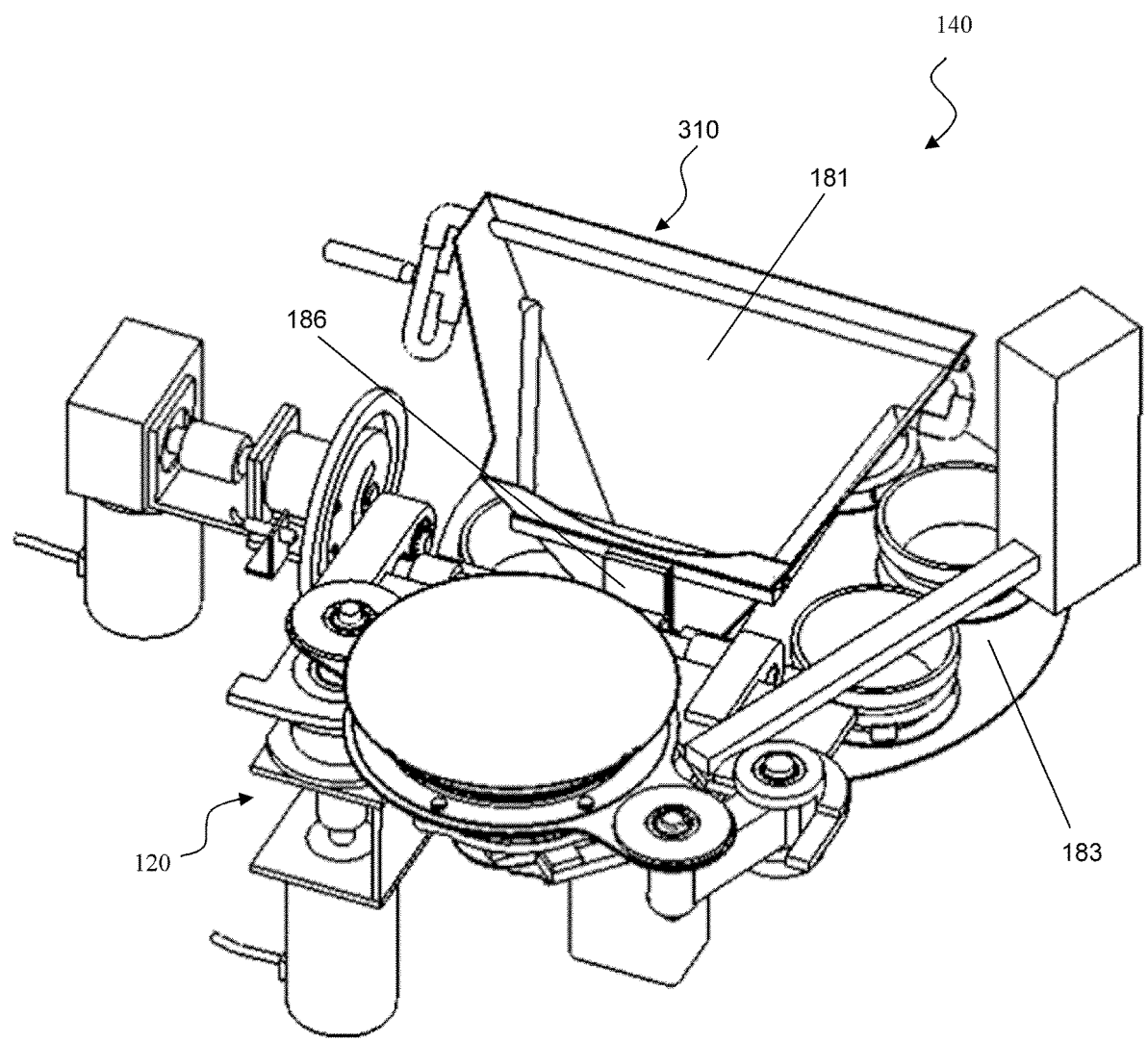
FIG. 6 shows an aerial view of a cooking sub-system comprising the receiving apparatus shown in FIGS. 5D-5F.

Referring to FIG. 6, a cooking sub-system 140 comprises the cooking apparatus 120 and the receiving apparatus 310. The support component 185 in the receiving apparatus 310 is configured to be rigidly or fixedly connected to the support component 175 of the cooking apparatus 120 (the connectors are not shown in figure). Since the first support component 226 of the cooking apparatus 120 is rotated from the first end position to the second end position, a cooked food or waste water in the cooking container 100 may be unloaded into the interior of the funnel 181, as to be dispensed into a food container 182 or respectively the water passage 184. It should be noted that waste water may be present in the cooking container 100 after a cleaning using water, as discussed below.

Referring to FIGS. 7A-7C, a braking mechanism 103 comprises: a shaft 141 and an eccentric shaft 143 which are rigidly connected to each other (see FIG. 7A); a slider 151 in the shape of a board, comprising a slotted hole 151c and two ending parts 151a and 151 b with rectangular cross sections (see FIG. 7B). The braking mechanism 103 further comprises: a support component 147; L-shaped rigid components 153 and 154 each of which comprises a horizontal side and a vertical side with a rectangular hole in the vertical side (see FIG. 7C). The L-shaped rigid component 153 is rigidly connected with the support component 147. The L-shaped rigid component 154 may be fixedly connected with the support component 147 by bolts and nuts (not shown in figures). The ending parts 151a and 151b of the slider 151 are configured to be separately inserted through the rectangular holes of the L-shaped rigid components 153 and 154, so that the slider 151 may be constrained to slide linearly relative to the support component 147, in a horizontal direction in a certain range.

The braking mechanism 103 also comprises a bearing housing 148, a motor 92D comprising a base component and a shaft, a connecting component 145 and a coupling 146. The bearing housing 148 is rigidly connected to the support component 147 wherein the axis of the bearing housing 148 is configured to be vertical. A pair of bearings (hidden in figure) are configured to connect the shaft 141 and the bearing housing 148, so that the shaft 141 is constrained to rotate relative to the bearing housing 148, around the axis of the shaft 141, and thus the eccentric shaft 143 is constrained to rotate around the axis of the shaft 141. A wheel 152 is mounted on the eccentric shaft 143 and is concentric with the shaft 143, such that the wheel 152 is constrained to rotate freely relative to the shaft 143, around the axis of the shaft 143. Furthermore, the wheel 152 is configured to be positioned in the slotted hole 151c, so that the eccentric rotation of the eccentric shaft 143 around the axis of the shaft 141 may induce a back and forth sliding movement of the slider 151. The base component of the motor 92D is mounted on the connecting component 145, and the connecting component 145 is rigidly connected to the support component 147. The shaft of the motor 92D is connected to the shaft 141 by the coupling 146. Thus, the motor 92D may drive a rotation of the shaft 141 around the axis of the shaft 141, and hence the eccentric shaft 143 is eccentric rotated, around the axis of the shaft 141. Thus, the slider 151 is moved linearly back and forth relative to the support component 147.

The braking mechanism 103 also comprises two proximity switches 91E and 91F, a connector 191 in the shape of a board and a target 179 which is rigidly connected to the ending part 151b of the slider 151. The proximity switches 91E and 91F are fixedly connected to the L-shaped component 154 (or equivalently, relative to the support component 147) via the connector 191. As shown in FIG. 7C, the motor 92D is connected to the computer 901 via wires 94D. The computer 901 may be configured to dynamically control the timing and/or speed of the motor 92D. The proximity switches 91E and 91F are also connected to the computer 901 separately via wires 93E and 93F, so the computer 901 may receive electric or electronic signals from the proximity switches 91E and 91F. When the slider 151 is slid to a first end position (or a second end position) wherein the proximity switch 91F (or respectively 91E) is configured to monitor the target 179, the electric or electronic signals are sent to the computer 901. The computer 901 can figure out the position of the target 179, and the position of the slider 151. Then the computer 901 may send signals to the motor 92D as to stop the rotation of the motor 92D to stop for a time period during which the braking mechanism 103 may complete a corresponding process. After this time period, the motor 92D, under the control of the computer 901, may restart again and rotate the slider 151 to the second end position or respectively the first end position It should be noted that the axis of the shaft 141 and the axis of the shaft 143 in the braking mechanism 103 are configured to be parallel to each other. The distance between the two parallel axes may be at least half of the range of motion of the slider 151.

Figure 8A:
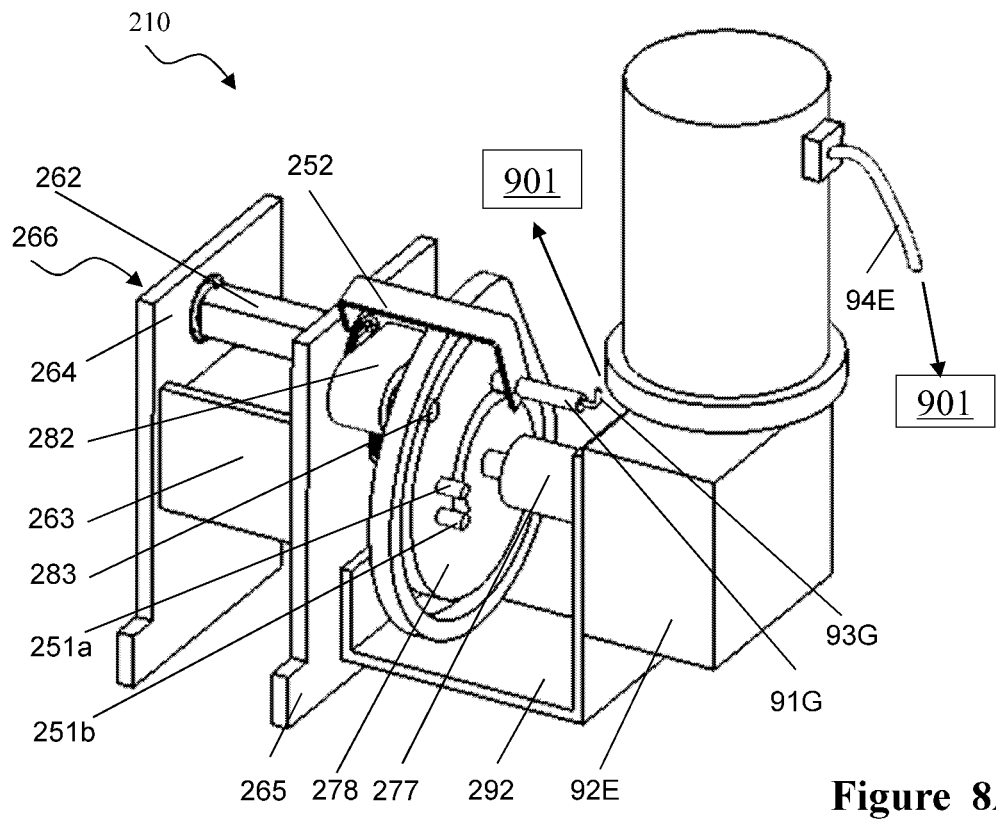
FIGS. 8A-8B show aerial views of a motion mechanism.
Figure 8B:
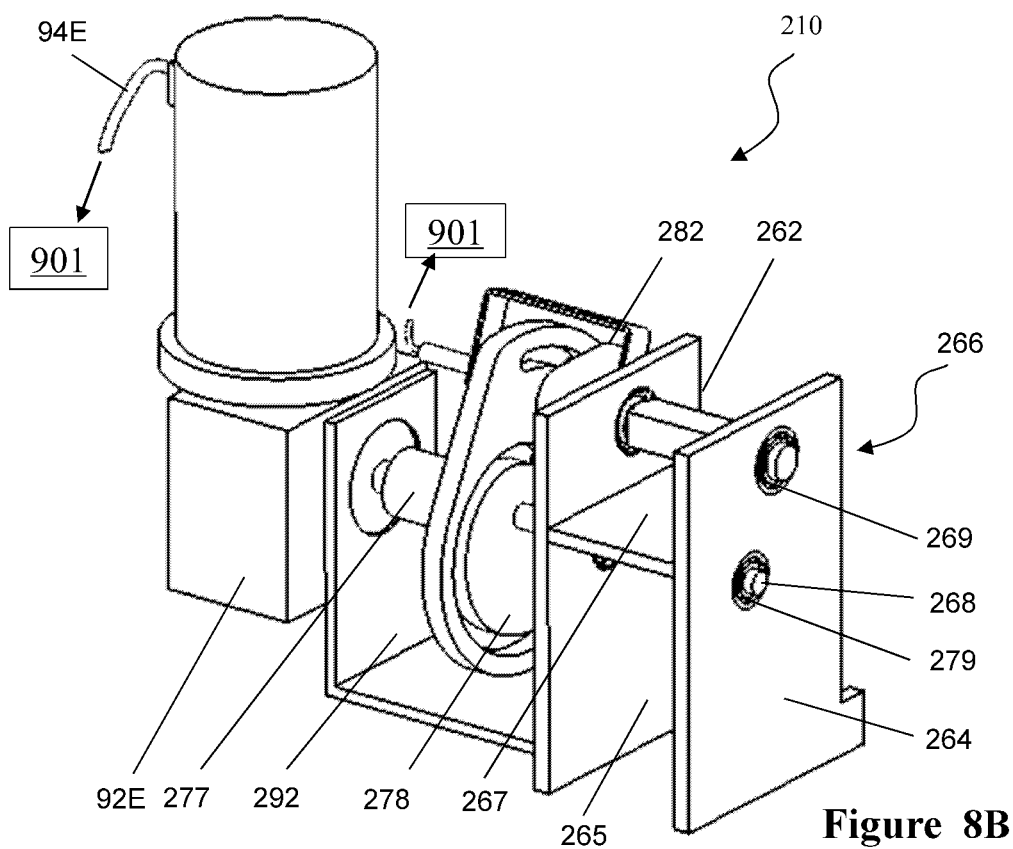

In some embodiments referring to FIGS. 8A-8B, a motion mechanism 210 comprises: a support component 266 comprising vertical boards 264, 265, 263 and a horizontal board 267; two shafts 262 and 268. The vertical board 263 and the horizontal board 267 are configured to rigidly connect the vertical boards 264 and 265. The support component 266 may be referred to as a support component of the motion mechanism 210. Each of the vertical boards 264 and 265 comprise a first bearing housing, and a second bearing housing. The axes of the first bearing housings of the vertical boards 264 and 265 are configured to be the same and the axes of the second bearing housings of the vertical boards 264 and 265 are also configured to be the same. The shaft 262 is partially round shaped and partially rectangular shaped. A bearing 269 is configured to connect (a round part of) the shaft 262 with the first bearing housing of the vertical board 264, and another bearing 269 is configured to connect (another round part of) the shaft 262 with the first bearing housing of the vertical board 265, so that the shaft 262 is constrained to rotate relative to the vertical boards 264 and 265 (or equivalently, relative to the support component 266), around the axis of the shaft 262. A bearing 279 is configured to connect the shaft 268 with the second bearing housing of the vertical board 264, and another bearing 279 is configured to connect the shaft 268 with the second bearing housing of the vertical board 265, so that the shaft 268 is constrained to rotate relative to the vertical boards 264 and 265 (or equivalently relative to the support component 266), around the axis of the shaft 268.

The motion mechanism 210 further comprises: a cam 278 comprising a curved hole; a connector 282; a shaft 283; a motor 92E comprising a shaft and a base component; a connecting component 292 configured to fixedly connect the base component of the motor 92E to the vertical board 265; and a coupling 277. The shaft 262 is configured to rigidly connected to the connector 282. The connector 282 may comprises a bearing housing (although this is not strict requirement) which is used to connect with the shaft 283 by a pair of bearings. Thus, the connector 282 and the shaft 283 are constrained to rotate relative to the support component 266 around the axis of the shaft 262 as well as the shaft 262. It should be noted that the axes of the shafts 262 and 283 are configured to be parallel to each other. The cam 278 is rigidly connected to the shaft 268 and the curved hole of the cam 278 is configured to constrain the shaft 283. The shaft of the motor 92E is joined with the shaft 268 via the coupling 277. Thus, the motor 92E may drive the rotation of the shaft 268 around the axis of the shaft 268, hence the cam 278 is rotated around the axis of the shaft 268. Since the curved hole of the cam 278 constrains the shaft 283, the rotation of the cam 278 produces a motion of the shaft 283, i.e., a rotation around the axis of the shaft 262, hence the shaft 262 is rotated around the axis of the shaft 262.

It should be noted that the curved hole in the cam 278 is modelled on a "modeling curve" comprised of a union of a middle curve and two ending curves, wherein the ending curves are arcs of two circles centered at the axis of the shaft 268. The shaft 283 (as a wheel) is constrained by the edges in the curved hole in the cam 278, by touching between the shaft 283 and the edges in the curved hole. When the shaft 283 touches the part of the edges corresponding to the ending curves, the shaft 283 may be static when the cam 278 is rotated. The modeling curve is configured to have continuously varying tangents (i.e. no sharp turns on the curve); and a smooth rotation of the cam 278 produces a motion in the shaft 283 with limited acceleration.

The motion mechanism 210 also comprises a proximity switch 91G; a connecting component 252 configured to fixedly connect the proximity switch 91G to the vertical board 265 of the support component 266; and two targets 251*a* and 251*b* both of which are joined with the cam 278. As shown in FIGS. 8A-8B, the motor 92E is connected to the computer 901 via wires 94E. The computer 901 may be configured to dynamically control the timing and/or speed of the motor 92E. As shown in FIG. 8A, the proximity switch 91G is also connected to the computer 901 via wires 93G, so the computer 901 may receive electric or electronic signals from the proximity switch 91G. The proximity switch 91G monitors the targets 251*a* and 251 *b* when the targets are rotated with the cam 278. When the cam 278 is rotated to a first position (or second position) where the proximity switch 91G senses the target 251*a* (or respectively 251*b*), the electric or electronic signals are sent to the computer 901, the computer 901 can figure out the position of the target, and the position of the cam 278. Then the computer 901 may send signals to the motor 92E as to stop the rotation of the motor 92E for a time period during which the motion mechanism 210 can complete a corresponding process. After this time period, the motor 92E, under the control of the computer 901, may restart again and rotate the cam 278 to the second position or respectively the first position It should be noted that the width of the curved hole in the cam 278 may be configured to be equal to or slightly larger than the diameter of the shaft 283.

Figure 8C:
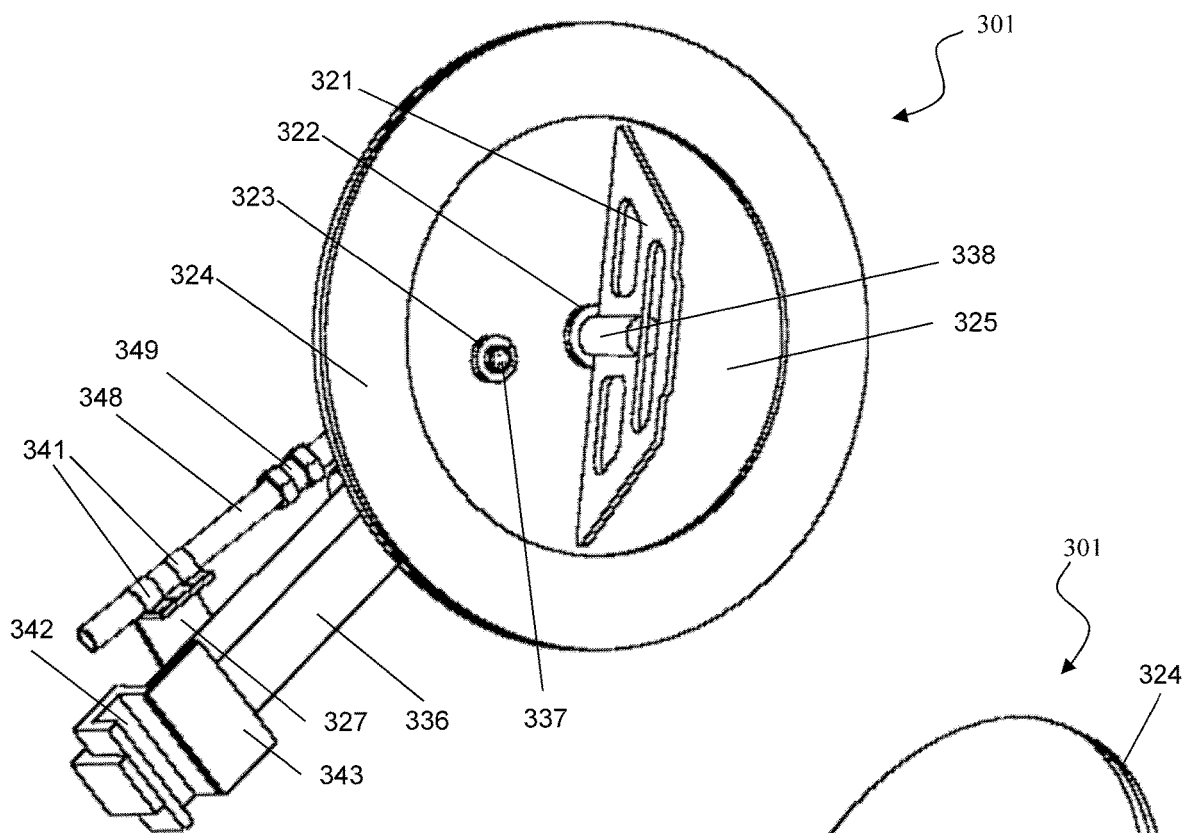
FIGS. 8C-8D show aerial views of a cleaning sub-apparatus.
Figure 8D:
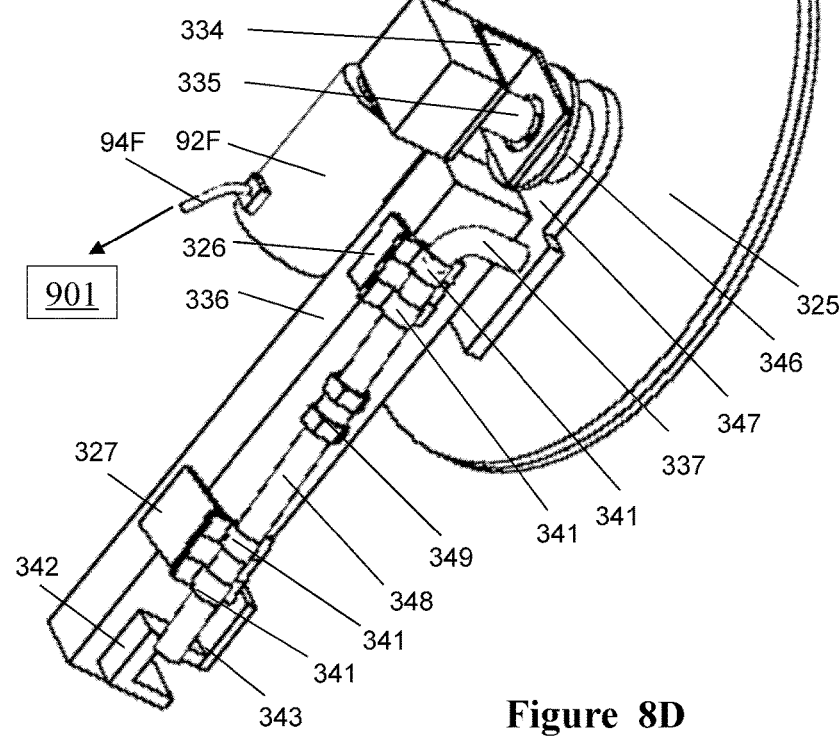

Referring to FIGS. 8C-8D, a cleaning sub-apparatus 301 comprises: a rigid component 336; a cover 325 comprising a round hole at center; a connector 347 in the shape of a board; a bearing housing 346 rigidly connected to the connector 347; a shaft 338; a rigid component 343 in the shape of a board; and a C-face component 342. Both of the rigid component 343 and the C-face component 342 are configured to rigidly connect to the rigid component 336. The connector 347 is configured to rigidly connect the cover 325 to the rigid component 336 and the axis of the cover 325 is concentric with the axis of the bearing housing 346. The shaft 338 is configured to insert through of the round hole of the cover 325 and connect with the bearing housing 346 via a pair of bearings (hide in figures), so that the shaft 338 is constrained to rotate relative to the bearing housing 346 (or equivalently relative to the rigid component 336), around the axis of the shaft 338. The cleaning sub-apparatus 301 further comprises: a waterproof component 321 in the shape of a board wherein the waterproof component 321 comprises a plurality of holes; a motor 92F comprising a shaft and a base component; a connecting component 334 and a coupling 335. The waterproof component 321 is rigidly connected with the shaft 338 so that the waterproof component 321 is constrained to rotate relative to the rigid component 336 around the axis of the shaft 338 as well as the shaft 338. It should be noted that waterproof component 321 are configured to be cyclically symmetric under the rotation of 180 degrees around the central axis of the shaft 338. The base component of the motor 92F is fixedly connected to the flange of the bearing housing 346 via the connecting component 334 and the shaft of the motor 92F is joined with the shaft 338 by the coupling 335. Thus, the motor 92F may drive a rotation of the shaft 338 relative to the rigid component 336 around the axis of the shaft 338, hence the waterproof component 321 is rotated relative to the rigid component 336 around the axis of the shaft 338. It should be noted that the rigid component 336 may be referred to as the support component of the cleaning sub-apparatus 301.

It should be noted that the motor 92E is connected by wires 94E to the computer 901, so that the computer 901 may control the timing and speed of the rotation of the motor 92E.

The cleaning sub-apparatus 301 also comprises: water pipes 337 and 348; connecting components 326 and 327 both of which are configured to rigidly connect to the rigid component 336; seals 322, 323 and 324 which may be made of an elastic material, such as rubber or silica gel; and a check valve 349. The water pipes 337 and 348 are connected to each other by the check valve 349 and the water pipe 337 is inserted through the cover 325 with an outlet next to the cover 325, wherein the check valve 349 is configured to allow the water to flow from the pipe 348 to the pipe 337 and limit the water flowing from the pipe 337 to the pipe 348. A plurality of connectors 341 are configured to fixedly connect the pipes to the connecting components 326 and 327. Thus, the pipes 337 and 348 are fixed relative to the rigid component 336. The seals 322 and 323 are used to separately seal the space between the shaft 338 and the cover 325 and the space between the water pipe 337 and the cover 325, as to limit the water flow through the said spaces. The seal 324 in the shape of a ring is attached on the cover 325, wherein the external diameter of the seal 324 is equal to that of the cover 325, wherein the axis of the seal 324 is concentric with the cover 325.

Figure 8E:
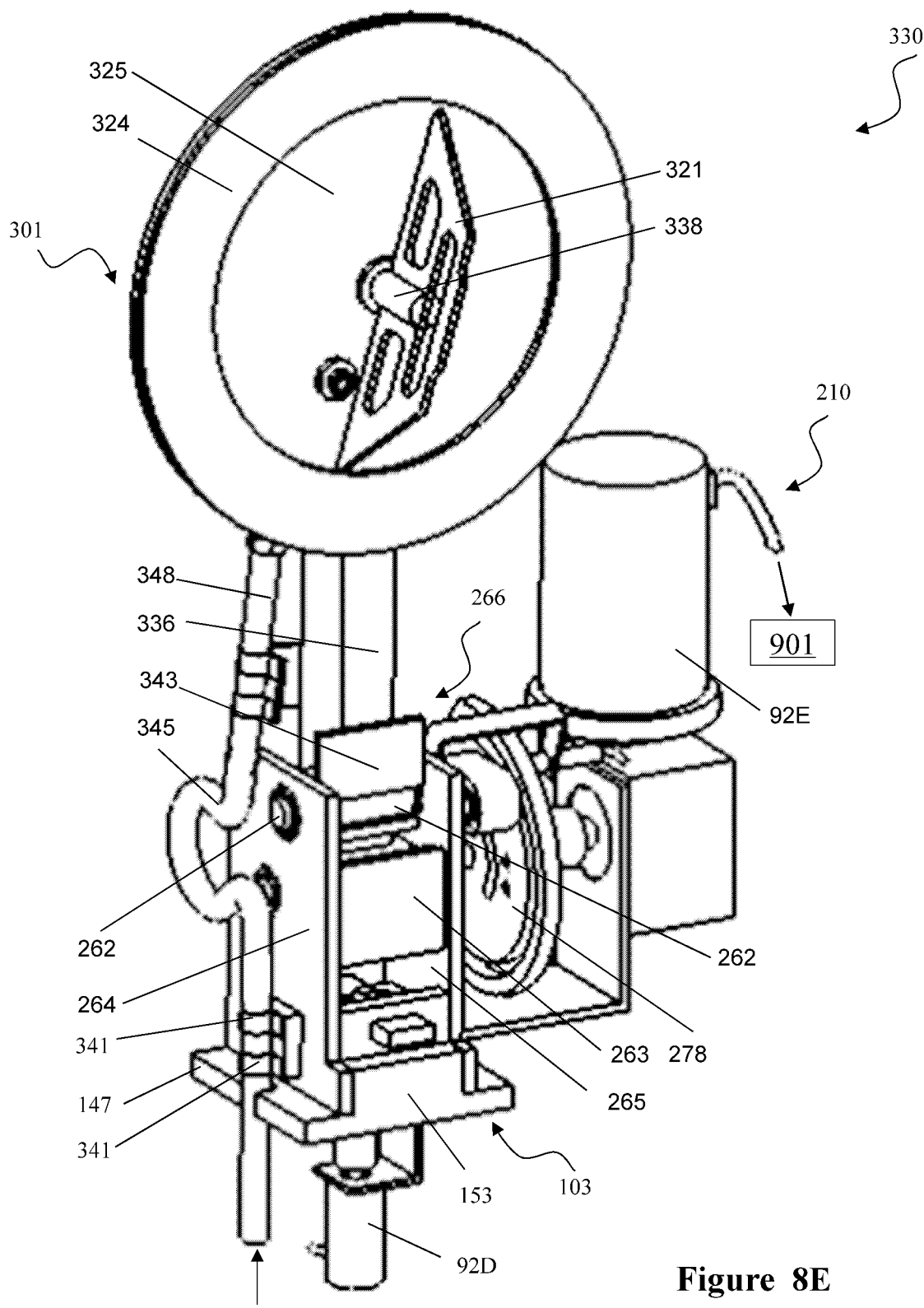
FIG. 8E shows an aerial view of a cleaning apparatus.

Referring to FIG. 8E, a cleaning apparatus 330 comprises the braking mechanism 103, the motion mechanism 210 and the cleaning sub-apparatus 301. The vertical boards 264 and 265 of the support component 266 of the motion mechanism 210 are configured to be rigidly connected to the support component 147 of the braking mechanism 103. The shaft 262 of the motion mechanism 210 is configured to be rigidly connected to the C-face component 342 of the cleaning sub-mechanism 301, with the rectangular part of the shaft 262 inserted in the groove of the C-face component 342. Thus, the motion mechanism 210 may drive a rotation of the rigid component 336 of the cleaning sub-apparatus 301 relative to the support component 266 of the motion mechanism 210, around the axis of the shaft 262. When the rigid component 336 is rotated to the position when the rigid component 343 of the cleaning sub-apparatus 301 touches the top edge of the vertical board 263 of the motion mechanism 210, the rigid component 336 is stopped from rotating and the vertical board 263 functions as a physical barrier for the motion of the rigid component 336; wherein the position will be called the first end position of the rigid component 336 relative to the support component 266. In fact, the rotation of the rigid component 336 may also be braked by the motion mechanism 210 at both end positions. As explained, the curve profile of the curved track of the cam 278 comprises a circular arc at either end; wherein each circular arc is part of a circle centered at the axis of the shaft 268. When the shaft 283 is constrained by the curved track in the part corresponding to one of the circular arcs, the rigid component 336 and the shaft 268 may be rotated to the first end position. When the shaft 283 is constrained by the curved track in the part corresponding to the other circular arcs, the rigid component 336 and the shaft 268 may be rotated to the other end position. During the said two situations, the axis of the shaft 283 is not moved even if the cam 278 is rotated around the axis of the shaft 268. The cam 278 may then be used as a braking device for the motion of the axis of the shaft 283 around the axis of the shaft 268, under the condition that the cam 278 is not forcefully moved by the motor 92E from a still position. In fact, the axis of the shaft 283 does not move, even if the cam 278 is slightly moved; the ratio of the speed of the rotational motion of the axis of the shaft 283 and the speed of the rotational motion of the cam 278 is zero, or equivalently, the ratio of the speed of the rotational motion of the cam 278 and the speed of the rotational motion of the axis of the shaft 283 is infinity. If the axis of the shaft 283 is not moved, then the rigid component 336 cannot be rotated around the axis of the shaft 262, if not counting vibrations, errors or allowances.

The cleaning apparatus 330 also comprises a water pipe 345 which is attached on the vertical board 264 by some connectors 341. The water pipes 345 and 348 are connected to each other so that water may flow from one to the other. The water pipe 345 may be connected to a water source with a shut-off valve, and so that water may pass from the water source to the outlet next to the cover 325. The water source may comprise a water heater connected to tap water.

It should be noted that the motor 92E may or may not have a brake.

It should be noted that the angle of rotation of the rigid component 336 from the first end position to the second end position is a constant (often configured to be between 80 degrees to 120 degrees).

It should be noted that when the proximity switch 91G senses the target 251a or 251b, the rigid component 336 is rotated to the first end position or second end position and the shaft 283 is constrained by one of the circular profiles of the curved track of the cam 278. At this time the computer 901 would send signals to the motor 92E as control the rotation of the motor 92E according to the electric or electronic signals of the proximity switch 91G. Thus, the rotation of the rigid component 336 around the axis of the shaft 262 may be braked by the motion mechanism 210.

It should be noted that the support component 147 may be referred to as the support component of the cleaning apparatus 330.

It should be noted that the shut-off valve in the cleaning apparatus 330 may also be controlled by the computer 901.

The rigid component 336 will be referred to as a first support component of the cleaning apparatus 330. The support component 147 will be referred to as a second support component of the cleaning apparatus 330.

It should be noted that the cleaning apparatus 330 comprises the following:

(1) the cleaning device comprising waterproof component 321, the shaft 338, wherein the waterproof component 321 is rigidly connected to the shaft 338;

(2) a cleaning motion mechanism referred to as the first motion mechanism configured to produce a rotation of the cleaning device relative to the first support component 336, the cleaning motion mechanism comprising the motor 92F, the connecting component 334, the coupling 335, the bearing housing 346 and their connections to other components;

(3) a back-and-forth motion mechanism referred to as the second motion mechanism, configured to produce a rotation of the first support component 336 relative to the second support component 147 between the first end position and the second end position, wherein the back-and-forth motion mechanism comprises the motion mechanism 210 and the fixed or rigid connection between the shaft 262 and the first support component 336;

(4) the braking mechanism 103 comprising the slider 151, bearing housing 148, L-shaped rigid components 153 and 154, support component 147, motor 92D, and their mutual connections, if any.

(5) a water dispensing mechanism comprising the water pipes 337 and 348, the water pipe 345, a water source with a shut-off valve, the check valve 349 and the connectors 341, wherein the water pipes 337 and 348 are configured to connected to each other by the check valve 349, and the water pipe 348 and the water pipe 345 are connected to each other, wherein the water pipe 345 is configured to connect the water source, wherein the water is allowed to flow from water source to the pipe 337 and limited in the opposition direction.

Figure 8F:
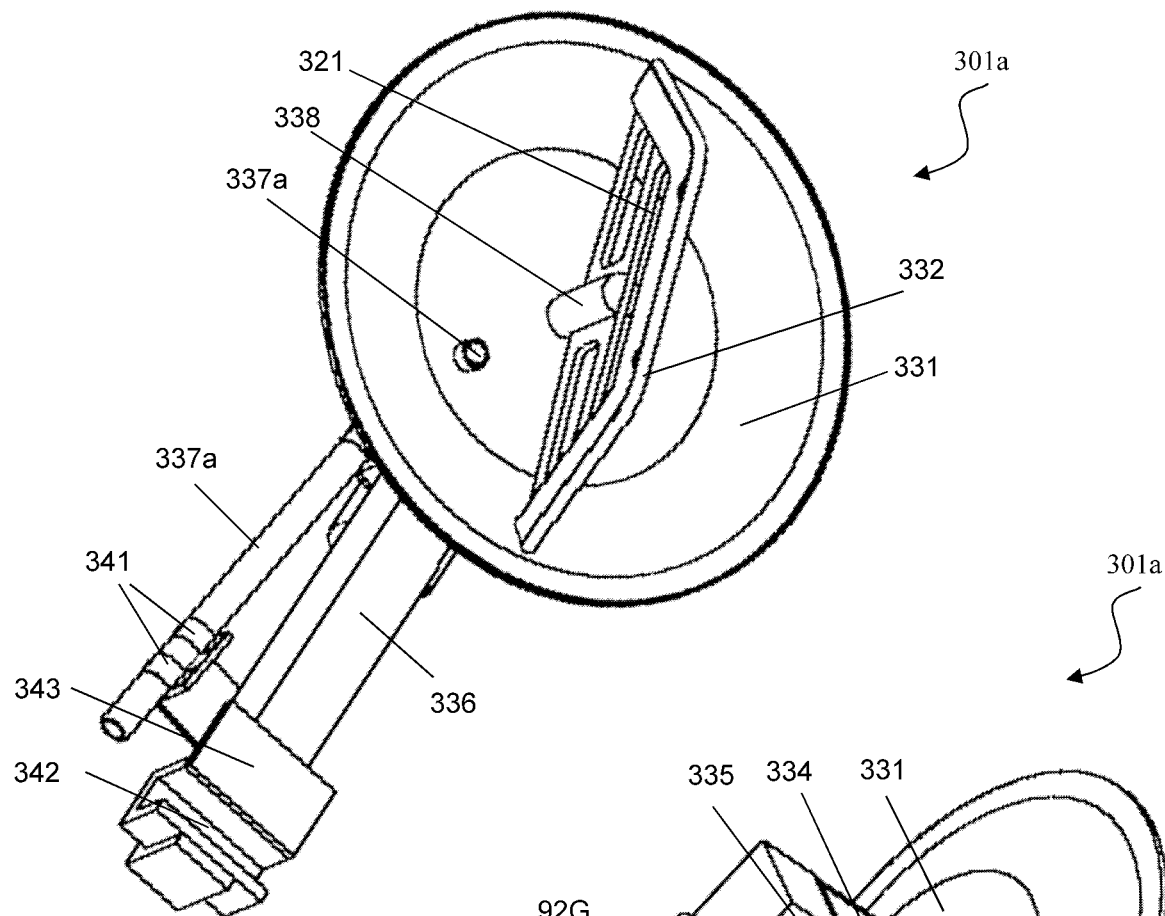
FIGS. 8F-8G show aerial views of another cleaning sub-apparatus.
Figure 8G:
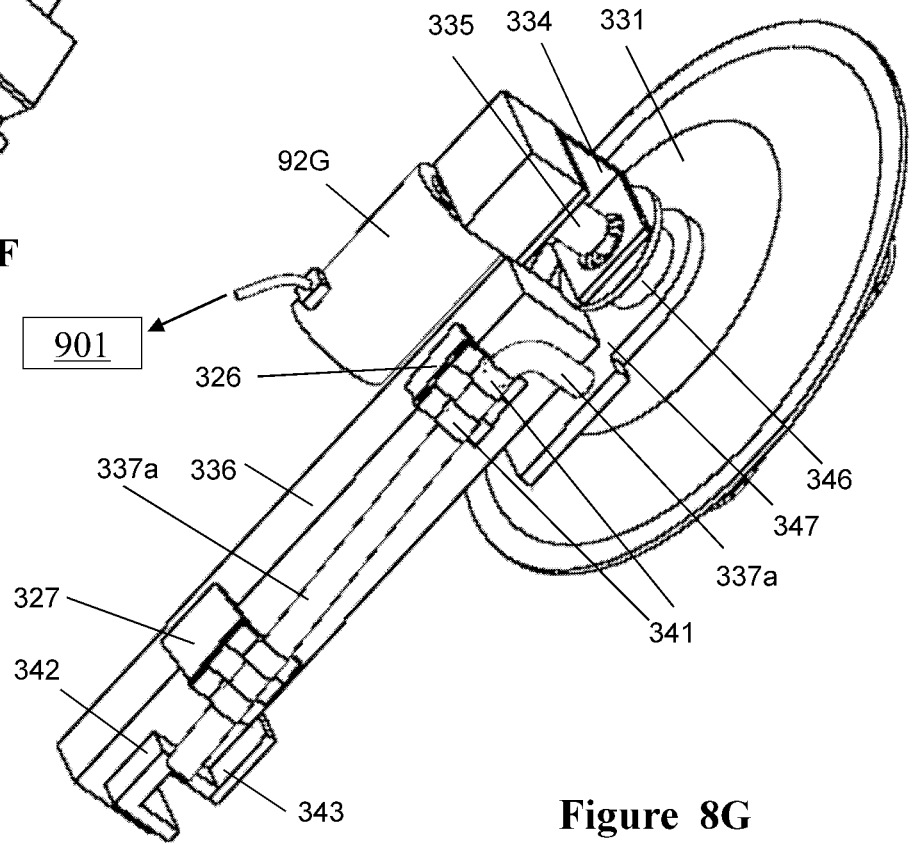

Referring to FIGS. 8F-8G, a cleaning sub-apparatus 301*a* is similarly constructed as the cleaning sub-apparatus 301. Indeed, the cleaning sub-apparatus 301*a* comprises the rigid component 336, the cover 331 comprising a round hole at center, the connector 347, the bearing housing 346, the shaft 338, the waterproof component 321, the rigid component 343, the C-face component 342, a motor 92G, the connecting component 334, the coupling 335, and their mutual connections (as in the cleaning sub-apparatus 301), if any. The cleaning sub-apparatus 301*a* also comprises cleaning sponges 332 which are fixed to the waterproof component 321. As the motor 92G rotates, the waterproof component 321 and cleaning sponges 332 also rotate relative to the bearing housing 346 (or equivalently, relative to the rigid component 336) around the axis of the shaft 338. It should be noted that the motor 92G is connected to the computer 901, so that the computer 901 may control the timing and speed of the rotation of the motor 92G.

The cleaning sub-apparatus 301*a* also comprises the water pipe 337*a*, connecting components 326 and 327, a plurality of connectors 341. Similarly, as the cleaning sub-apparatus 301, the connecting components 326 and 327, and the connectors 341 are configured to fix the pipe 337*a* relative to the rigid component 336, and the pipe 337*a* is inserted through the cover 331 with an outlet next to the cover.

It should be noted that the waterproof component 321 may be made from plastic or metal or alloy. It can be made from one material and coated with waterproof material such as Teflon.

Figure 8H:
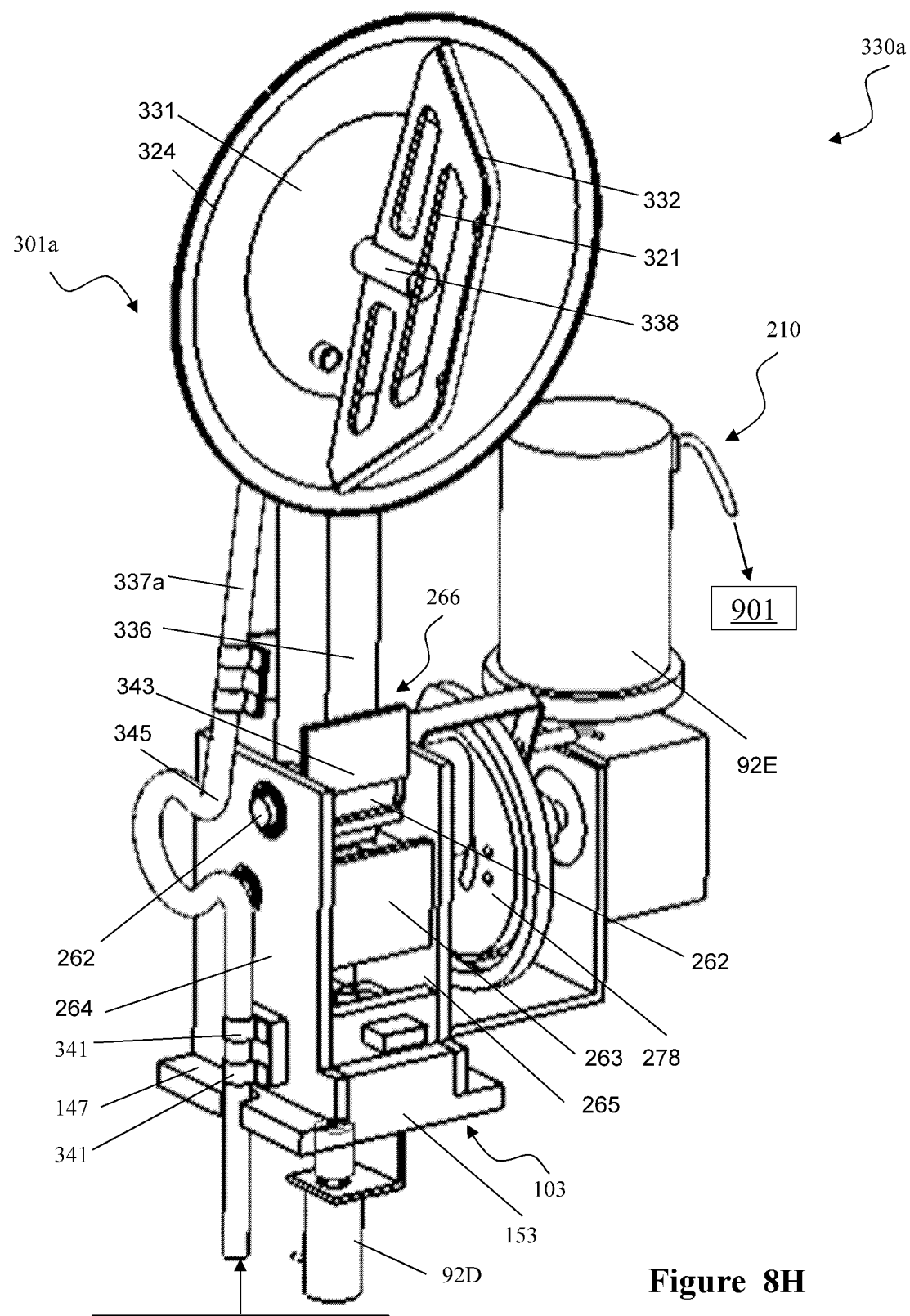
FIG. 8H shows an aerial view of another cleaning apparatus.

Referring to FIG. 8H, a cleaning apparatus 330*a* is constructed the same way as the cleaning apparatus 330 except that the cleaning sub-apparatus 301 is substituted by the cleaning sub-apparatus 301*a*. Indeed, the cleaning apparatus 330*a* comprises the braking mechanism 103, the motion mechanism 210 and the cleaning sub-apparatus 301*a* and their mutual connections (as in the cleaning apparatus 330). The vertical boards 264 and 265 of the support component 266 of the motion mechanism 210 are configured to fixedly or rigidly connect to the support component 147 of the braking mechanism 103. The shaft 262 of the motion mechanism 210 is configured to be rigidly connected to the C-face component 342 of the cleaning sub-mechanism 301*a*, with the rectangular part of the shaft 262 inserted in the groove of the C-face component 342. Thus, the motion mechanism 210 may drive a rotation of the rigid component 336 relative to the support component 266 of the motion mechanism 210 around the axis of the shaft 262.

The rigid component 336 will be referred to as a first support component of the cleaning apparatus 330*a*. The support component 147 will be referred to as a second support component of the cleaning apparatus 330*a*.

It should be noted that the cleaning apparatus 330*a* comprises the following:

(1) the cleaning device comprising the waterproof component 321, the shaft 338, wherein the waterproof component 321 is rigidly connected to the shaft 338;

(2) a cleaning motion mechanism referred to as the first motion mechanism configured to produce a rotation of the waterproof component 321 relative to the first support component 336, the cleaning motion mechanism comprising the motor 92F, the connecting component 334, the coupling 335, the bearing housing 346 and their connections to other components;

(3) a back-and-forth motion mechanism referred to as the second motion mechanism, configured to produce a rotation of the first support component 336 relative to the second support component 147 between the first end position and the second end position, wherein the back-and-forth motion mechanism comprises the motion mechanism 210 and the fixed or rigid connection between the shaft 262 and the first support component 336;

(4) the braking mechanism 103 comprising the slider 151, bearing housing 148, L-shaped rigid components 153 and 154, support component 147, motor 92D, and their mutual connections, if any.

(5) a water dispensing mechanism comprising the water pipes 337*a* and 345, a water source with a shut-off valve, and the connectors 341, wherein the water pipes are configured to connected to each other, wherein the water pipe 345 is configured to connect a water source.

Figure 9A:
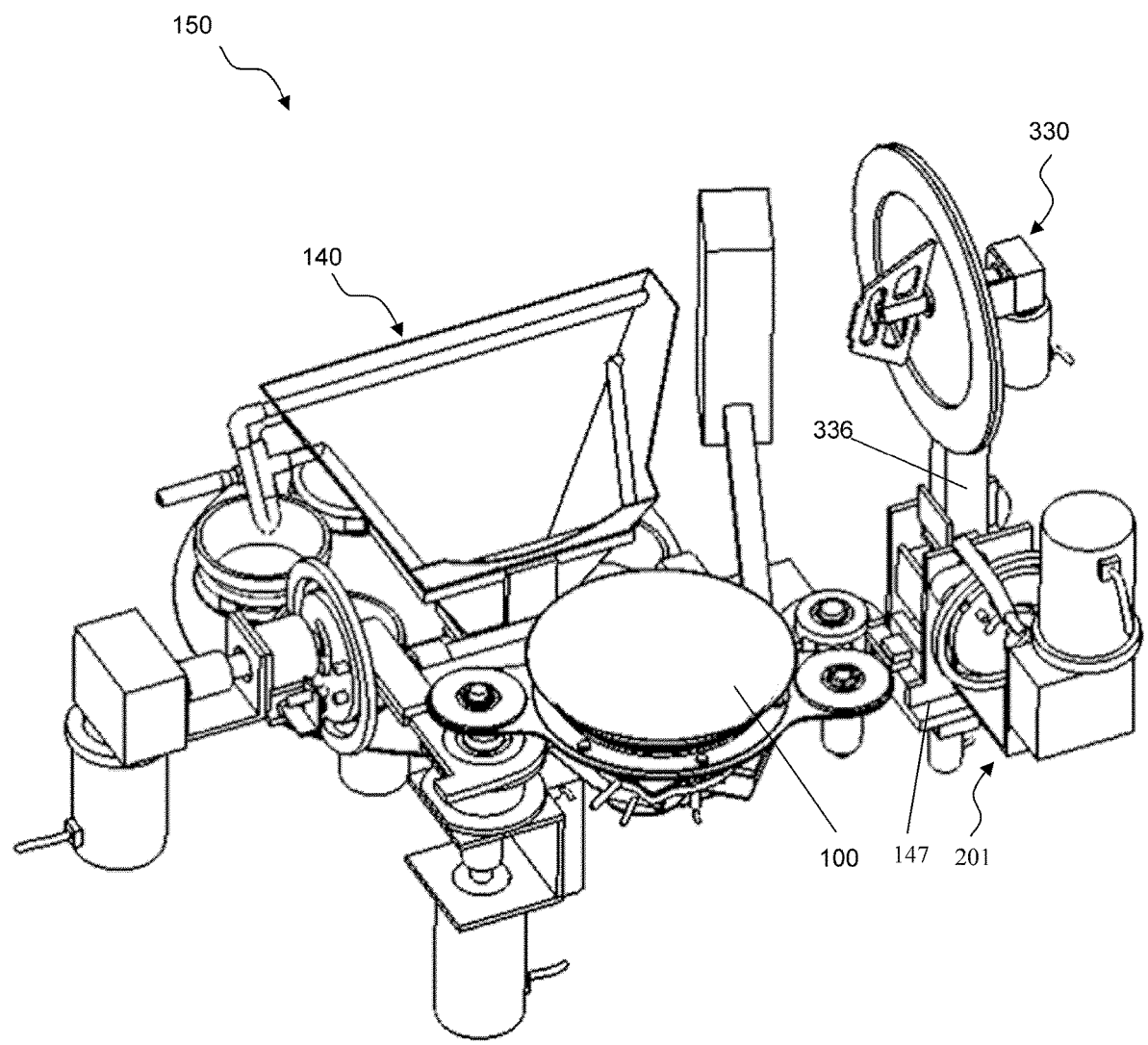
FIG. 9A shows an aerial view of a cooking sub-system comprising the cleaning apparatus shown in FIG. 8E.
Figure 9B:
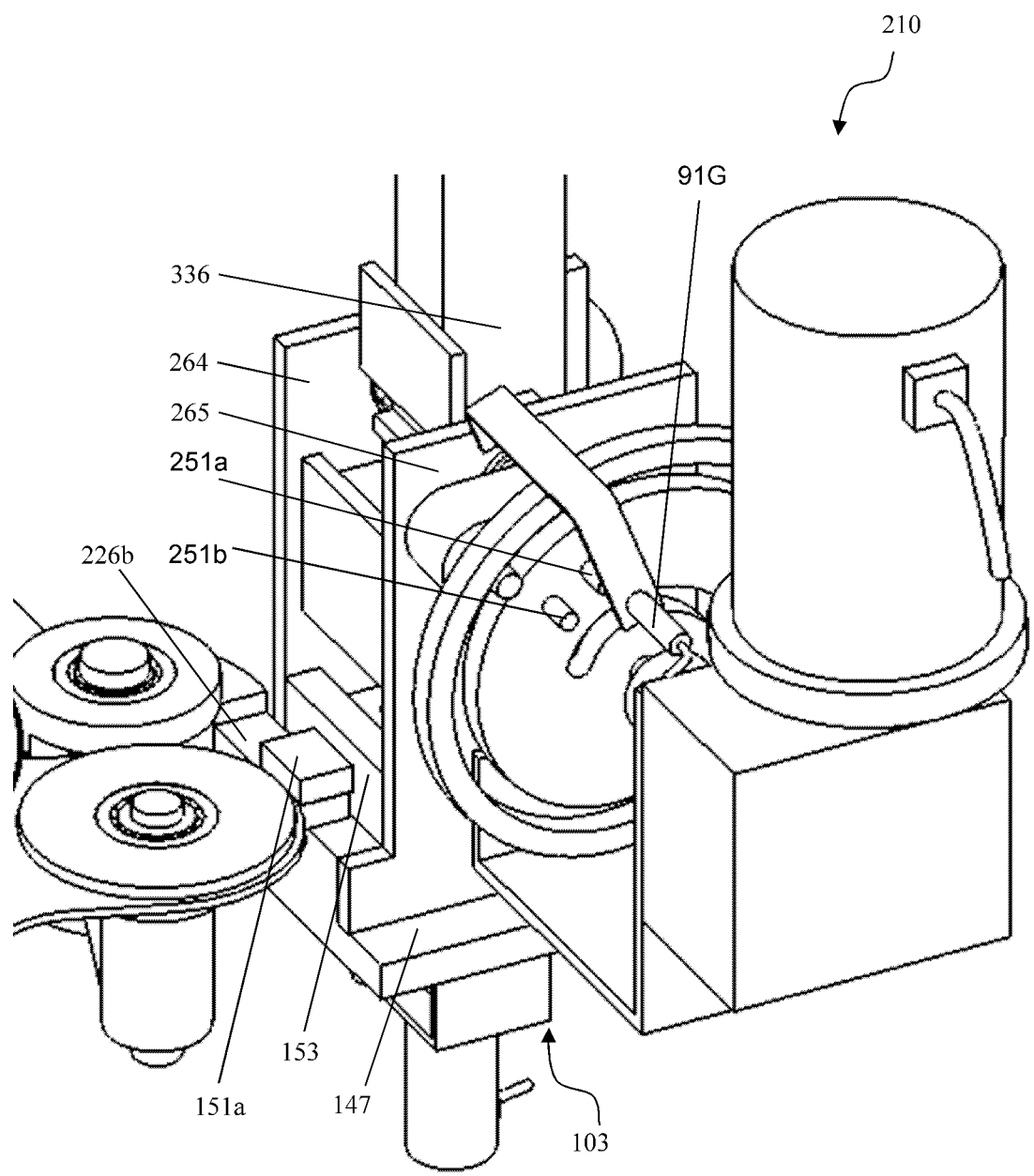
FIG. 9B shows an aerial view of parts of the cooking sub-system.

Referring to FIGS. 9A-9B, a cooking sub-system 150 comprises the cooking sub-system 140 and the cleaning apparatus 330. The support component 147 of the braking mechanism 103 of the cleaning apparatus 330 is configured to be rigidly or fixedly connected to the second support component 175 of the cooking sub-system 140 (the connector is not shown in figure, but can be easily done; for example, both support components 266 and 175 may be fixedly connected to the ground).

As it shows in FIG. 9B, when the first support component 226 of the cooking sub-apparatus 110 is at the first end position, the part 151*a* of the slider 151 in the braking mechanism 103 may be sled as to a position where the proximity switch 91F senses the target 179 and where as to touch and press on the upper surface of the rigid component 226*b* of the first support component 226. At the same time, the lower surface of rigid component 226*b* of the first support component 226 is configured to be touched and pressed on from below by the L-shaped rigid component 153. Thus, the rigid component 226*b* is limited by the components 151*a* and 153; and the first support component 226 of the cooking sub-apparatus 110 is braked by the braking mechanism 103 of the cleaning apparatus 330 from rotating around the axis of the shaft 162.

When the support component 226, at the first end position, is braked by the braking mechanism 103, the cooking container 100 may be able to hold food or food ingredients for cooking and the stirring motion mechanism may be able to produce a motion in the cooking container 100 as to stir, mix or distribute the food or food ingredients contained in the cooking container 100. When a cooked food is completed, the part 151*a* of the slider 151 of the braking mechanism 103 may be sled backward to another position where the proximity switch 91E senses the target 179, and the rigid component 226*b* of the first support component 226 of the cooking sub-apparatus 110 may be rotated in the upward direction, around the axis of the shaft 162, and thus the first support component 226 and the cooking container 100 may be rotated by the motion mechanism 104 as to dispense the cooked food from the cooking container 100.

The cleaning apparatus 330 may clean the cooking container 100 when the cover 325 and the rigid component 336 are rotated to the first end position, right above the cooking container 100, and when the first support component 226 of the cooking apparatus 120 is rotated to the first end position relative to the second support component 175, and when the cooking container 100 is moved to a certain fixed position by the stirring motion mechanism of the cooking sub-apparatus 110 of the cooking sub-system 150.

The cleaning apparatus 330 of the cooking sub-system 150 may clean the cooking container 100 in six steps, as follows.

Step 1, the mechanized mechanism in the cooking container unloading mechanism in the cooking apparatus 120 (which is part of the cooking sub-system 150) moves the first support component 226 to the first end position relative to the second support component 175, so that the cooking container 100 is positioned upright.

Step 2, the shaft 262 and the first support component 336 of the cleaning apparatus 330 are simultaneously rotated to and braked at the first end position relative to the second support component 147 of the cleaning apparatus 330, and the cooking container 100 is moved by the stirring motion mechanism to a certain position. The seal 324 of the cleaning apparatus 330 is configured to press on the top edge of the cooking container 100, so that the water in the cooking container 100 could not flow through the space between the top edge of the cooking container 100 and the cover 325. It should be noted that the cooking container 100 in the above position should be best rotationally symmetric around the axis of the shaft 338.

Step 3, the water pipe mechanism of the cleaning apparatus 330 flows clean water (often heated) into the cooking container 100 from a water source with a shut-off valve.

Step 4, the cleaning device (comprising the waterproof component 321) of the cleaning apparatus 330 are high speed rotated by the cleaning motion mechanism of the cleaning apparatus 330, around the axis of the shaft 338, as to stir the water in the cooking container 100 to wash the inner surface of the cooking container 100. During this step, the water could not flow to the outside of the cooking container 100 under the sealing of the seals 322, 323 and 324.

Step 5, the shaft 262, together with the first support component 336, are rotated to the second end position and be braked.

Step 6, the motion mechanism in the cooking container unloading mechanism of the cooking apparatus 120 moves the first support component 226 to the second end position relative to the second support component 175, so that the axis of the cooking container 100 is turned, and the waste water in the cooking container 100 may be unloaded into the interior of the funnel 181 of the receiving apparatus 310 as explained before.

It should be noted that the cleaning apparatus 330 of the cooking sub-system 150 may be substituted by the cleaning apparatus 330a. During a cleaning process, the cover 331 of the cleaning apparatus 330a may be configured to close on the cooking container 100, and the sponges 332 of the cleaning apparatus 330a may be configured to touch or press on the inner surface of the cooking container 100. The cleaning device (comprising waterproof component 321, the attached sponges 332, etc.) of the cleaning apparatus 330a are low-speed rotated by the cleaning motion mechanism of the cleaning apparatus 330a, around the axis of the shaft 338 and the sponges 332 may rub the inner surface of the cooking container 100.

Figure 10A:
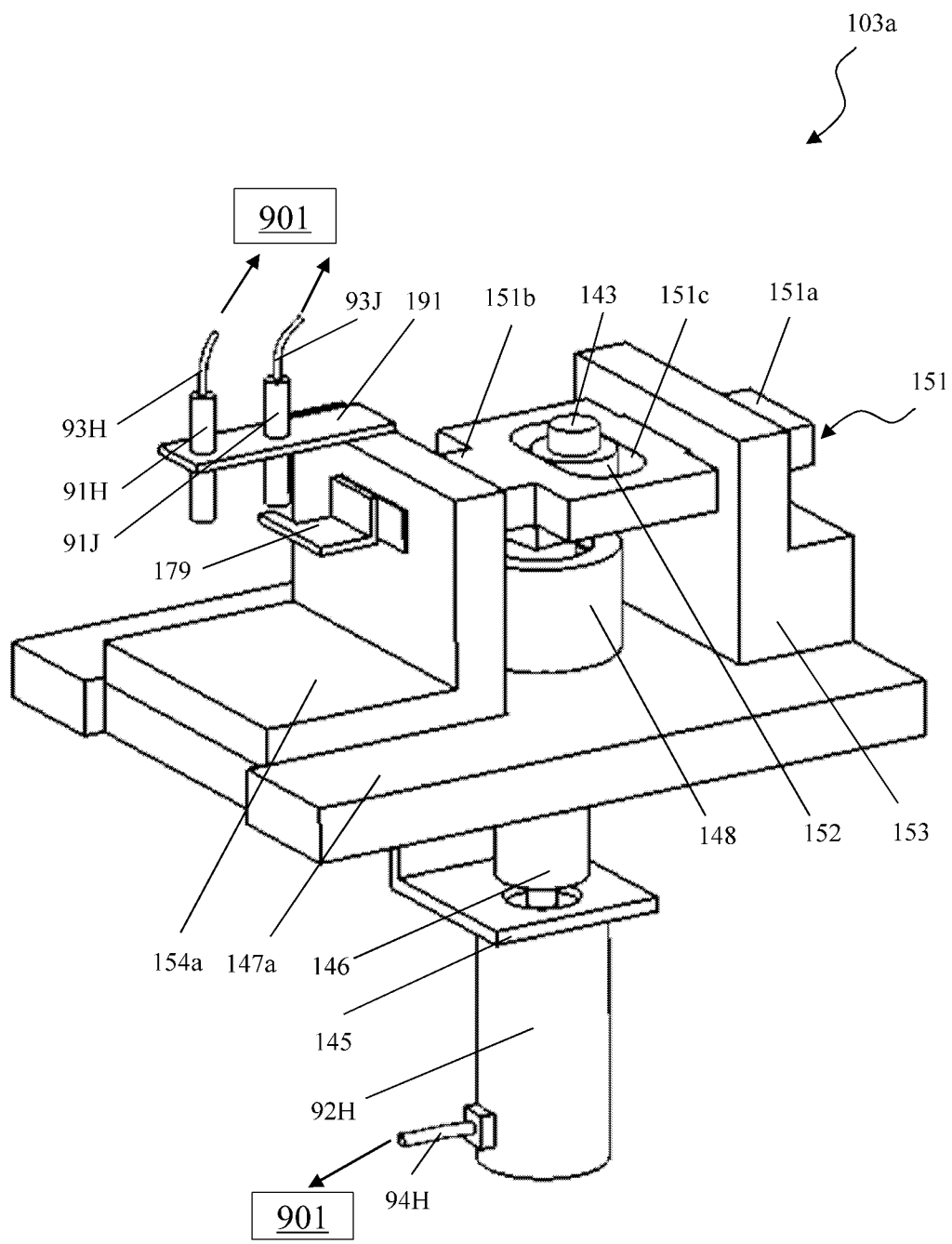
FIG. 10A shows an aerial view of a braking apparatus.

Referring to FIG. 10A, a braking apparatus 103a is constructed the same way as the braking apparatus 103 except that the support component 147 and the L-shaped rigid component 154 are substituted by the support component 147a and the L-shaped rigid component 154a which may have a different size or shape. Indeed, the braking apparatus 103a comprises the support component 147a, L-shaped rigid components 153 and 154a, the slider 151, the shaft 141 and the eccentric shaft 143 which are rigidly connected to each other, the bearing housing 148, a motor 92H, proximity switches 91J and 91H, the connecting component 145, the connector 191 and coupling 146, and their mutual connections (as in the braking apparatus 103), if any. The support component 147a may be referred to as the base support component of the braking apparatus 103a. When the motor 92H rotates, slider 151 may make a back-and-forth motion in a horizontal direction relative to the support component 147a (as in the braking apparatus 103).

As shown in FIG. 10A, the motor 92H is connected to the computer 901 via wires 94H. The computer 901 may be configured to dynamically control the timing and/or speed of the motor 92H. The proximity switches 91H and 91J are also connected to the computer 901 separately via wires 93H and 93J, so the computer 901 may receive electric or electronic signals from the proximity switches 91H and 91J. When the slider 151 is slid to a first end position (or a second end position) wherein the proximity switches 91J (or respectively 91H) is configured to sense the target 179, the computer 901 may send signals to the motor 92H as to stop the rotation of the motor 92H for a time period during which the braking mechanism 103a may complete a corresponding process (as in the braking apparatus 103). After this time period, the motor 92H, under the control of the computer 901, may restart again and rotate the slider 151 to the second end position or respectively the first end position.

Figure 10B:
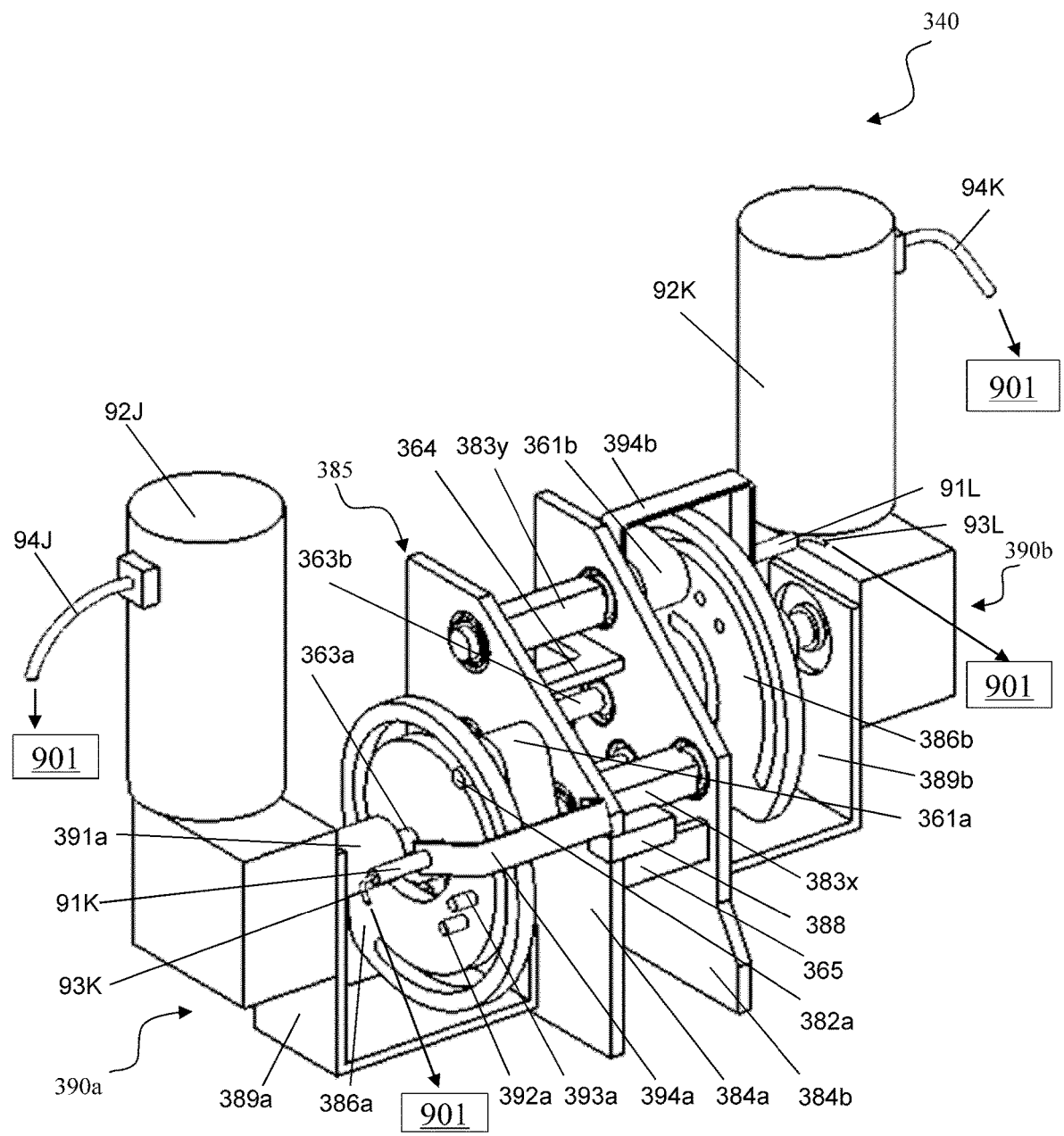
FIGS. 10B-10C show aerial views of a lid motion apparatus.
Figure 10C:
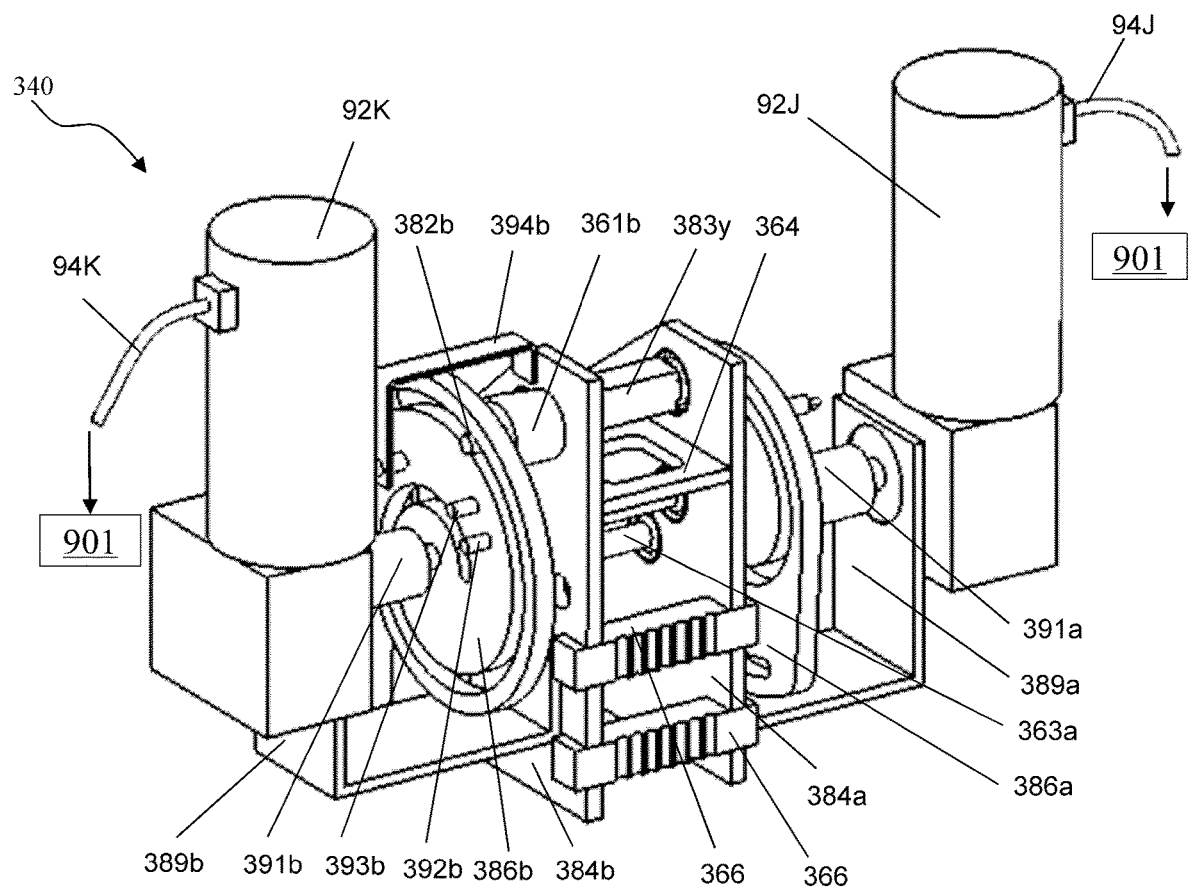
Figure 10D:
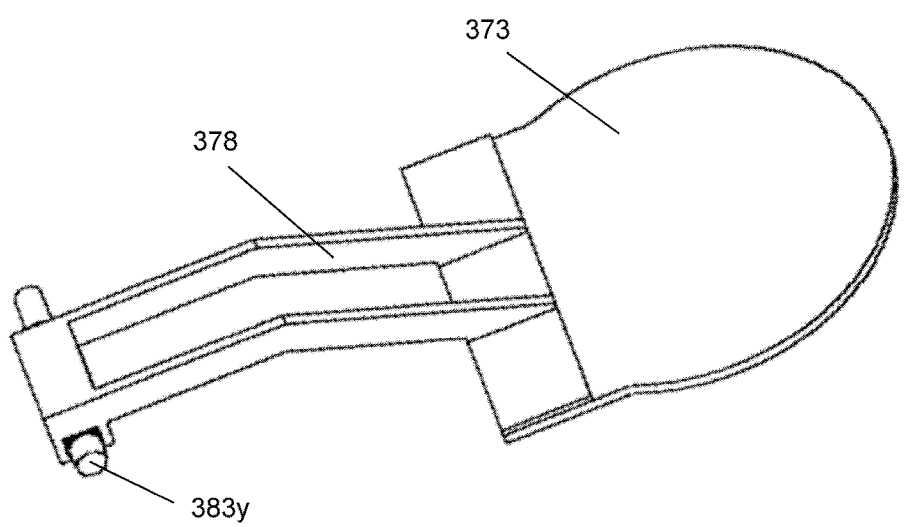
FIGS. 10D-10E show aerial views of parts of a lid apparatus.
Figure 10E:
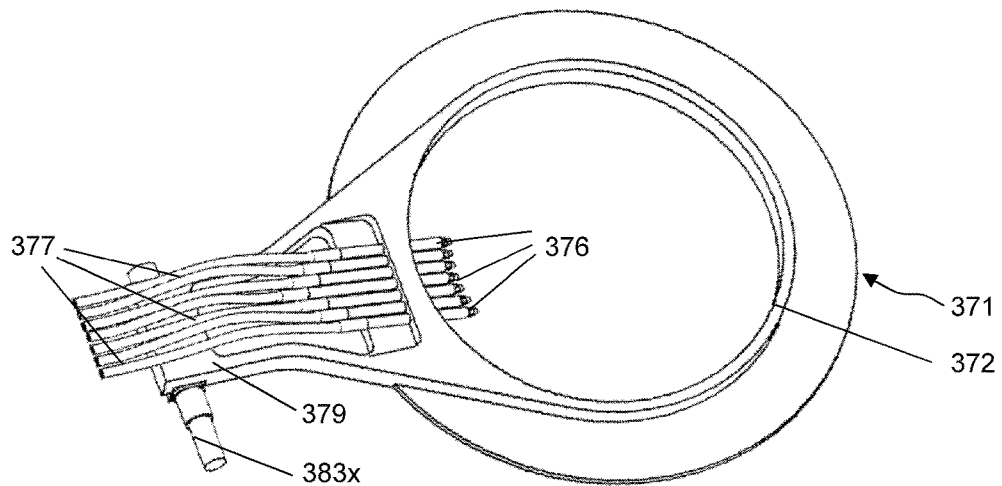
Figure 10F:
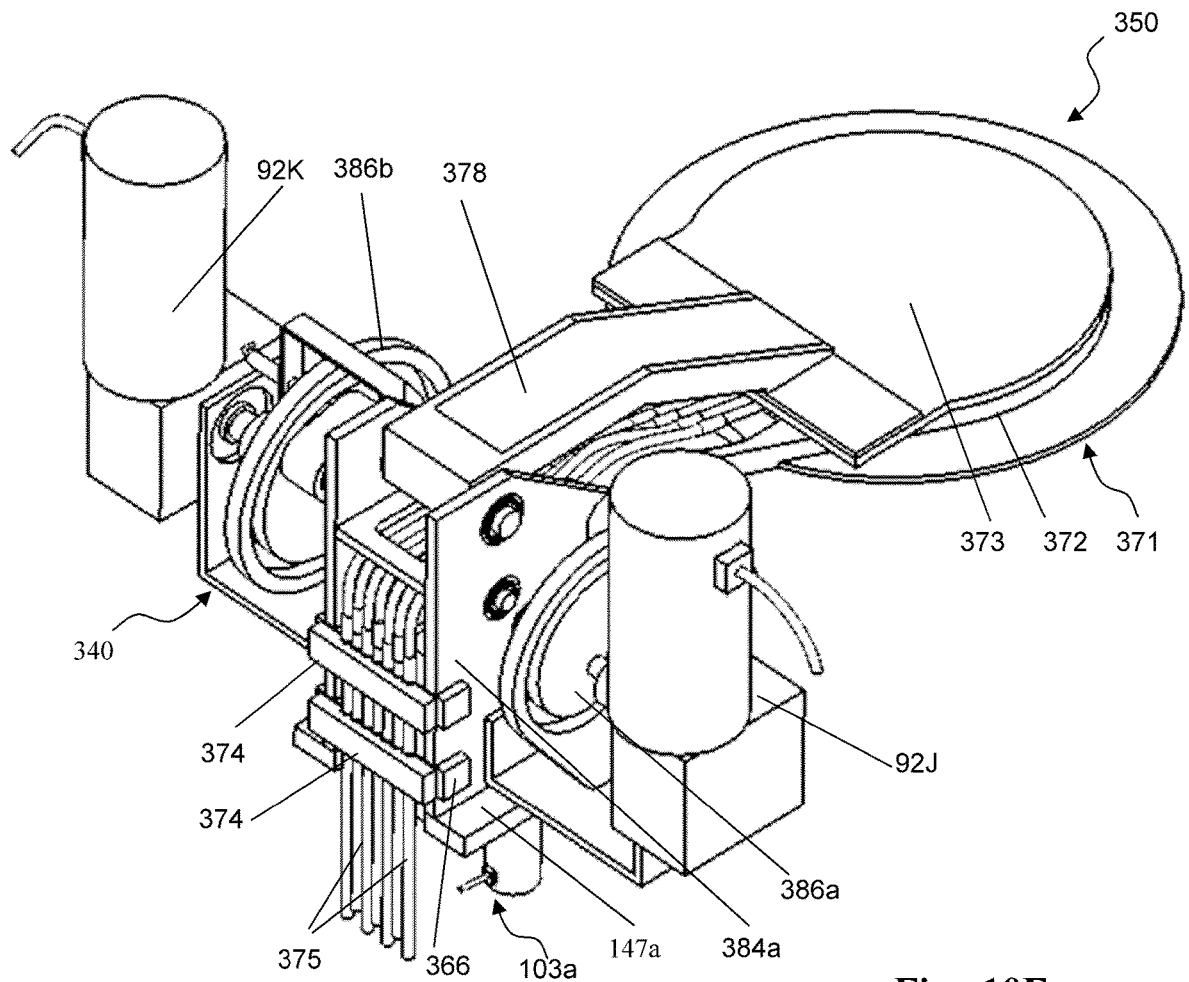
FIGS. 10F-10H show aerial views of the lid apparatus.
Figure 10G:
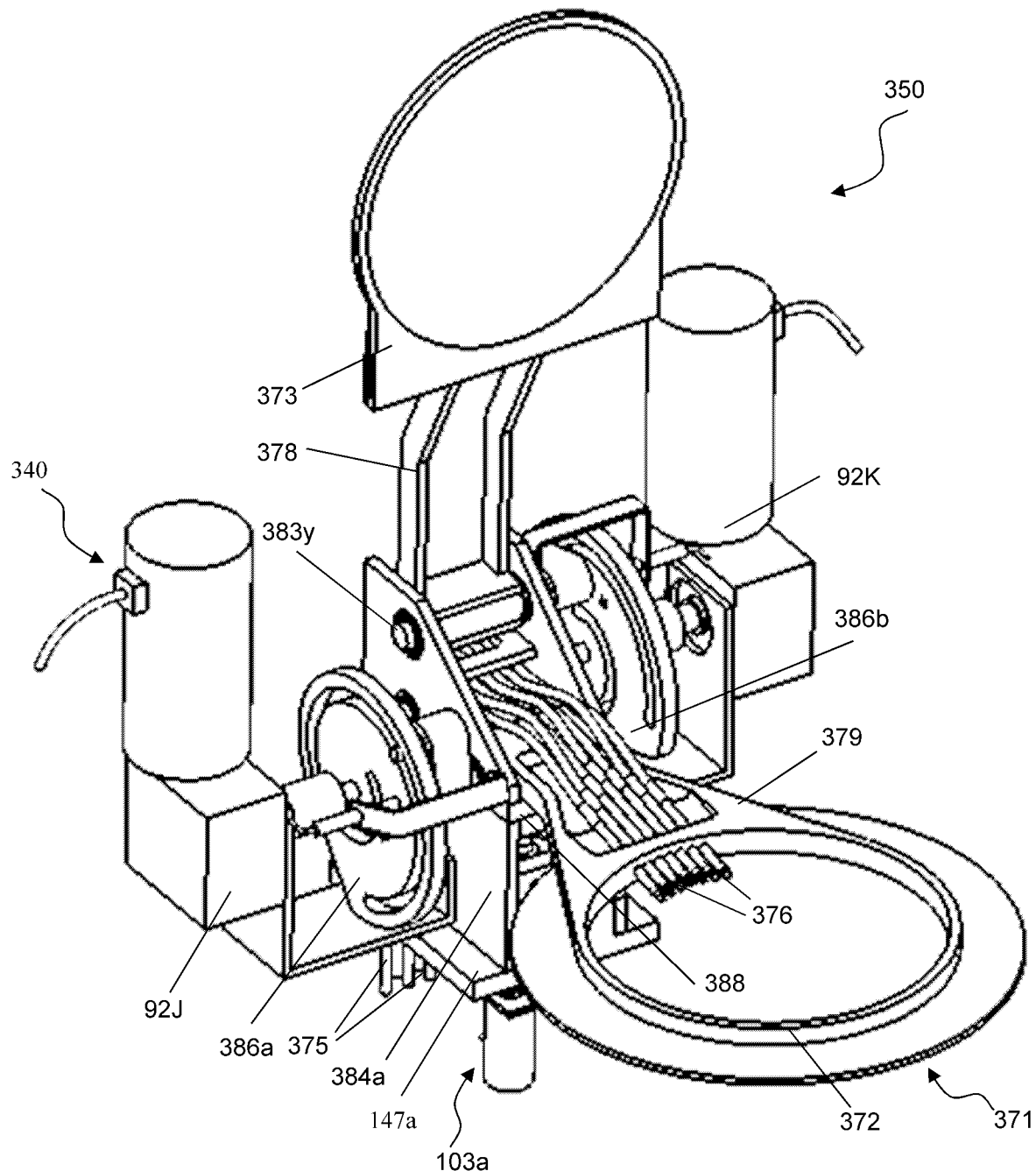

Referring to FIG. 10B-10C, a lid motion apparatus 340 comprises: a support component 385 comprising: two vertical boards 384a, 384b, a horizontal board 364 and a rigid component 365; shafts 383x and 383y; a first motion mechanism 390a and a second motion mechanism 390b; wherein the vertical board 384a or 384b of the support component 385 comprises four round holes used as four bearing housings. The horizontal board 364 and rigid component 365 are configured to rigidly connect the vertical boards 384a and 384b. The support component 385 may be referred to as the support component of the lid motion apparatus 340. Each of the shafts 383x and 383 is connected with one of the four bearing housings of each of the vertical board 384a and 384b by bearings and accessories, so that the shaft is constrained to rotate relative to the vertical boards 384a and 384b, around the axis of the shaft. Each of the shafts 363a and 363b is connected to one of the four bearing housings of each of the vertical boards 384a and 384b by bearings and accessories, so that the shaft is constrained to rotate relative to the vertical boards 384a and 384b, around the axis of the shaft. It should be noted that each of the shafts 383x and 383y is partially round shaped and partially rectangular shaped.

The first motion mechanism 390a of the lid motion apparatus 340 comprises: a shaft 363a; a cam 386a comprising a curved hole; a connector 361a; a shaft 382a; a motor 92J comprising a shaft and a base component; a coupling 391a and a connecting component 389a. The shafts 363a is connected with one of the four bearing housings of each of the vertical boards 384a and 384b by bearings and accessories, so that the shaft 363a is constrained to rotate relative to the vertical boards 384a and 384b, around the axis of the shaft 363a. The shaft 383x is configured to fixedly or rigidly connected to the connector 361a and the connector 361a may comprises a bearing housing (although this is not strict requirement) which is used to connect with the shaft 382a by a pair of bearings. Thus, the connector 361a and the shaft 382a are constrained to rotate relative to the support component 385 around the axis of the shaft 383x. In the first motion mechanism 390a, the cam 386a is rigidly connected to the shaft 363a and the curved hole of the cam 386a is configured to constrain the shaft 382a. The base component of the motor 92J of the first motion mechanism 390a is fixedly connected to the vertical board 384a via the connecting component 389a, and the shaft of the motor 92J is fixedly joined with the round part of the shaft 363a, so that the motor 92J may produce a rotation of the shaft 363a relative to the support component 385, hence the cam 386a is rotated around the axis of the shaft 363a. Since the curved hole of the cam 386a constrains the shaft 382a, the rotation of the cam 386a produces a motion of the shaft 382a, i.e., a rotation around the axis of the shaft 383x, hence the shaft 383x is rotated around the axis of the shaft 383x.

The second motion mechanism 390b of the lid motion apparatus 340 is configured the same way as the first motion mechanism 390a. The second motion mechanism 390b comprises: a shaft 363b; a cam 386b comprising a curved hole; a connector 361b; a shaft 382b; a motor 92K comprising a shaft and a base component; a coupling 391b and a connecting component 389b. The shafts 363b is connected with one of the four bearing housings of each of the vertical boards 384a and 384b by bearings and accessories, so that the shaft 363b is constrained to rotate relative to the vertical boards 384a and 384b, around the axis of the shaft 363b. The shaft 383y is configured to fixedly or rigidly connected to the connector 361b and the connector 361b may comprises a bearing housing (although this is not strict requirement) which is used to connect with the shaft 382b by a pair of bearings. Thus, the connector 361b and the shaft 382b are constrained to rotate relative to the support component 385 around the axis of the shaft 383y. In the second motion mechanism 390b, the cam 386b is rigidly connected to the shaft 363b and the curved hole of the cam 386b is configured to constrain the shaft 382b. The base component of the motor 92K of the second motion mechanism 390b is fixedly connected to the vertical board 384b via the connecting component 389b and the shaft of the motor 92K is fixedly joined with the round part of the shaft 363b, so that the motor 92K may drive a rotation of the shaft 363b relative to the support component 385, hence the cam 386b is rotated around the axis of the shaft 363b. Since the curved hole of the cam 386b constrains the shaft 382b, the rotation of the cam 386b produces a motion of the shaft 382b, i.e. a rotation around the axis of the shaft 383y, hence the shaft 383y is rotated around the axis of the shaft 383y.

It should be noted that the curved hole in the cam 386a (or 386b) of the first motion mechanism 390a (or respectively the second motion mechanism 390b) is modelled on a "modeling curve" comprised of a union of a middle curve and two ending curves, wherein the ending curves are arcs of two circles centered at the axis of the shaft 363a (or respectively 363b). The shaft 382a (or 382b) of the first motion mechanism 390a (or respectively the second motion mechanism 390b) can be regarded as a wheel. The shaft 382a (or 382b) is constrained by the edges in the curved hole in the cam 386a (or respectively 386b) of the first motion mechanism 390a (or respectively the second motion mechanism 390b), when the shaft 382a (or 382b) and the edges in the curved hole are mutually touched. When the shaft 382a (or 382b) of the first motion mechanism 390a (or respectively the second motion mechanism 390b) touches the parts of the edges corresponding to the ending curves, the shaft 382a (or 382b) may be static when the cam 386a (or 386b) is rotated. The modeling curve is configured to have continuously varying tangents (i.e. no sharp turns on the curve); and a smooth rotation of the cam 386a (or 386b) of the first motion mechanism 390a (or respectively the second motion mechanism 390b) produces a motion in the shaft 382a (or respectively 382b) with finite acceleration.

The lid motion apparatus 340 also comprises a rigid component 388 rigidly connected to the vertical board 384a; some pipe fixing components 366 which are rigidly or fixedly connected to the vertical boards 384a and 384b.

The lid motion apparatus 340 also comprises proximity switches 91K and 91L; connecting components 394a and 394b configured to separately fixedly connect the proximity switches 91K and 91L to the vertical boards 384a and respectively 384b; targets 392a and 393a both of which are joined with the cam 386a; targets 392b and 393b both of which are joined with the cam 386b. As shown in FIGS. 10B-10C, the motors 92K and 92J are connected to the computer 901 separately via wires 94K and 94J. The computer 901 may be configured to dynamically control the timing and/or speed of the motor 92J of the first motion mechanism 390a, and those of the motor 92K of the second motion mechanism 390b. The proximity switches 91K and 91L are also connected to the computer 901 separately via wires 93K and 93L, so the computer 901 may receive electric or electronic signals from the proximity switches 91K and 91L. The proximity switch 91K monitors the target 392a when the target is rotated in one direction with the cam 386a of the first motion mechanism 390a by the motor 92J. The proximity switch 91K monitors the target 393a when the target is rotated in the other direction with the cam 386a of the first motion mechanism 390a by the motor 92J. Each time the proximity switch 91K senses the target 392a or 393a, the computer 901 can figure out the position of the target, and the position of the cam 386a. Then the computer 901 may receive signals from the proximity switch 91K, and then send signals to the motor 92J as to stop the rotation of the motor 92J for a time period. After this time period, the motor 92J, under the control of the computer 901, may restart again and make a reverse rotation to rotate the cam 386a to the next position. Similarly, the proximity switch 91L senses the target 392b when the target is rotated in one direction with the cam 386b of the second motion mechanism 390b by the motor 92K. The proximity switch 91L senses the target 393b when the target is rotated in the other direction with the cam 386b of the second motion mechanism 390b by the motor 92K. Each time the proximity switch 91L senses the target 392b or 393b, the computer 901 can figure out the position of the target, and the position of the cam 386b. Then the computer 901 may receive signals from the proximity switch 91L, and then send signals to the motor 92K as to stop the rotation of the motor 92K for a time period. After this time period, the motor 92K, under the control of the computer 901, may restart again and make a reverse rotation to rotate the cam 386b to the next position.

It should be noted that the width of the curved hole in the cam 386a (or 386b) may be configured to be equal to or slightly larger than the diameter of the shaft 382a (or respectively 382b).

Referring to FIGS. 10D-10H a lid apparatus 350 (similar to the "lid apparatus 301" of the U.S. patent application Ser. No. 14/918,608, Filed Oct. 31, 2015) comprises: a blocking device 371 comprising a ring shaped component 372 and a flat ring-shaped board which are rigidly connected to each other; a solid cover 373; the braking apparatus 103a and the lid motion apparatus 340, wherein the support component 147a of the braking apparatus 103a is configured to rigidly connected to the support component 385 of the lid motion apparatus 340, wherein the support component 147a may be referred to as the support component of the lid apparatus 350. The solid cover 373 is rigidly connected to the shaft 383y by the connector 378 (see FIG. 10D); and the blocking device 371 is rigidly connected to the shaft 383x by the connector 379 (see FIG. 10E). The axes of the shafts 383x and 383y in the lid motion apparatus 340 are configured to be horizontal. The blocking device 371 is configured to be rotated by the first motion mechanism 390a to a position where the connector 379 touches the component 388 of the lid motion apparatus 340, wherein the component 388 functions as a physical barrier for the motion of the connector 379. The position of the blocking device 371 at this time will be referred to as the first end position of the blocking device 371 relative to the support component 385. When the blocking device 371 is at the first end position, the solid cover 373 can be rotated by the second motion mechanism 390b to a position where the solid cover 373 seamlessly covers the ring-shaped component 372 of the blocking device 371.

In fact, the blocking device 371 may be braked by the first motion mechanism 390a of the lid motion apparatus 340 when the blocking device 371 is at the first end position. As explained, the curve profile of the curved track of the cam 386a of the first motion mechanism 390a comprises a circular arc at either end; wherein each circular arc is part of a circle centered at the axis of the shaft 363a. When the shaft 382a is constrained by the curved track in the part corresponding to one of the circular arcs, the blocking device 371 and the shaft 363a may be rotated to the first end position. When the shaft 382a is constrained by the curved track in the part corresponding to the other circular arc, the blocking device 371 and the shaft 363a may be rotated to a second end position wherein the rotation angle of the blocking device 371 relative to the first end position is a constant (in some applications near 90 degrees). During either situation, the axis of the shaft 382a is not moved even if the cam 386a of the first motion mechanism 390a is rotated around the axis of the shaft 363a. The cam 386a of the first motion mechanism 390a may be used to stop the motion of the blocking device 371 relative to the support component 385 when the blocking device 371 is moved to the first position or second position relative to the support component 385 under the condition that the motor 92J of the first motion mechanism 390a is power off. In fact, the axis of the shaft 382a does not move, even if the cam 386a is slightly moved; the ratio of the speed of the rotational motion of the axis of the shaft 382a and the speed of the rotational motion of the cam 386a is zero, or equivalently, the ratio of the speed of the rotational motion of the cam 386a and the speed of the rotational motion of the axis of the shaft 382a is infinite. If the axis of the shaft 382a is not moved, then the blocking device 371 cannot be rotated around the axis of the shaft 383x, if not counting vibrations, errors or allowances. Similarly, as the blocking apparatus 371, the cam 386b of the second motion mechanism 390b of the lid motion apparatus 340 may be used as a mechanism for the rotation of the solid cover 373 and the connector 378 when the solid cover 373 and the connector 378 are rotated to the first end position or a second end position. It should be noted that the motors 92J and 92K may not need to have a brake in some applications.

It should be noted that when the proximity switch 91K (or respectively 91L) senses the target 392a or 393a (or respectively 392b or 393b), the solid cover 373 (or respectively the blocking device 371) is rotated to the first end position or second end position and the shaft 383x (or respectively 383y) can be constrained by one of the circular profiles of the curved track of the cam 386a (or 386b). At this same time, the computer 901 may send signals to the motor 92J (or respectively 92K) as to control the rotation of the motor 92J (or respectively 92K). Thus, the rotation of the solid cover 373 (or respectively the blocking device 371) may be braked by the lid motion apparatus 340.

The lid apparatus 350 further comprises a liquid dispensing mechanism comprising a plurality of pipes 377, 375, pipe fixing components 374, a plurality of connectors and spray heads 376. The pipes 375 of the liquid dispensing mechanism are configured to be fixed relative to the support component 385 via the pipe fixing components 374 and 366. Each pipe 375 is configured to be connected to a corresponding pipe 377 by a connector. Each spray head 376 is installed on the ring-shaped component 372 of the blocking device 371 and is connected to a corresponding pipe 377. The liquid dispensing mechanism is configured dispense liquid ingredients, such as water, cooking oil, soy source, vinegar, etc., into the cooking container 100 in a cooking process. Each pipe 375 in the liquid dispensing mechanism of the lid apparatus 350 may be connected to a liquid source, via a pipe through a liquid pump such as peristaltic pump, wherein the said liquid pump is configured to pump the liquid in the said liquid source to the cooking container 100 via the said pipe 375. The computer may be configured to control the rotation of the said liquid pump.

Figure 10H:
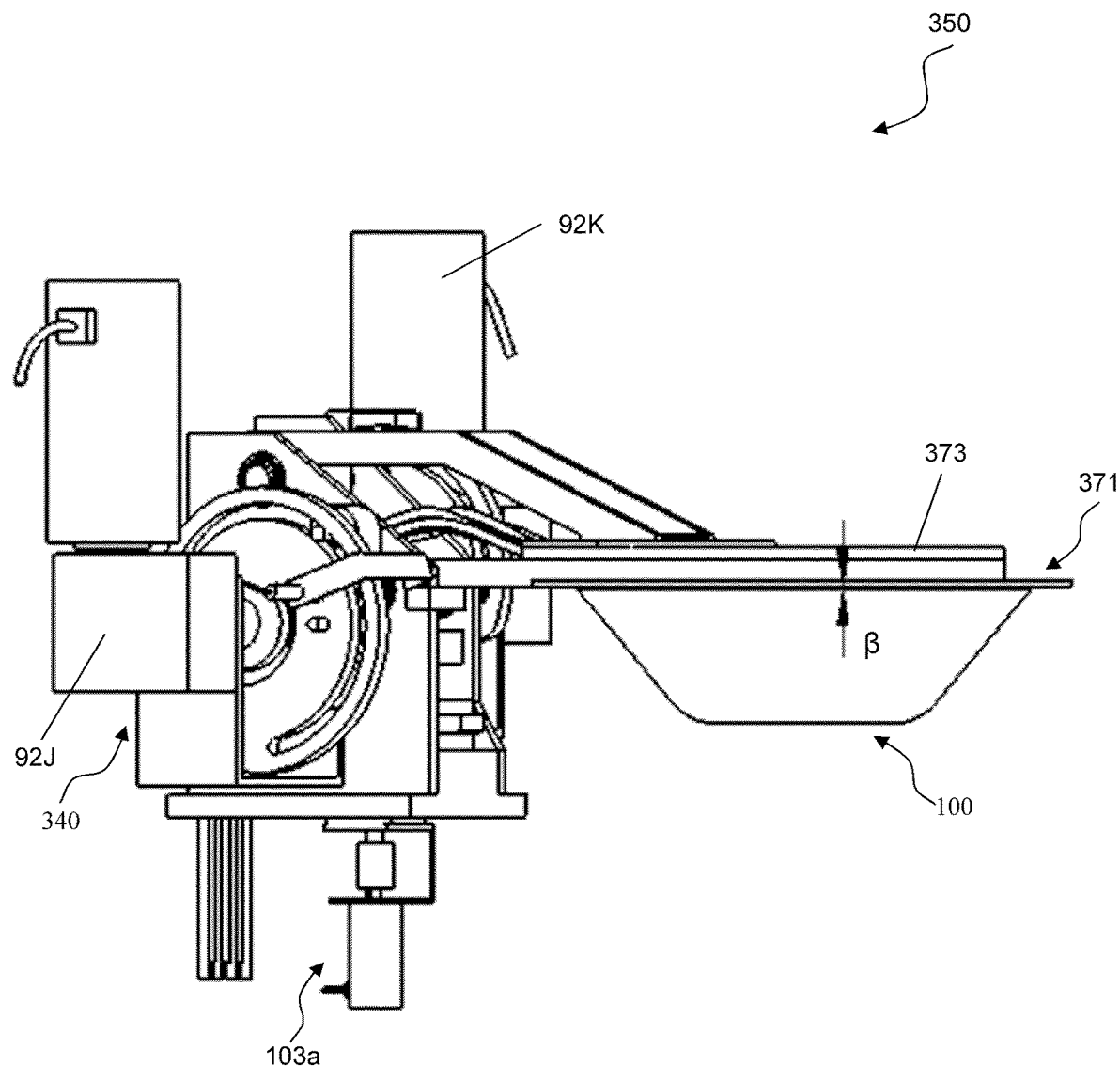

When the blocking device 371 is rotated to the first end position relative to the support component 385, and when the cooking container 100 of the cooking apparatus 120 of the cooking sub-system 150 is rotated to the first end position relative to the second support component 175 of the cooking apparatus 120, the distance β between the top edge of the cooking container 100 and lower surface of the blocking device 371 is configured to be small (see FIG. 10H). The distance β is only needed to make room for elastic and other deformations, and allowances in spaces and errors. Thus, the distance β need not be more than the sum of the following quantities: (a) the maximal effect caused by the elastic or other non-rigid deformation of the cooking container 100; (b) the maximal effect caused by the elastic or other non-rigid deformation of the blocking device 371; (c) the allowances in spaces and errors. In our applications, the sum of these quantities may be configured to be less than two millimeters, and thus the distance β is configured to be less than two millimeters.

Figure 11A:
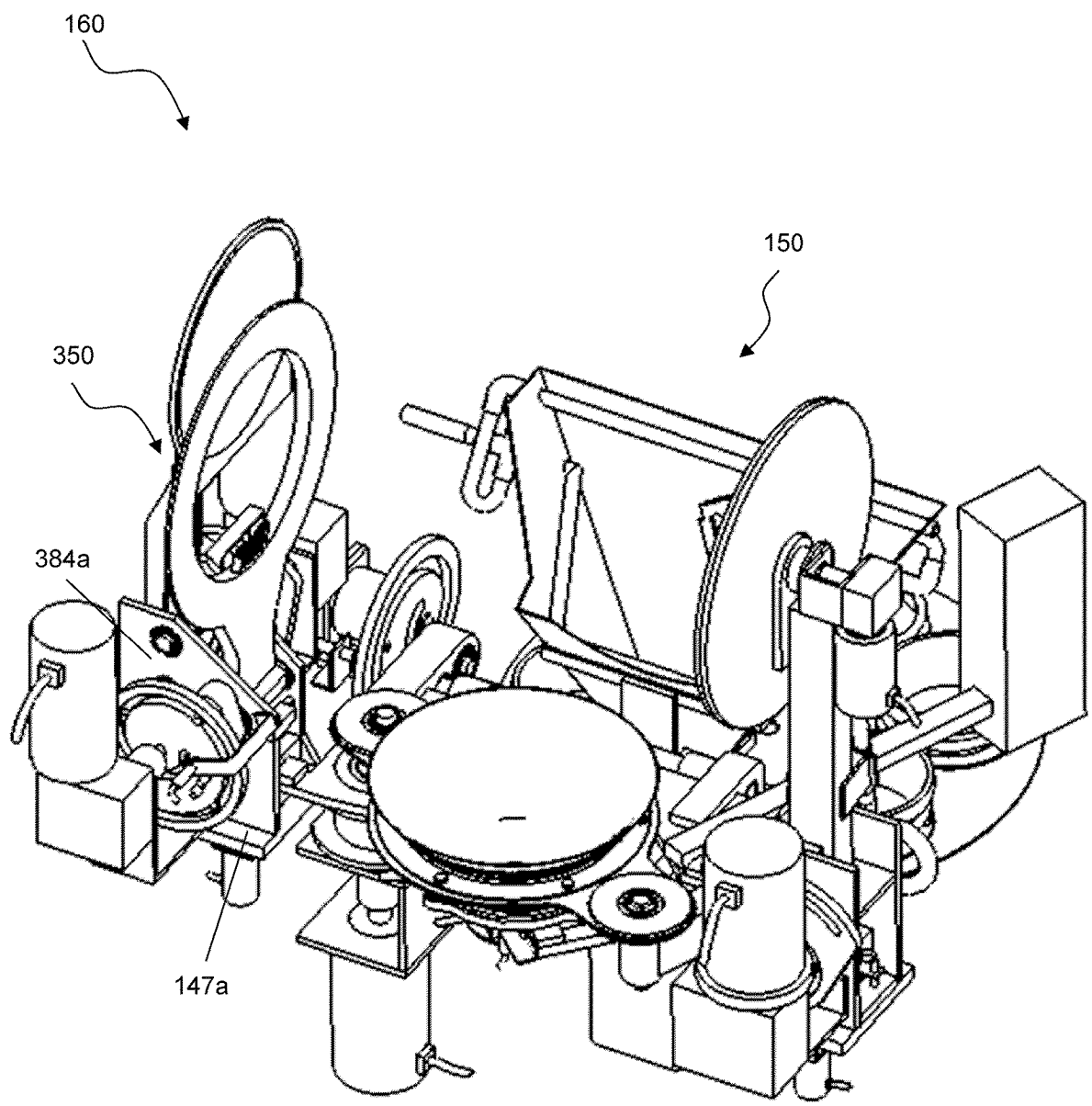
FIG. 11A shows an aerial view of a cooking sub-system comprising the lid apparatus shown in FIGS. 10F-10G.
Figure 11B:
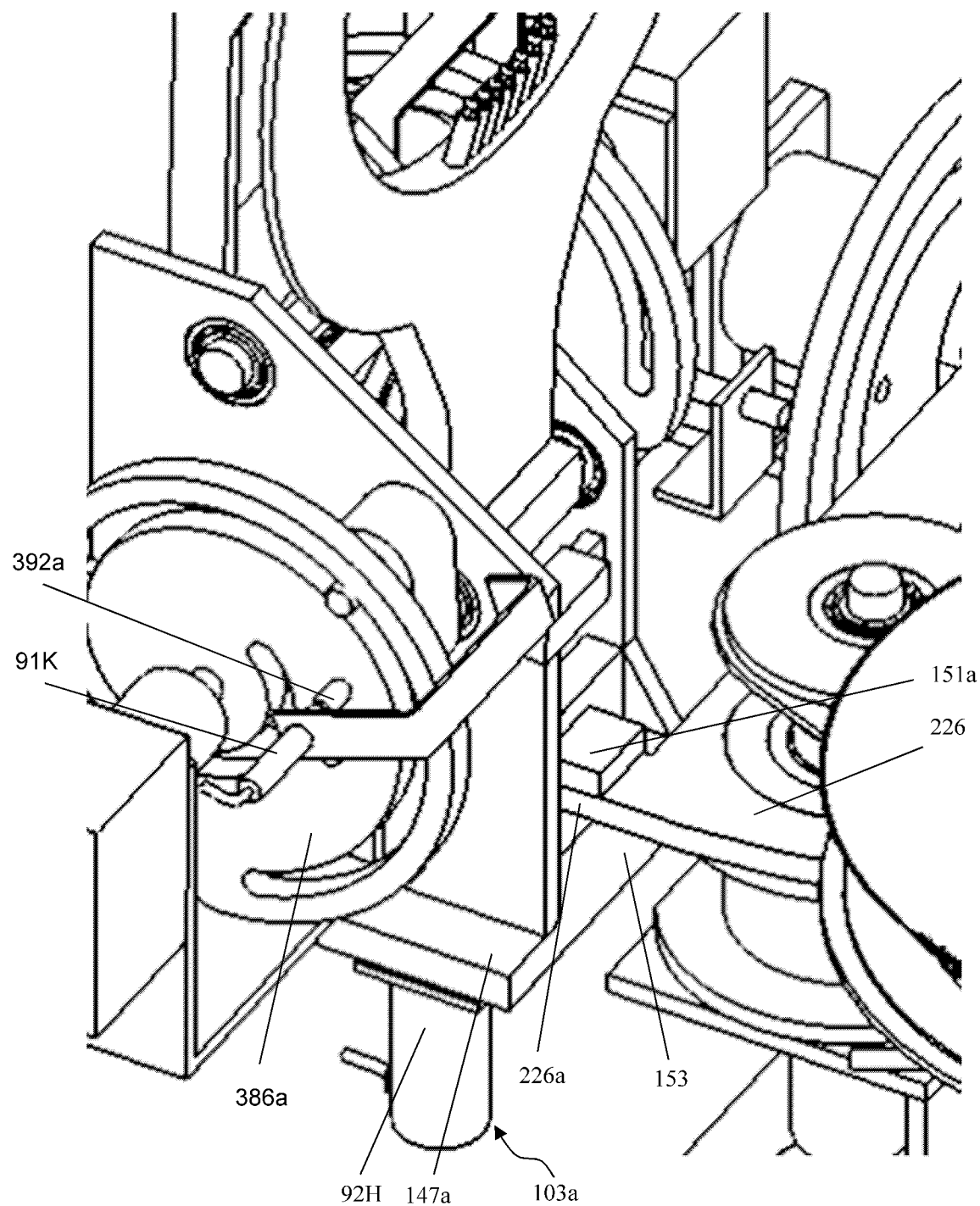
FIG. 11B shows an aerial view of parts of the cooking sub-system

Referring to FIGS. 11A-11B, an automated cooking sub-system 160 comprises the cooking sub-system 150 and the lid apparatus 350. The support component 147a of the lid apparatus 350 is configured to rigidly connect to the support component 175 of the cooking sub-system 150 (the rigid connection is not shown in figure, but it is elementary to construct it, e.g., by mounting the support component 385 and the second support component 175 rigidly on the ground). When the blocking device 371 is rotated to the first end position relative to the support component 385 by the motor 92J of the lid motion apparatus 340, the blocking device 371 is configured to comprise a lower surface which lies on a horizontal plane. When the blocking device 371 is rotated to the first end position relative to the support component 385, and when the cooking container 100 of the cooking apparatus 120 of the cooking sub-system 150 is rotated to the first end position relative to the second support component 175 of the cooking apparatus 120, the top edge of the cooking container 100 is configured to be on a horizontal plane which is very close to the horizontal plane containing the lower surface of the blocking device 371. The distance between the two horizontal planes is configured to be quite small, often less than a couple of millimeters, or even less than 1millimeter in some applications. The axes of the shafts 131, 132, 125 and 126 are configured to be vertical when the first support component 226 of the cooking apparatus 120 is at the first end position relative to the second support component 175 of the cooking apparatus 120. Thus, the stirring motion mechanism of the cooking sub-apparatus 110 of the cooking apparatus 120 moves the cooking container 100 by a horizontal planar motion relative to the first support component 226 when the first support component 226 is at the first end position relative to the second support component 175 of the cooking apparatus 120. If so, the edge of the cooking container 100 is contained in the same horizontal plane when the first support component 226 is at the first end position relative to the second support component 175. When the solid cover 373 is also rotated to the first end position relative to the support component 385 by the lid motion apparatus 340, the solid cover 373 and the blocking device 371 are configured to always nearly cover the cooking container 100 when the cooking container 100 is moved by the stirring motion mechanism of the cooking sub-apparatus 110. Therefore, the solid cover 373 and the blocking device 371 may help limit the food or food ingredients contained in the cooking container 100 from jumping out of the food container 100 when the stirring motion mechanism moves the cooking container 100 robustly.

As it shows in FIG. 11B, the braking mechanism 103a is configured similarly as the braking mechanism 103. When the cooking sub-apparatus 110 is at the first end position, the proximity switch 91J is able to sense the target 179, and the part 151a of the slider 151 in the braking mechanism 103a may be sled as to touch and press on the upper surface of the rigid component 226a of the first support component 226. At the same time, the lower surface of rigid component 226a of the first support component 226 is configured to be touched and pressed on from below by the L-shaped rigid component 153. Thus, the rigid component 226a is limited by the components 151a and 153; and the first support component 226 of the cooking sub-apparatus 110 is braked by the braking mechanism 103a of the lid apparatus 350 from rotating around the axis of the shaft 162.

When the first support component 226 is braked by the braking mechanism 103a the cooking container 100 may be able to hold food or food ingredients for cooking and the stirring motion mechanism may be able to produce a motion in the cooking container 100 as to stir, mix or distribute the food or food ingredients contained in the cooking container 100. When a cooked food is produced, the part 151a of the slider 151 of the braking mechanism 103a may be sled backward to the position where the proximity switch 91H senses the target 179, the rigid component 226a of the first support component 226 of the cooking sub-apparatus 110 may be free to be rotated in the upward direction, around the axis of the shaft 162, and thus the first support component 226 and the cooking container 100 may be rotated by the motion mechanism 104 as dispense the cooked food from the cooking container 100.

It should be noted that the braking mechanism 103 of the cleaning apparatus 330 and the braking mechanism 103a of the lid apparatus 350 may be configured to work at the same time.

It should be further noted that braking mechanism 103 of the cleaning apparatus 330 and the braking mechanism 103a of the lid apparatus 350 be used to reduce vibrations (or other non-rigid motions, errors or allowances) of the first support component 226, and to enhance the stability of the first support component 226, when the first support component 226 is at the first end position relative to the second support component 175, and when the stirring motion mechanism produces a motion of the cooking container 100 as to stir, mix or distribute the food or food ingredients held in the cooking container 100.

In the automated cooking sub-system 160, after a food in the cooking container 100 of the cooking apparatus 120 is cooked, the solid cover 373 is rotated to the second end position relative to the support component 385. Next, the blocking device 371 is rotated to the second end position, wherein the solid cover 373 is kept stayed at the second end position. Next, the first support component 226 of the cooking apparatus 120 is rotated to the second end position relative to the second support component 175, as to dispense the cooked food into a food container 182 on the turntable 183, through the funnel 181, of the receiving apparatus 310. Next, the first support component 226 of the cooking apparatus 120 is rotated back to the first end position relative to the second support component 175 so the cooking container 100 is positioned upright. Next, the rigid component 336 of the cleaning apparatus 330 is rotated to the first end position relative to the support component 266, so that the cleaning mechanism may pour water into the cooking container 100 and clean the cooking container 100. Next, the rigid component 336 is rotated back to the second end position. Meanwhile, the turntable 183 of the receiving apparatus 310 is rotated so that the water passage 184 is positioned right below the funnel 181. Next, the first support component 226 is rotated to the second end position relative to the second support component 175, as to unload the waste water in the cooking container 100, to flow away through the funnel 181 and to the water passage 184. Then, the first support component 226 is rotated back to the first end position relative to the second support component 175; and the water may flow from the water pipes 316, 317, 318, 328, etc., as to clean the funnel 181.

The second support component 175 of the cooking apparatus 120 may be referred to as a support component of the automated cooking sub-system 160.

More lid apparatuses are presented in the U.S. patent application Ser. No. 14/918,608, Filed Oct. 31, 2015, the disclosures of which are all herein incorporated by reference in their entireties. These lid apparatuses may be combined with the cooking apparatuses and cooking sub-systems or systems presented in the present patent application.

In some embodiments, a lid apparatus may comprise a blocking device and a cover, both of which are fixedly or rigidly connected to each other, and a motion mechanism comprising a motor configured to drive a rotation of the blocking device and the cover, around a horizontal axis, between two end positions. It should be noted that a motion mechanism which drives a rotation of a blocking device in a lid apparatus may or may not comprise a modified Geneva drive mechanism. However, there needs to be a limit mechanism configured to limit the rotation of the blocking device to a fixed range between two end positions, wherein the limit mechanism may comprise physical barriers.

Figure 12A:
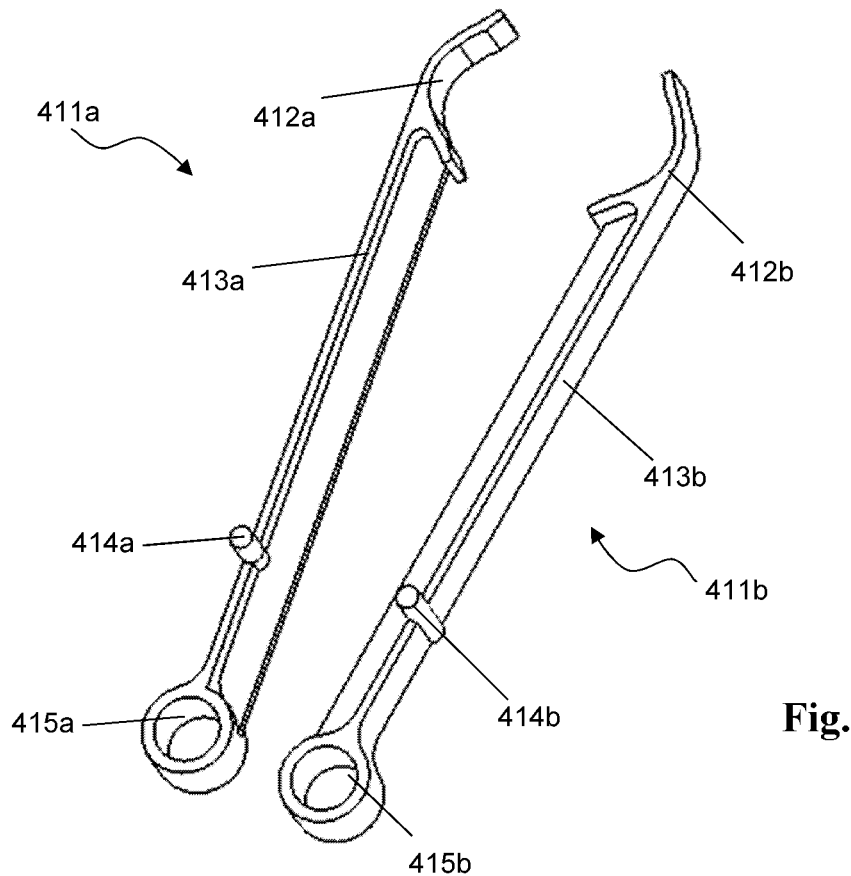
FIGS. 12A-12D show aerial views of parts of a gripping mechanism.
Figure 12B:
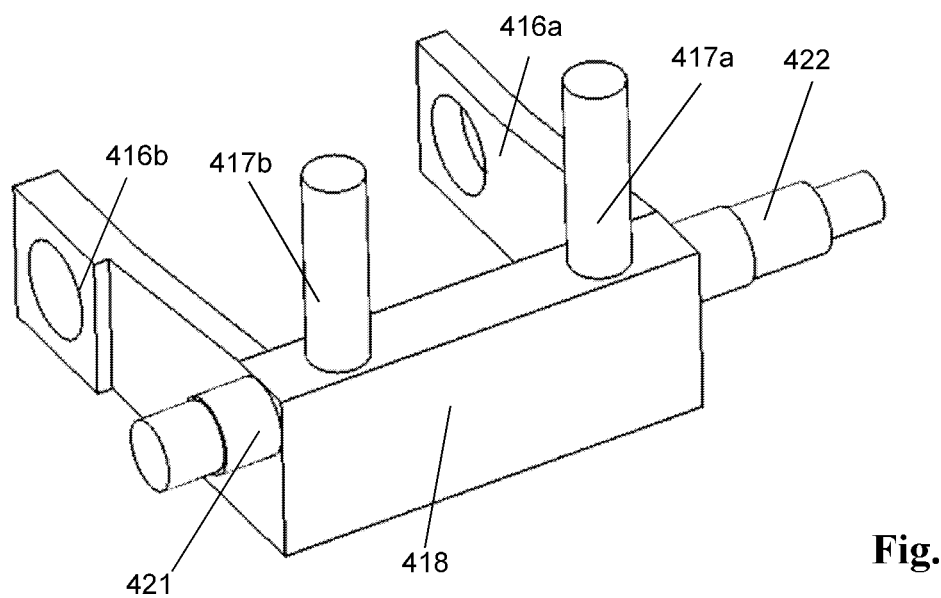

Referring to FIGS. 12A-12E, a gripping mechanism 401 comprises a pair of gripping devices 411a and 411b; a rigid component 418 referred to as the support component of the gripping mechanism 401; a pair of shafts 417a and 417b; two rigid components 416a and 416b each comprising a bearing housing (corresponding to a round hole shown in FIG. 12B); and shafts 421 and 422. As shown in FIG. 12A, the gripping device 411a (or 411b) comprises a bearing housing 415a (or respectively 415b); a gripper 412a (or respectively 412b) comprising a plurality of surfaces (on the gripping side) each comprising a part of a cylindrical surface; an arm 413a (or respectively 413b); a shaft 414a (or respectively 414b); wherein the arm 413a (or respectively 413b) is a rigid component configured to rigidly connect the gripper 412a (or respectively 412b), the bearing housing 415a (or respectively 415b) and the shaft 414a (or respectively 414b); wherein the axis of the bearing housing 415a (or respectively 415b) and the axis of the shaft 414a (or respectively 414b) are configured to be parallel to each other. The arm 413a (or 413b) may comprise stiffeners. As shown in FIG. 12B, the pair of shafts 417a and 417b are both rigidly connected to the rigid component 418 wherein the axes of the shafts 417a and 417b are configured to be parallel to each other, and perpendicular to the axes of the shafts 421 and 422. The shafts 421 and 422 are both rigidly connected to the rigid component 418 wherein the axes of the two shafts are configured to be the same. The two rigid components 416a and 416b are both rigidly connected to the rigid component 418. The axes of the bearing housings of the rigid components 416a and 416b are configured to be the same, and parallel to the axes of the shafts 421 and 422.

Figure 12C:
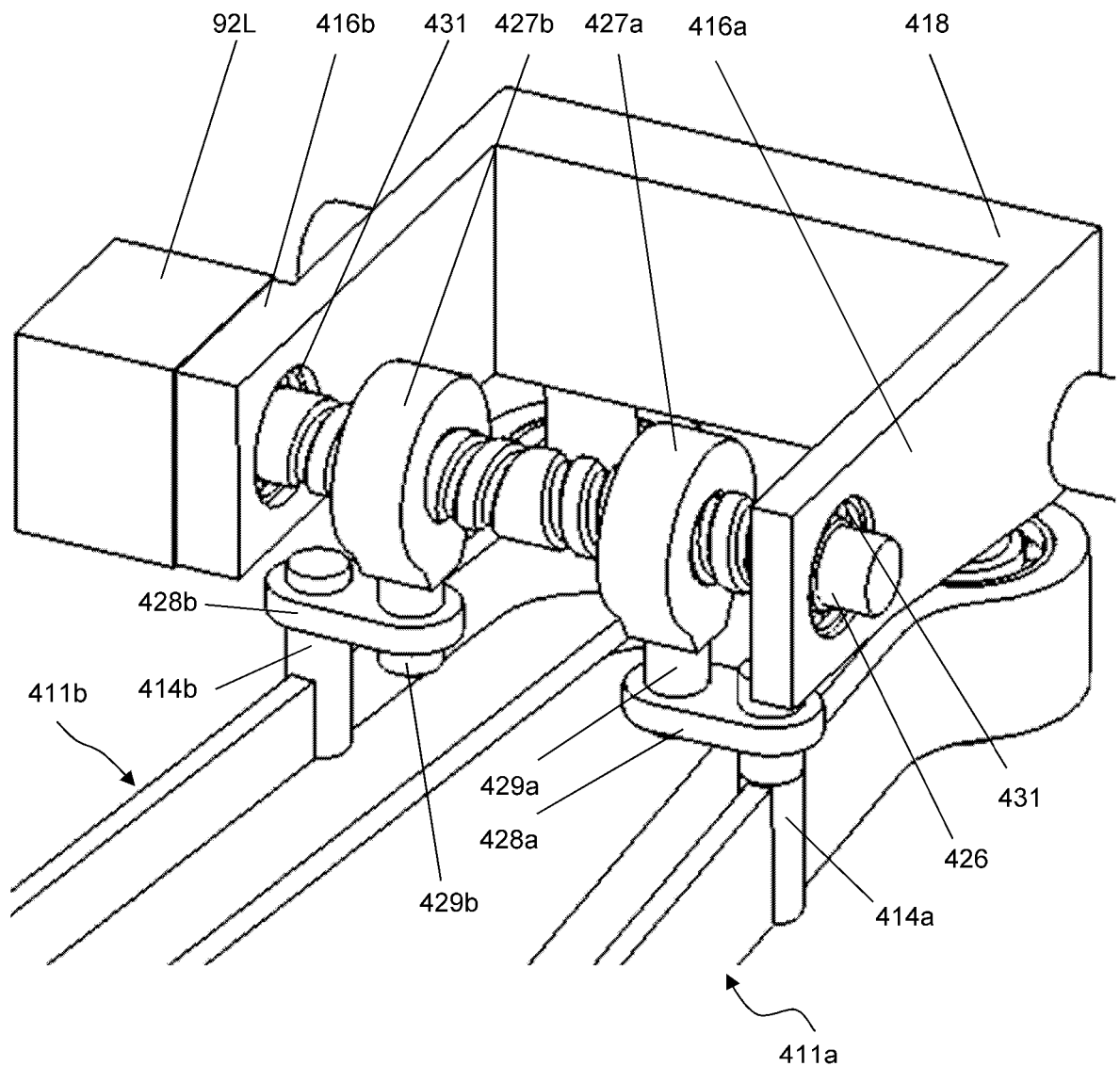
Figures 12D, 12E:
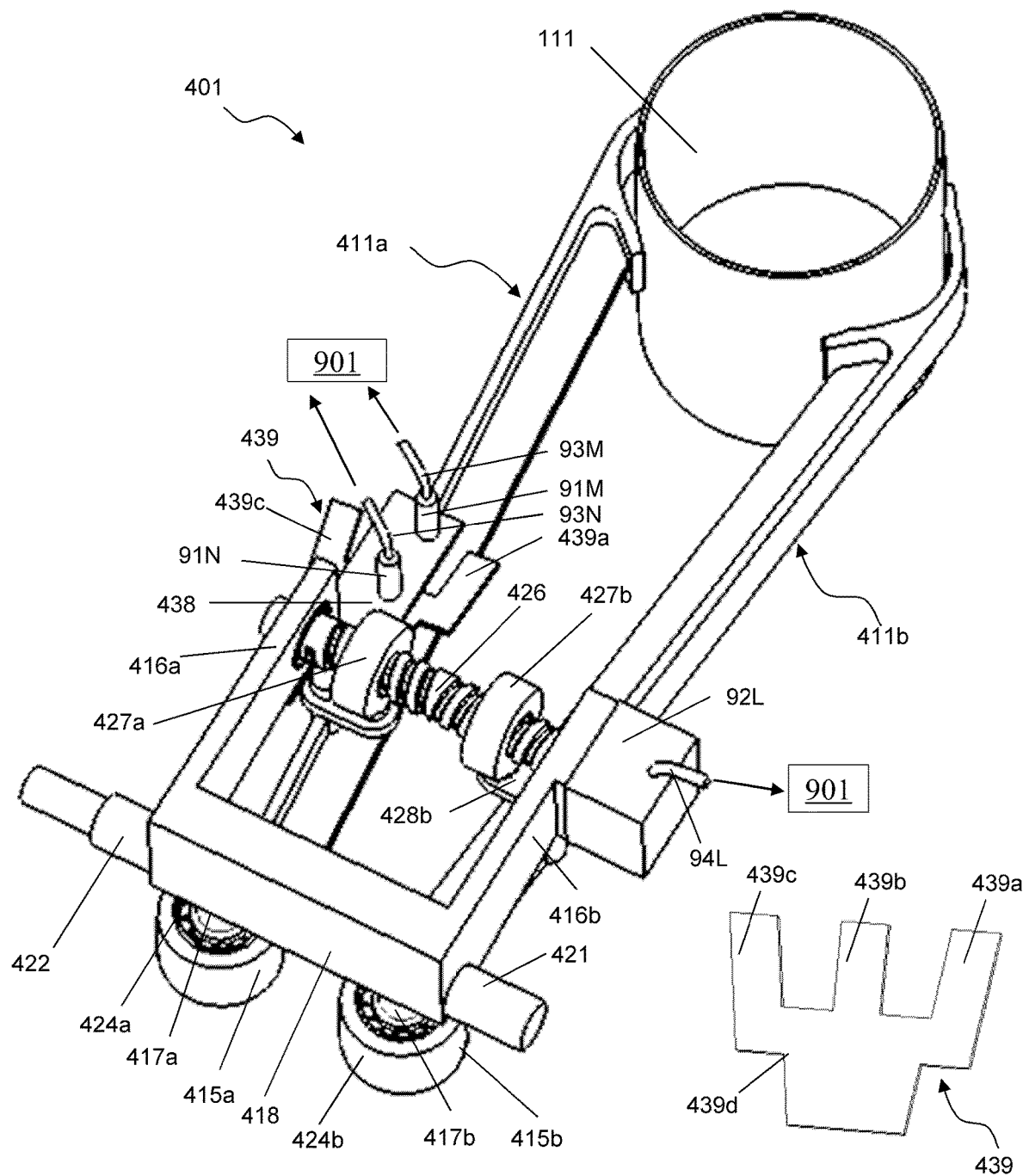
FIG. 12E shows an aerial view of the gripping mechanism.

A pair of bearings 424a (and accessories) are configured to connect the shaft 417a and the bearing housing 415a of the gripping device 411a, so that the gripping device 411a is constrained to rotate relative to the shaft 417a (or equivalently, relative to the rigid component 418) around the axis of the shaft 417a. Similarly, another pair of bearings 424b (and accessories) are configured to connect the shaft 417b and the bearing housing 415b of the gripping device 411b, so that the gripping device 411b is constrained to rotate relative to the shaft 417b (or equivalently, relative to the rigid component 418) around the axis of the shaft 417b. As shown in FIGS. 12C-12D, the gripping mechanism 401 also comprises: a pair of screw nuts 427a and 427b; a pair of shafts 429a and 429b; a pair of links 428a and 428b; a screw shaft 426 comprising a horizontal axis; and a motor 92L comprising a base component and a shaft. The shaft 429a (or 429b) is rigidly joined with the screw nut 427a (or respectively 427b), and the axis of the shaft 429a (or 429b) is configured to be perpendicular to the axis of the screw nuts 427a (or respectively 427b). The shaft 429a (or 429b) is constrained to rotate relative to the link 428a (or respectively 428b) around the axis of the shaft 429a (or respectively 429b). The shaft 414a (or 414b) is constrained to rotate relative to the link 428a (or respectively 428b) around the axis of the shaft 414a (or respectively 414b). The axis of the shaft 414a (or 414b) is configured to be parallel to the axis of the shaft 429a (or respectively 429b). The screw shaft 426 is configured to be engaged with the screw nuts 427a and 427b, and the axis of the screw shaft 426 coincides with the axes of the screw nuts 427a and 427b. When the screw shaft 426 rotates, the screw nuts 427a and 427b are configured to simultaneously move in opposite directions, by the same speed. A pair of ball or roller bearings 431 are configured to connect the above discussed bearing housing of the rigid component 416a with a smooth round section of the screw shaft 426, and another pair of ball or roller bearings 431 are configured to connect the above discussed bearing housing of the rigid component 416b with another smooth round section of the screw shaft 426, so that the screw shaft 426 is constrained to rotate relative to the rigid components 416a and 416b (or equivalently, relative to the rigid component 418) around the axis of the screw shaft 426. A rotation of the screw shaft 426 may induce translations of the screw nuts 427a and 427b relative to the screw shaft 426, hence the shafts 429a,429b, 414a and 414b are moved relative to the support component 418. The motion of the shaft 414a (or 414b) induces a rotation of the gripping device 411a (or respectively 411b) relative to the support component 418, around the axis of the shaft 417a (or respectively 417b). It should be noted that the gripping devices 411a and 411b are rotated simultaneously in opposite directions. Since the gripping devices 411a and 411b are rotated, the grippers 412a and 412b may grip or release a container 111 which may hold food or food ingredients. The base component of the motor 92L is configured to be rigidly or fixedly connected to the rigid component 416b, and the shaft of the motor 92L is configured to fixedly connected to and concentric with the screw shaft 426, so that the motor 92L may drive a rotation of the screw shaft 426 around the axis of the screw shaft 426. Thus, the rotation produced by the motor 92L on the screw shaft 426 may induce simultaneous rotations of the grippers 411a and 411b in opposite directions as to grip or release an ingredient container of various size.

The gripping mechanism 401 also comprises: two proximity switches 91N and 91M; a connector 438 configured to fixedly connect the two proximity switches 91N and 91M to the rigid component 416a (or equivalently, to the support component 418); a board 439 comprising targets 439a, 439b, 439c and 439d. The board 439 is attached on the arm 413a of the gripping device 411a. As shown in FIG. 12E, the motor 92L are connected to the computer 901 via wires 94L. The computer 901 may be configured to dynamically control the timing and/or speed of the motor 92L. The proximity switches 91M and 91N are also connected to the computer 901 separately via wires 93M and 93N, so the computer 901 may receive electric or electronic signals from the proximity switches 91M and 91N. The proximity switch 91M (or 91N) monitors the targets 439a, 439b and 439c (or respectively 439d) when the targets are rotated with the pair of gripping devices 411a and 411b. When the proximity switch 91M senses the target 439a and the proximity switch 91N senses the target 439d, the gripping devices 411a and 411b are rotated by the motor 92L to a position as to grip a large size ingredient container. When the proximity switch 91M senses the target 439b and the proximity switch 91N senses the target 439d, the gripping devices 411a and 411b are rotated by the motor 92L to a position as to grip a middle size ingredient container. When the proximity switch 91M senses the target 439c and the proximity switch 91N senses the target 439d, the gripping devices 411a and 411b are rotated by the motor 92L to a position to grip a small size ingredient container.

FIG. 12E shows an ingredient container 111 of a large size gripped by the gripping devices 411a and 411b of the gripping mechanism 401.

It should be noted that the screw threads of the screw nuts 427a and 427b may be configured to be of opposite helical directions, while the screw shaft 426 is configured to comprise two corresponding screw threads with opposite helical directions.

Figure 12F:
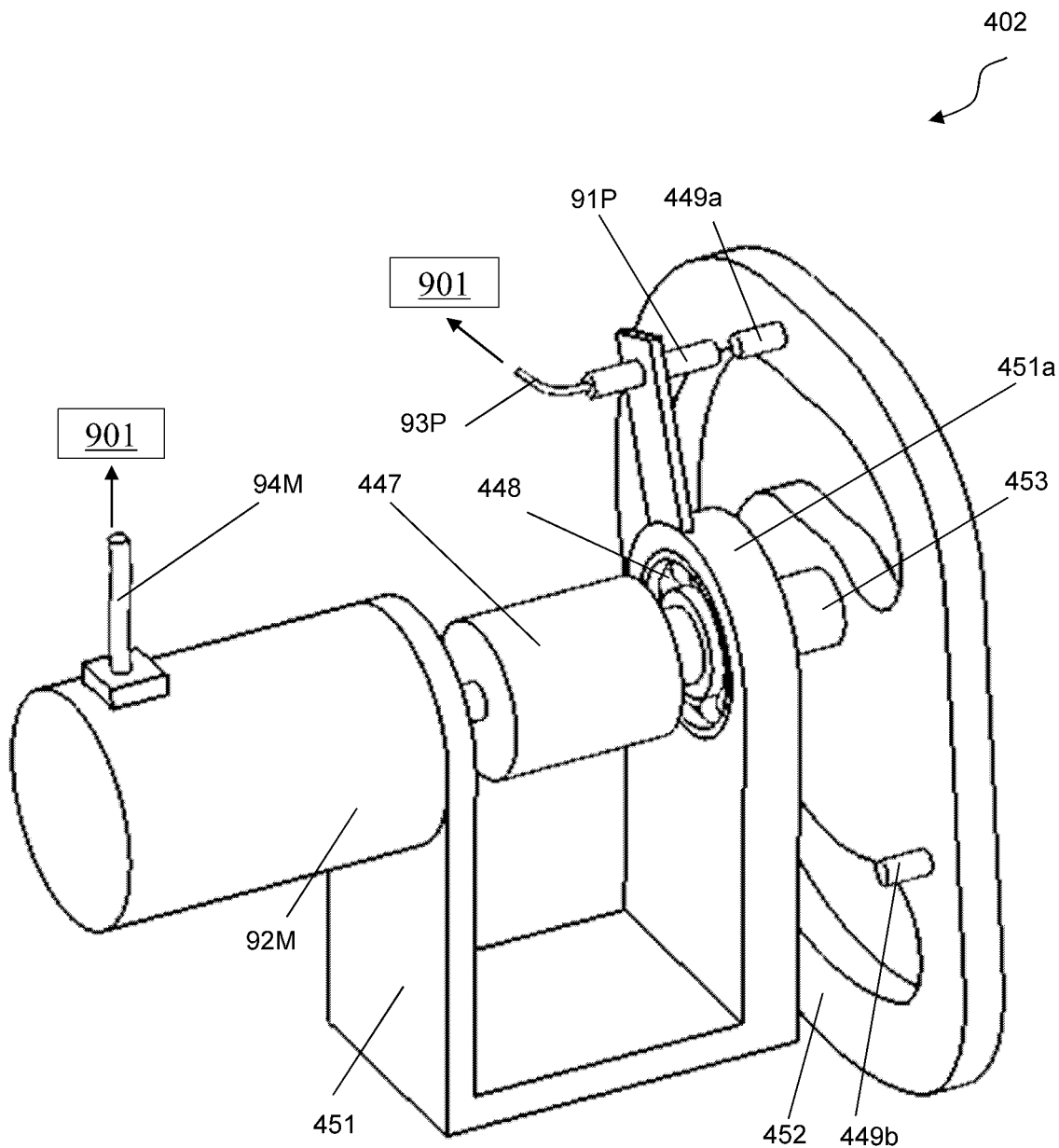
FIG. 12F shows an aerial view of a motion mechanism

Referring to FIG. 12F, a motion mechanism 402 which is similarly constructed as the motion mechanism 104 comprises: a cam 452 comprising a curved track, i.e. a curved hole of a certain width; a rigid component 451 comprising a bearing housing 451a; a shaft 453; a coupling 447; and a motor 92M comprising a shaft and a base component. The cam 452 is fixedly connected to the shaft 453. A bearing 448 is configured to connect the shaft 453 and the bearing housing 451a of the rigid component 451, so that the shaft 453 is constrained to rotate relative to the rigid component 451, around the axis of the shaft 453. The base component of the motor 92M is rigidly connected to the rigid component 451, and the shaft of the motor 92M is fixedly connected to the shaft 453 by the coupling 447. Thus, the motor 92M may drive the rotation of the shaft 453 relative to the rigid component 451 around the axis of the shaft 453, and hence the cam 452 is rotated relative to the rigid component 451 around the axis of the shaft 453. The curved track of the cam 452 has a curved profile comprising a circular arc at either end of the curved profile; where each circular arc is a part of a circle centered at the axis of the shaft 453. The edge of the curved track of the cam 452 comprises equidistant curve to the curved profile.

The motion mechanism 402 also comprises a proximity switch 91P fixedly connected to the bearing housing 451a via a connector; and two targets 449a and 449b both of which are joined with the cam 452. As shown in FIG. 12F, the motor 92M is connected to the computer 901 via wires 94M. The computer 901 may be configured to dynamically control the timing and/or speed of the motor 92M. The proximity switch 91P is also connected to the computer 901 via wires 93P, so the computer 901 may receive electric or electronic signals from the proximity switch 91P. The proximity switch 91P monitors the target 449a when the target is rotated in one direction with the cam 452 by the motor 92M. Similarly, the proximity switch 91P monitors the target 449b when the target is rotated in the other direction with the cam 452 by the motor 92M. When the cam 452 is rotated to a first position (or respectively second position) the proximity switch 91P senses the target 449a or 449b, the electric or electronic signals are sent to the computer 901, the computer 901 can figure out the position of the target, and the position of the cam 452. Then the computer 901 may send signals to the motor 92M to stop the rotation of the motor 92M during which the motion mechanism 402 can complete a corresponding process. After this time period, the motor 92M, under the control of the computer 901, may restart again and make a reverse rotation to rotate the cam 452 to the second position or respectively the first position.

Figure 12G:
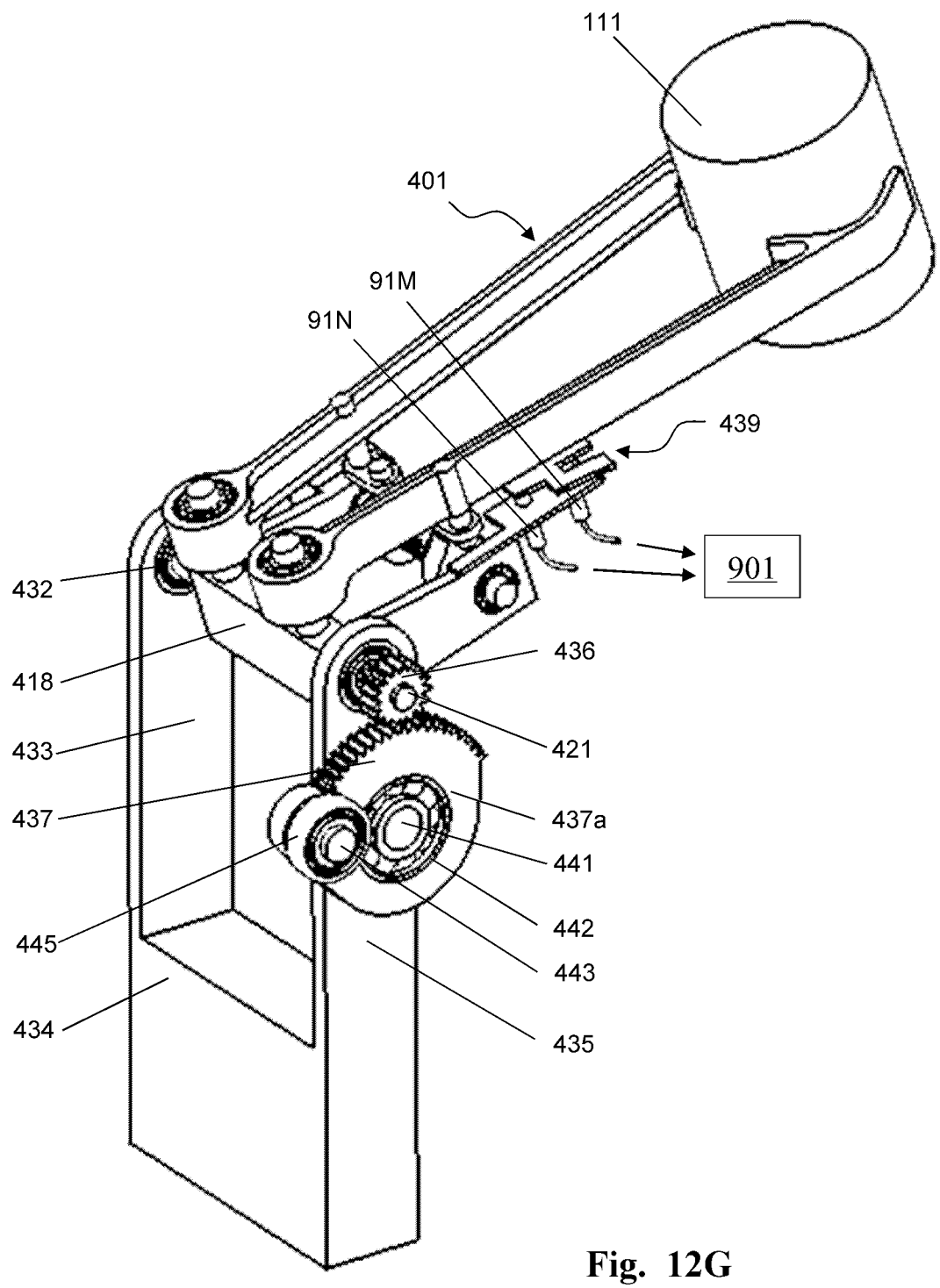
FIG. 12G shows an aerial view of parts of a dispensing apparatus.
Figure 12H:
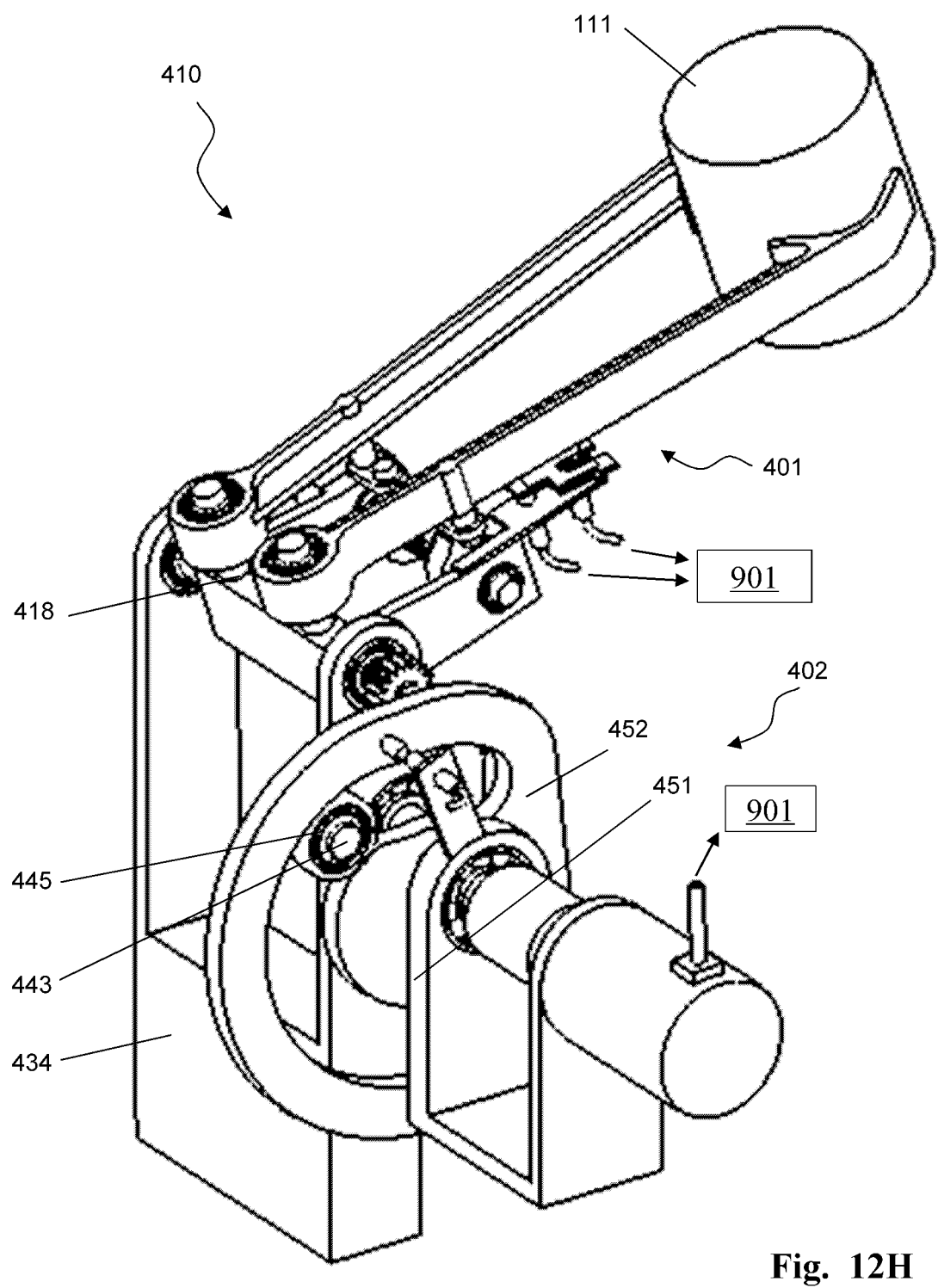
FIG. 12H shows an aerial view of the dispensing apparatus comprising the gripping mechanism and the motion mechanism.

Referring to FIGS. 12G-12H, an dispensing apparatus 410 comprises: the gripping mechanism 401; the motion mechanism 402; a support component 434 referred to as the support component of the dispensing apparatus 410; a gear 436 configured to be rigidly or fixedly connected to the shaft 421 of the gripping mechanism 401; a partial gear 437 comprising a bearing housing 437a at the center; shafts 441 and 443 whose axes are configured to be horizontal and parallel to the axis of the shaft 421; a wheel 445; and two vertical boards 433 and 435 each comprising a bearing housing, wherein the axis of the partial gear 437 is configured to be the same as the axis of the bearing housing 437a, wherein the vertical boards 433 and 435 are rigidly connected to the support component 434, wherein the axes of the bearing housing of the two vertical boards 433 and 435 are configure to be the same as the axes of the shaft 421 and 422 of the gripping mechanism 401.

As shown in FIG. 12G, a bearing 432 is configured to connect the shaft 422 (or 421) and the bearing housing of the vertical board 433 (or respectively 435), so that the shaft 422 (or respectively 421) is constrained to rotate relative to the vertical boards 433 (or respectively 435), or equivalently, relative to the support component 434, around the axis of the shafts 421 and 422. As explained before, the shafts 421 and 422 are rigidly connected to the rigid component 418; thus, the rigid component 418 of the gripping device 401 is constrained to rotate relative to the support component 434 around the axis of the shaft 421. The shaft 441 is rigidly connected to the vertical board 435. A bearing 442 is configured to connect the shaft 441 and the bearing housing 437a of the partial gear 437, so that the partial gear 437 is constrained to rotate relative to the shaft 441, or equivalently, relative to the support component 434, around the axis of the shaft 441. The partial gear 437 is engaged to the gear 421. The shaft 443 is rigidly connected to the partial gear 437; and the wheel 445 is concentric with the shaft 443 and is constrained to rotate relative to the shaft 443 around the axis of the shaft 443.

As shown in FIG. 12H, the wheel 445 is configured to be inserted in the curved track of the cam 452 of the motion mechanism 402, so that the edges of the curved track of the cam 452 may constrain the shaft 443. The width of the curved track of the cam 452 is nearly the same as the diameter of the wheel 445, with a very small allowance (less than 0.1 mm in some applications, although this is not a strict requirement). The rigid component 451 of the motion mechanism 402 is configured to be rigidly connected to the support component 434 (though the rigid connection is not shown in figure). The shafts 441 and 453 are configured to have parallel axes. As the cam 452 is rotated relative to the rigid component 451 by the motor 92M of the motion mechanism 402, the shaft 443 is rotated relative to the support component 434 around the axis of the shaft 441, hence the partial gear 437 is rotated around the axis of the shaft 441, and hence the support component 418 of the gripping mechanism 401, together with a gripped ingredient container if any, e.g., the ingredient container 111 as shown in FIG. 12G, are rotated around the axis of the shaft 441.

The distance between the axes of the shafts 443 and 441 is configured to be smaller than the distance between the axes of the shafts 441 and 453. The axes of the shafts 441, 443 and 453 are configured to be never collinear, and thus, the rotation of the partial gear 437 (around the shaft 441) has a limited range (less than 180 degrees). The rotation of the cam 452 (around the axis of the shaft 453) also has a limited range, as the wheel 445 restricts the rotation of the cam 452. The partial gear 437 is at an end position relative to the support component 434 if the wheel 445 is touched by the curved track corresponding to one of the circular ends. Since the gear 432 is engaged with the partial gear 437, the gear 432 and the support component 418 of the gripping mechanism 401 are rotated (around the axis of the shaft 421) between two end positions relative to the support component 434. When the support component 418 is rotated to a first end position, the axis of a gripped ingredient container (e.g., ingredient container 111), if any, is configured to be vertical and the gripped ingredient container is positioned upright. When the support component 418 of the gripping mechanism 401 is rotated from the first end position to the second end position, the gripped ingredient container, if any, is configured to be rotated by a certain degree as to dispense the food or food ingredients from the ingredient container into a cooking container 100, as shown in FIG. 12G (where the ingredient container 111 is positioned with bottom on the up side). It should be noted that the angular range of rotation of the support component 418 between the two end positions, may be configured to be a constant chosen between 120 to 180 degrees, or in a more restrictive application, between 135 degrees or 170 degrees.

It should be noted that when the proximity switch 91P senses the target 449a or 449b, the support component 418 of the gripping mechanism 401 is rotated to the first end position or respectively second end position and the shaft 231 is constrained by one of the circular profiles of the curved track of the cam 452. At this time the computer would send signals to the motor 92M as to control the rotation of the motor 92M. Thus, the rotation of the rigid component 418 around the axis of the shaft 421 or 422 may be braked by the motion mechanism 402 (as the 104).

It should be noted that the dispensing apparatus 410 comprises the followings:

(1) the gripping mechanism 401 configured to grip or release a container 111, wherein the gripping mechanism 401 comprises the rigid component 418, to be referred to as the support component of the gripping mechanism 401, or a first support component; a pair of gripping devices 411a and 411b which are configured to be constrained to rotate relative to the first support component 418; the motor 92L, proximity switches 91N and 91M; the rigid components 416a and 416b; the shafts 417a and 417b; the screw shaft 426; the screw nuts 427a and 427b; the shafts 429a and 429b; the links 428a and 428b; etc.; and their connections to each other if any, and their connections to the other components of the dispensing apparatus 410 if any;

(2) a rotational motion mechanism comprising the rigid component 434 referred to as the support component of the rotational motion mechanism, or a second support component, wherein the rotational motion mechanism is configured to produce an rotation of the first support component 418 between a first end position and a second end position relative to the second support component 434, around the axis of the shaft 421 (which is horizontal); wherein the rotational motion mechanism also comprises the motion mechanism 402, the gear 436, the partial gear 437 and the shaft 443, the shaft 441, the wheel 445, etc.; and their connections to each other if any, and their connections to other components of the dispensing apparatus 410 if any.

Figure 13:
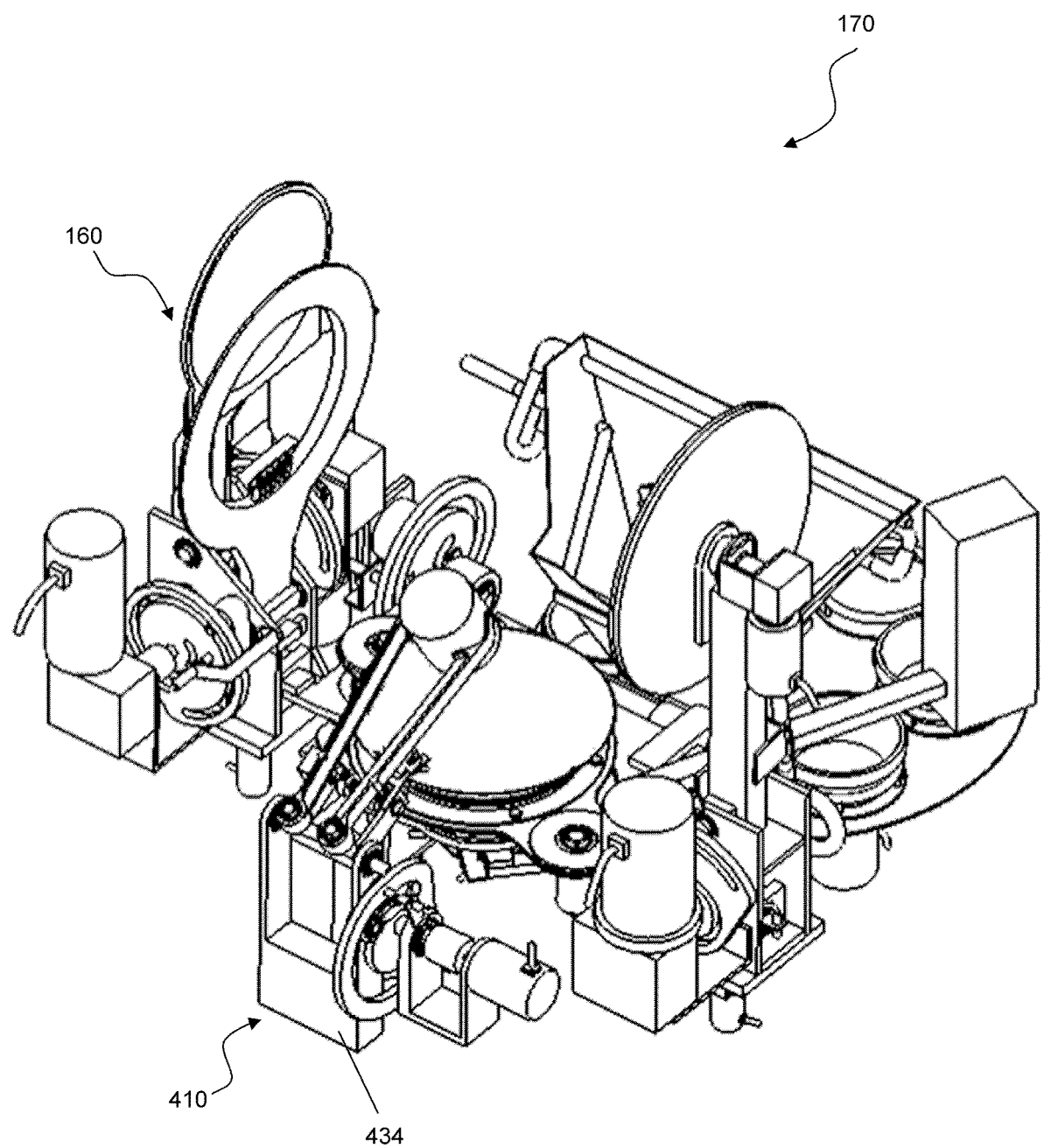
FIG. 13 shows an aerial view of a cooking sub-system comprising the dispensing apparatus shown in FIG. 12H.

Referring to FIG. 13, a cooking sub-system 170 comprises the automated cooking sub-system 160 and the dispensing apparatus 410 wherein the support component 434 of the dispensing apparatus 410 is rigidly connected to the second support component 175 of the automated cooking sub-system 160 (though the connection is not shown in figure; it is quite elementary to build the connection). As explained before, the dispensing apparatus 410 is configured to grip and then rotate an ingredient container (of several sizes), e.g. an ingredient container 111, while rotating the support component 418 of the gripping mechanism 401 between a first end position and a second end position relative to the support component 434.

Before the start of a cooking process of a food using food ingredients from an ingredient container, the rigid component 336 of the cleaning apparatus 330 of the automated cooking sub-system 160 needs to be rotated to the second end position relative to the support component 266 of the cleaning apparatus 330, and the first support component 226 of the cooking apparatus 120 of the automated cooking sub-system 160 needs to be rotated to the first end position relative to the second support component 175 of the cooking apparatus 120. Next, the solid cover 373 of the lid apparatus 350 of the automated cooking sub-system 160 is rotated to the second end position relative to the support component 385 of the lid apparatus 350, and the blocking device 371 is rotated to the first or second end position relative to the support component 385 of the lid apparatus 350. Then, the support component 418 of the gripping mechanism 401 (of the dispensing apparatus 410) may be rotated from the first end position to the second end position relative to the support component 434 of the dispensing apparatus 410, and the gripped ingredient container, if any, is rotated together with the support component 418, and the food or food ingredients contained in the gripped ingredient container are configured to be dispensed into the cooking container 100.

Figure 14A:
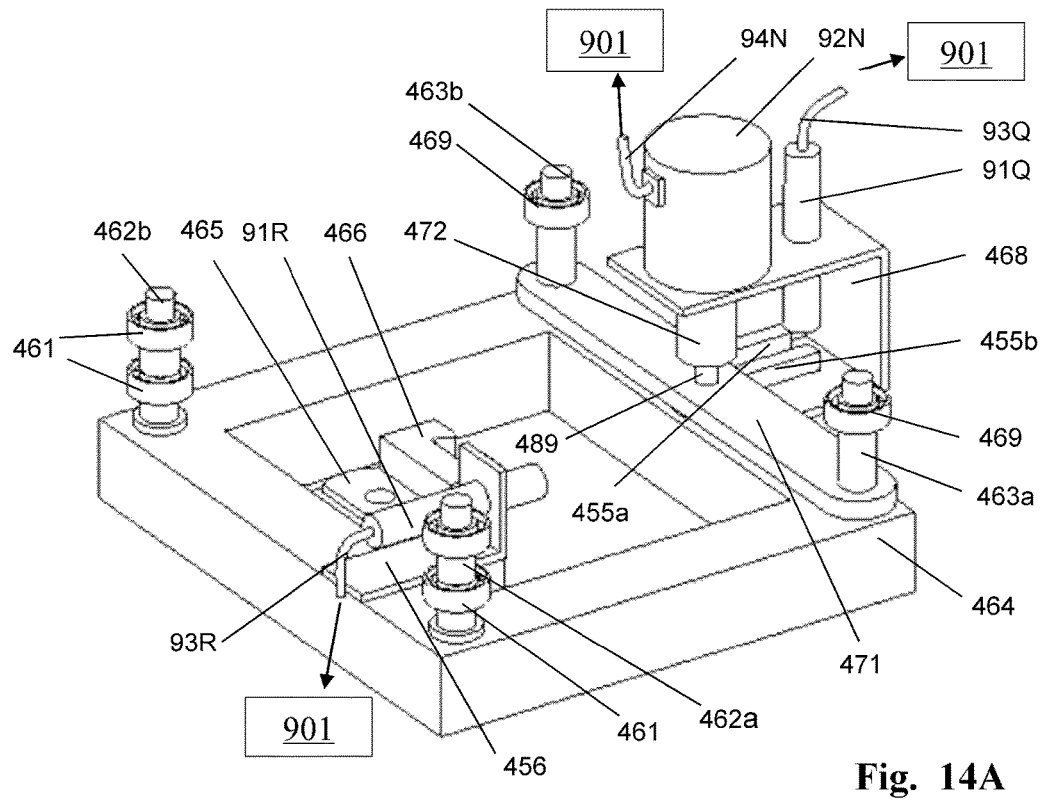
FIG. 14A shows an aerial view of parts of a gripping mechanism.
Figure 14B:
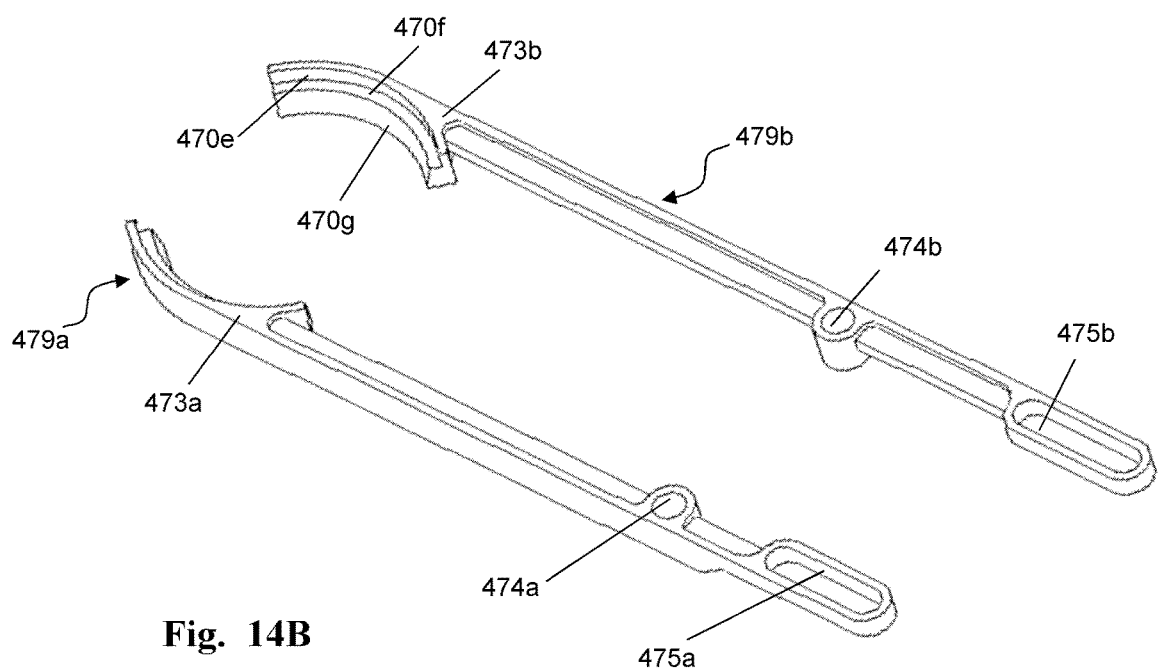
FIG. 14B shows an aerial view of a pair of gripping devices.
Figure 14C:
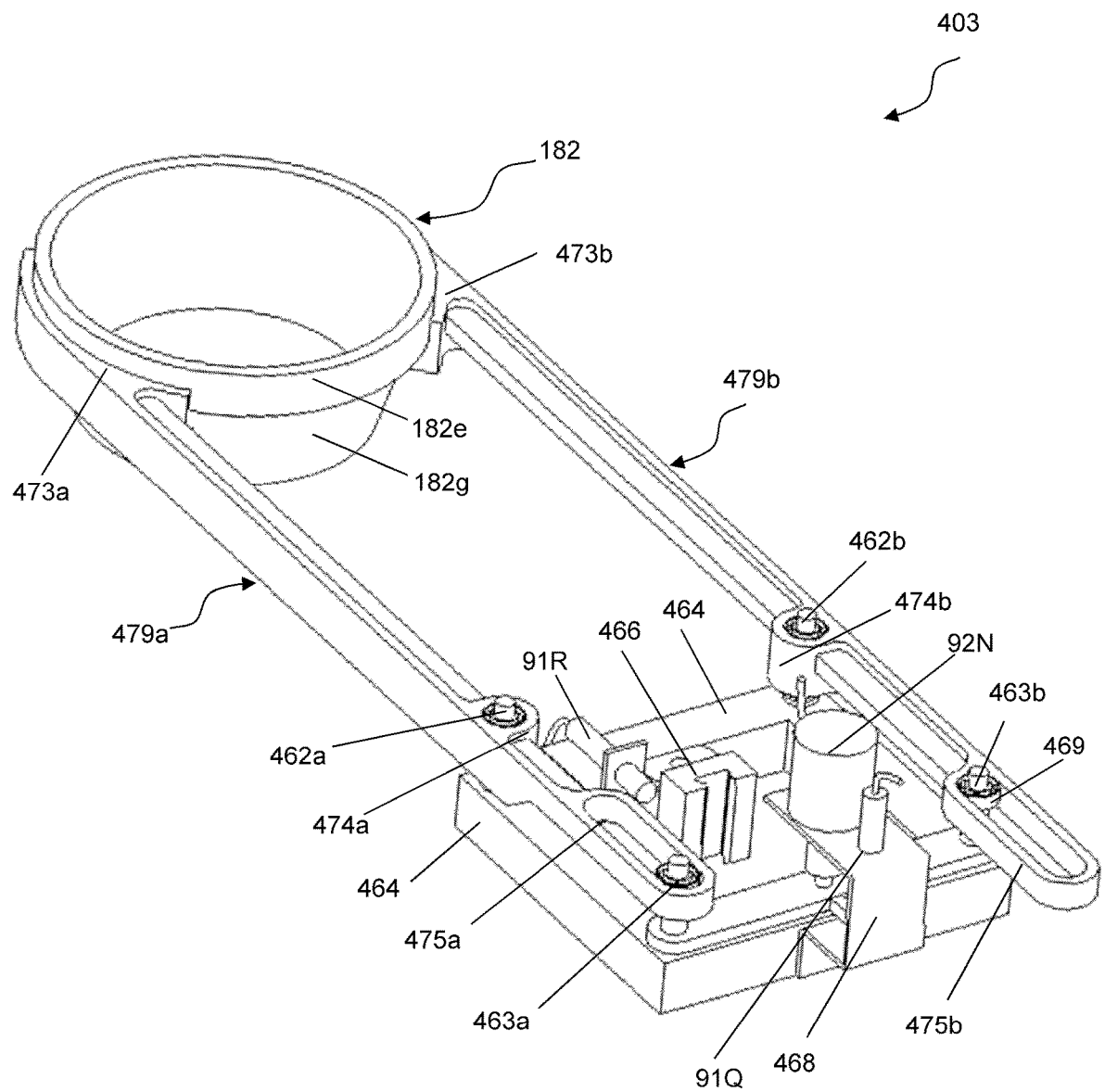
FIG. 14C shows an aerial view of the gripping mechanism

Referring to FIGS. 14A-14C, a gripping mechanism 403 comprises a support component 464, referred to as the support component of the gripping mechanism 403. The gripping mechanism 403 also comprises a pair of shafts 462a and 462b both of which are rigidly connected to the support component 464. See FIG. 14A. The gripping mechanism 403 further comprises: a pair of shafts 463a and 463b; a rigid component 471 in the shape of a board; a shaft 489 which is rigidly connected to the rigid component 471 and positioned in the middle of the rigid component 471; a motor 92N comprising a shaft and a base component; and a connecting component 468. Both the shafts 463a and 463b are configured to be rigidly connected to the rigid component 471 and separately positioned at the both ends of the rigid component 471. A wheel 469 is mounted on the shaft 463a and is concentric with the shaft 463a, such that the said wheel is constrained to rotate freely relative to the shaft 463a, around the axis of the shaft 463a. Another wheel 469 is mounted on the shaft 463b and is concentric with the shaft 463b, such that the said wheel is constrained to rotate freely relative to the shaft 463b around the axis of the shaft 463b. The base component of the motor 92N is fixedly connected to the support component 464 by the connecting component 468, and the shaft of the motor 92N is configured to fixedly connect to the shaft 489 by a coupling 472. Thus, the motor 92N may drive a rotation of the rigid component 471 relative to the support component 464. The gripping mechanism 403 further comprises a screw nut 465 and a linear slider 466, wherein the screw nut 465 is rigidly connected to the support component 464, and the linear slider 466 is fixedly mounted on the support component 464. The axes of the shafts 462a, 462b, 489, 463a and 463b, the axis of the screw nut 465 and the linear direction of the linear slider 466 are configured to be vertical.

As shown in FIG. 14B, the gripping mechanism 403 also comprises gripping devices 479a and 479b, wherein the gripping device 479a or 479b is a rigid component comprising a slotted hole 475a or respectively 475b, a bearing housing 474a or respectively 474b, a gripper 473a or respectively 473b. The surface of the gripper 473a or 473b on one side is configured to match the union of the surfaces 182f, a lower section of the surface 182e and a top section of the surface 182g; wherein the surfaces 182e, 182f and 182g are parts of the surface of the food container 182 shown in FIG. 6A-6C. In particular, the surface of the gripper 473a or 473b comprises a part 470e, which is configured to be a part of a cylindrical surface, wherein the radius of the said cylindrical surface is the same or nearly the same as the radius of the partial cylindrical surface 182e. Similarly, the surface of the gripper 473a or 473b comprises a flat part 470f which is the same or nearly the same as the flat surface 182f; and the surface of the gripper 473a or 473b comprises a part 470g, which is a part of a conical surface, which is the same or nearly the same as the said top section of the surface 182g.

As shown in FIG. 14C, two bearings 461 and accessories are configured to connect the bearing housing 474a of the gripping device 479a and the shaft 462a, so that the bearing housing 474a (or equivalently, the gripping device 479a) is constrained to rotate relative to the shaft 462a, or equivalent relative to the support component 464, around the axis of the shaft 462a. Similarly, another two bearings 461 and accessories are configured to connect the bearing housing 474b of the gripping device 479b and the shaft 462b, so that the bearing housing 474b (or equivalently, the gripping device 479b) is constrained to rotate relative to the shaft 462b, or equivalently relative to the support component 464, around the axis of the shaft 462b. Furthermore, the wheel 469 mounted on the shaft 463a (or 463b) is configured to be placed in the slotted hole 475a (or respectively 475b) of the gripping device 479a (or respectively 479b), so that a movement of the shaft 463a (or 463b) may induce a rotation in the gripping device 479a (or respectively 479b) around the axis of the shaft 462a (or respectively 462b). The motor 92N may induce a rotation of the rigid component 471 around the axis of the shaft 489. Hence the shafts 463a and 463b both of which are rigidly connected to the rigid component 471 are rotated around the axis of the shaft 489. Thus, the motor 92N may induce simultaneous rotations of the gripping devices 479a and 479b as to grip or release a food container 182. The rotations of the gripping devices 479a and 479b are configured to be in opposite directions. Since the gripping devices 479a and 479b are rotated, the grippers 473a and 473b may grip or release a food container 182 wherein the food container 182 may hold a cooked food. When the gripping devices 479a and 479b grip a food container 182, the surfaces 470e, 470f and 470g on the surface of the gripper 473a (or 473b) are configured to touch or nearly touch the surfaces 182e, 182f and respectively 182g of the exterior surface of the food container 182. In addition, when the food container 182 is gripped by the gripping devices 479a and 479b of the gripping mechanism 403, as shown in FIG. 14C, the food container 182 is configured to be positioned upright as to be able to hold a cooked food.

The gripping mechanism 403 also comprises proximity switches 91Q and 91R, targets 455a and 455b both of which are rigidly connected to the rigid component 471. The proximity switch 91Q is fixedly mounding on the connecting component 468 and the proximity switch 91R is fixedly connected to the support component 464 via a connector. As shown in FIGS. 14A, 14C, the motor 92N is connected to the computer 901 via wires 94N. The computer 901 may be configured to dynamically control the timing and/or speed of the motor 92N. As shown in FIG. 14A, the proximity switch 91Q is also connected to the computer 901 via wires 93Q, so the computer 901 may receive electric or electronic signals from the proximity switch 91Q. The proximity switch 91Q monitors the targets 455a and 455b when the targets are rotated with the rigid component 471 by the motor 92N. When the rigid component 471 is rotated by the motor 92N to a first position where the proximity switch 91Q senses the target 455a, the pair of gripping devices 479a and 479b is gripping a food container 182. Similarly, when the rigid component 471 is rotated by the motor 92N to a second position where the proximity switch 91Q senses the target 455b, the pair of gripping devices 479a and 479b is releasing? the food container 182. Each time the rigid component 471 is rotated to the first or second end position, the computer 901 may send signals to the motor 92N as to control the rotation of the motor 92N.

It should be noted that a rubber or silica gel or other elastic material may be attached to the gripping devices 479a and 479b.

Figure 14D:
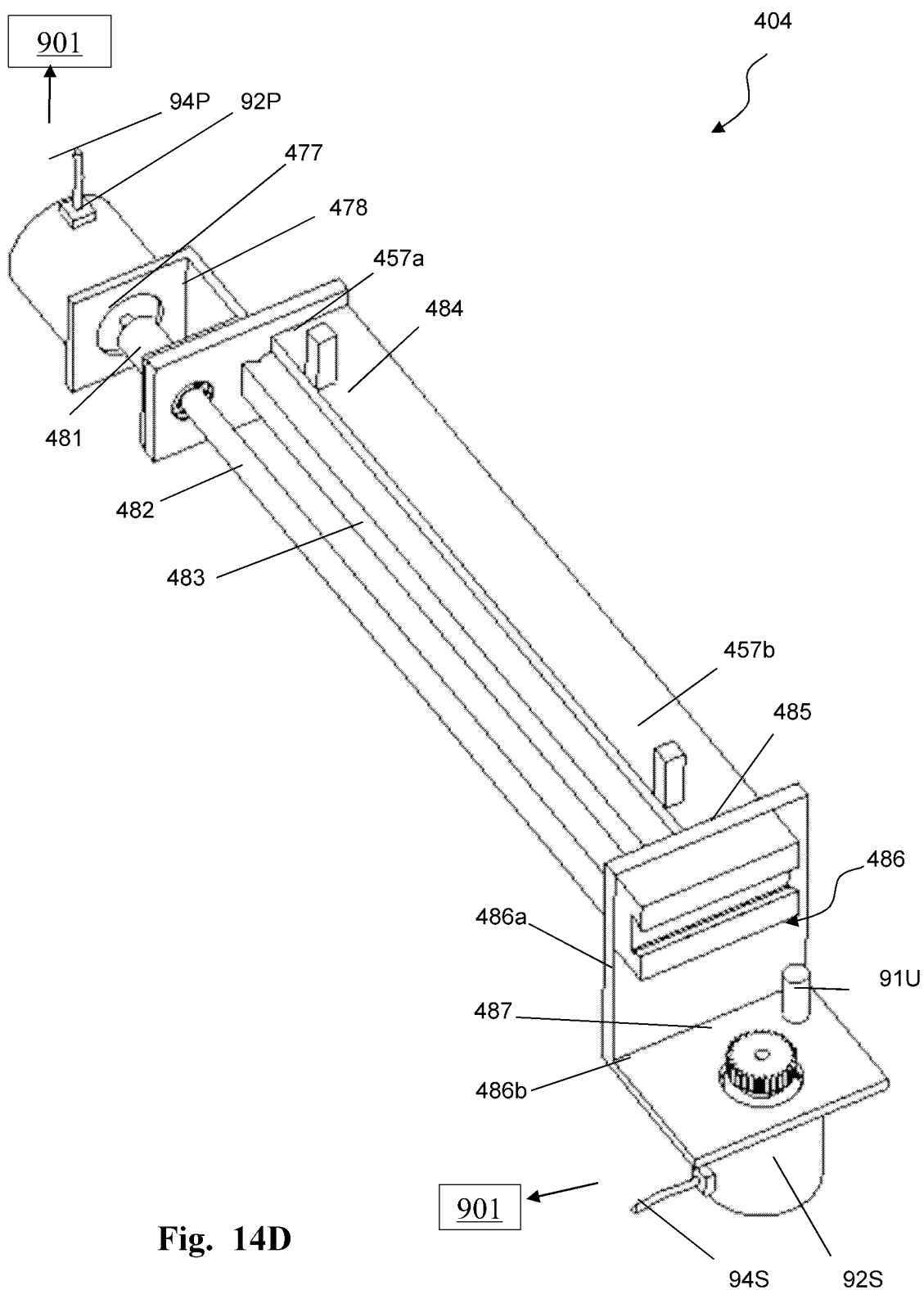
FIG. 14D shows an aerial view of a transfer sub-apparatus.

Referring to FIG. 14D, a transfer sub-apparatus 404 comprises: a horizontal board 481 comprising a bearing housing; an L-shaped rigid component 486 comprising a horizontal board 486a and a vertical board 486b, wherein the horizontal board 486a comprises: a rigid housing; a rigid connector 484 configured to rigidly connect the horizontal board 481 and the horizontal board 486a of the L-shaped rigid component 486; a screw shaft 482 comprising a vertical axis and a linear sliding track 483. The axes of the bearing housing of the horizontal board 481 and the bearing housing of the horizontal board 486a are configured to be concentric. A bearing and accessories (hidden in figure) are configured to connect the bearing housing of the horizontal board 481 and a round section of the screw shaft 482, and another bearing and accessories are configured to connect the bearing housing of the horizontal board 486a with another round sections of the screw shaft 482, so that the screw shaft 482 is constrained to rotate relative to the horizontal board 481 and the L-shaped rigid component 486 (or equivalently, relative to the rigid connector 484), around the axis of the screw shaft 482. The linear sliding track 483 is attached on one side of the rigid connector 484. The axis of the screw shaft 482 and the sliding direction of the linear sliding track 483 are configured to vertical.

The transfer sub-apparatus 404 further comprises: a connecting component 478; a motor 92P comprising a shaft and a base component; a connecting component 478 configured to connect the base component of the motor 92P and the horizontal board 481; a coupling 477 configured to join the shaft of the motor 92P and the screw shaft 482. The motor 92P may drive a rotation of the screw shaft 482 relative to the rigid connector 484, around the axis of the screw shaft 482. The transfer sub-apparatus 404 further comprises: a motor 92S comprising a base component and a shaft wherein the base component is fixedly connected to the vertical board 486b of the L-shaped rigid component 486; a gear 487 which is rotatable relative to the vertical board 486b; wherein the shaft of the motor 92S is configured to be fixedly connected to the gear 487, and the axis of the gear 487 and the axis of the shaft of the motor 92S are the same, so that the motor 92S may drive the rotation of the gear 487 relative to the L-shaped rigid component 486. The transfer sub-apparatus 404 also comprises a linear slider 485, which is fixedly mounted on the horizontal board 486a, on the lower side. The axis of the gear 487 and the direction of the linear slider 485 are configured to be horizontal, and perpendicular to each other. The transfer sub-apparatus 404 also comprises two targets 457a and 457b; and a proximity switch 91U. The two targets 457a and 457b are attached to the side of the rigid connector 484. The proximity switch 91U is fixedly connected to the vertical board 486b of the L-shaped rigid component 486.

It should be noted that the vertical board 486b may be configured to comprise a bearing housing, and the gear 487 in the transfer sub-apparatus 404 may be rigidly connected to a shaft, wherein the said shaft may be connected to the said bearing housing of the vertical board 486b by one or more bearings and accessories, so that the said shaft is constrained to rotate relative to the vertical board 486b around the axis of the said shaft, wherein the axis of the said shaft is configured to coincide with the axis of the gear 487, wherein the said shaft is fixedly connected to the shaft of the motor 92S via a coupling so that the motor 92S may drive a rotation of the said shaft.

Figure 14E:
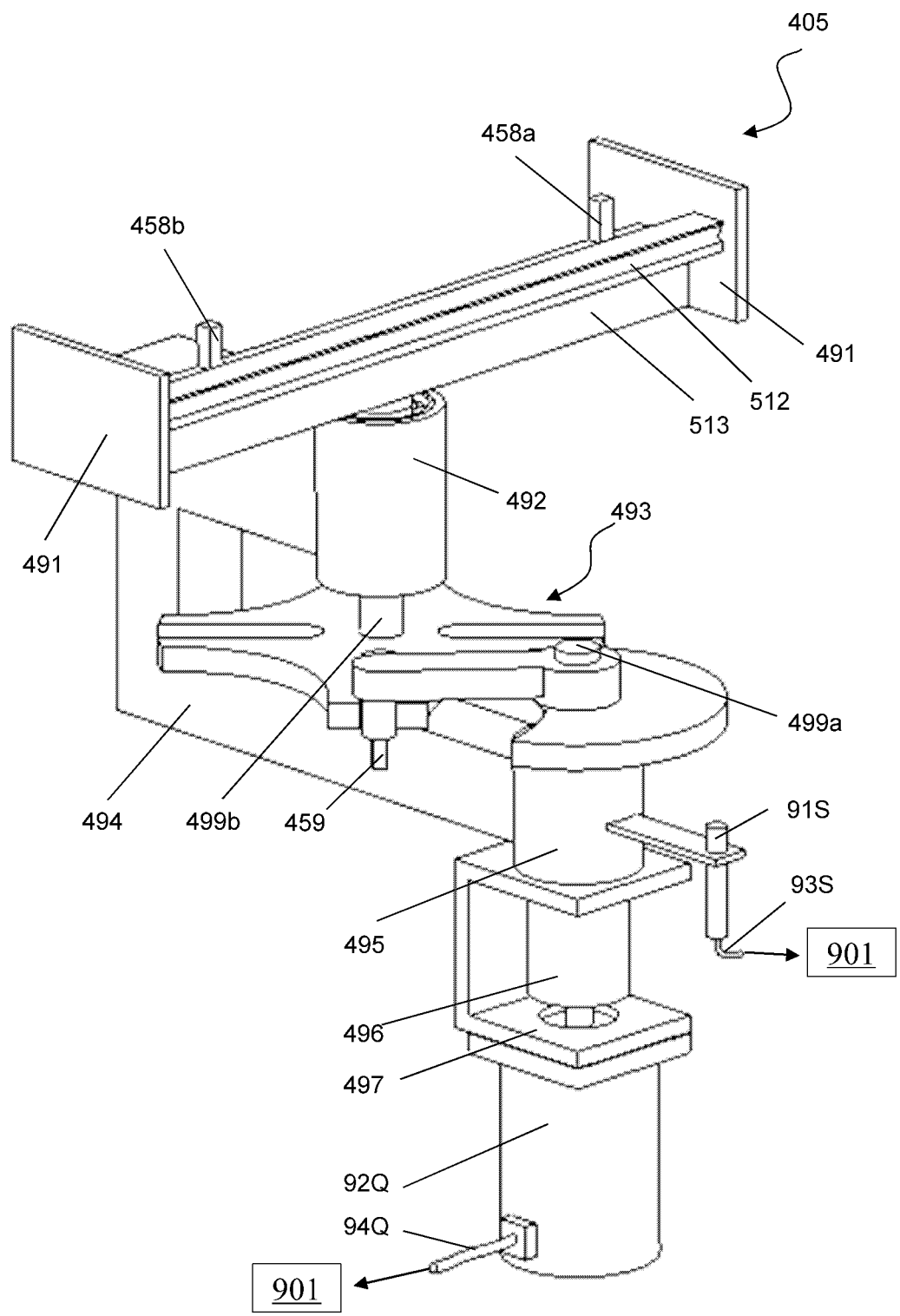
FIGS. 14E-14F show aerial views of a rotational motion mechanism
Figure 14F:
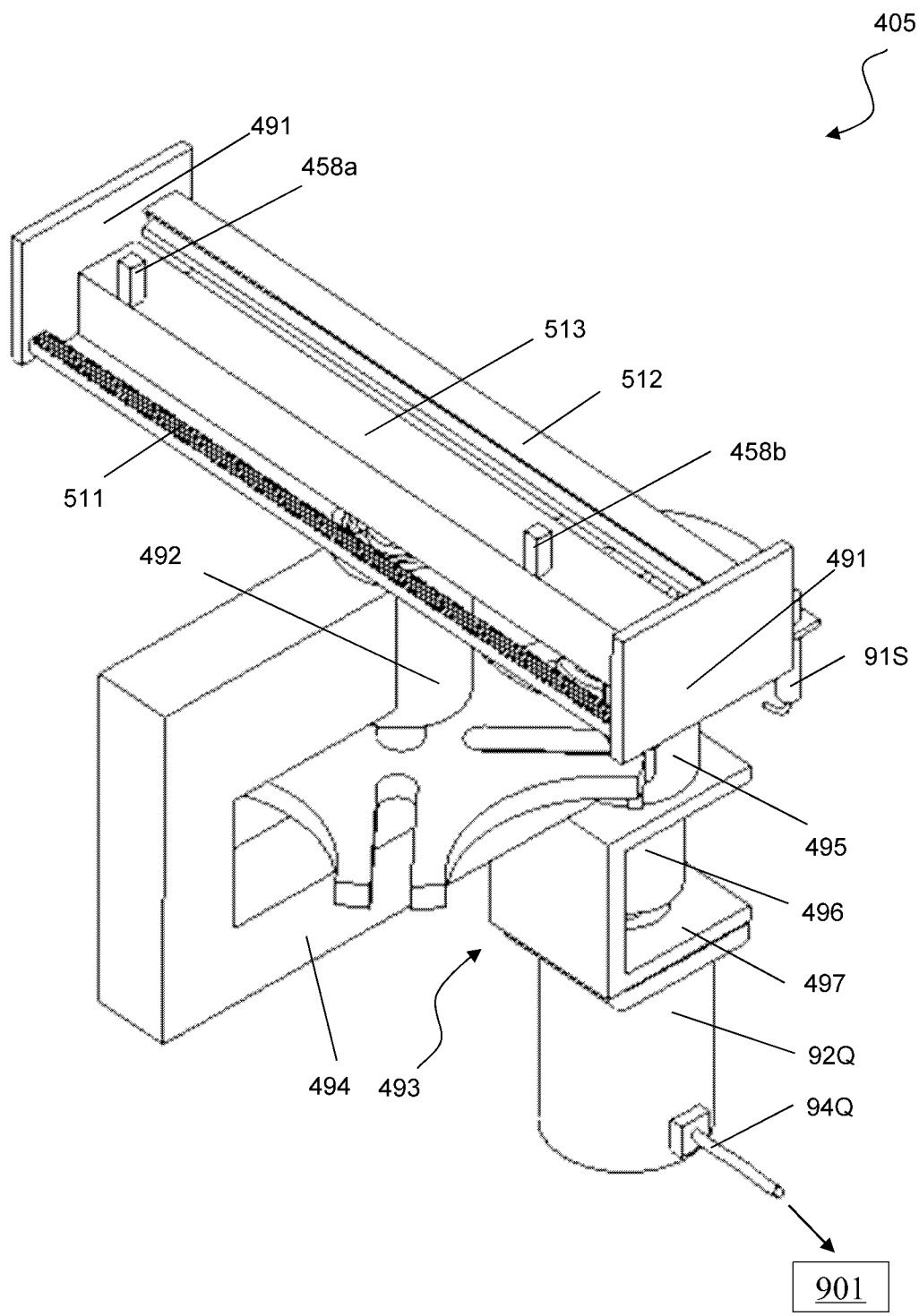

Referring to FIGS. 14E-14F, a rotational motion mechanism 405 comprises: two bearing housings 492 and 495 each comprising a vertical axis; a support component 494 configured to rigidly connect the bearing housings 492 and 495; a rigid component 513; a rack 511; a linear sliding track 512; and two vertical boards 491; wherein the rack 511 and the linear sliding track 512 are rigidly connected to the rigid component 513. The directions of the rack 511 and of the linear sliding track 512 are configured to be horizontal and parallel to each other. The two vertical boards 491 are separately attached to the ends of the rack 511, the ends of the rigid component 513, and the ends of the linear sliding track 512, as to enhance the rigidity.

The rotational motion mechanism 405 also comprises: a Geneva mechanism 493 comprising: an input shaft 499a configured to be rotatable relative to the support component 494 around the axis of the shaft 499a; an output shaft 499b configured to be rotatable relative to the support component 494 around the axis of the shaft 499b; a motor 92Q comprising a shaft and a base component; a coupling 496 configured to connect the input shaft 499a and the shaft of the motor 92Q; and a connecting component 497 configured to fixedly connect the base component of the motor 92Q to the bearing housing 495; wherein a continuous rotations of the input shaft 499a relative to the support component 494 is configured to produce an intermittent rotation of the output shaft 499b relative to the support component 494. (It should be noted that a pair of bearings may be configured to connect the input shaft 499a and the bearing housing 495, so that the shaft 499a is constrained to rotate relative to the bearing housing 495, or equivalently, relative to the support component 494, around the axis of the shaft 499a. Similarly, bearings may be configured to connect the output shaft 499b and the bearing housing 492, so that the shaft 499b is constrained to rotate relative to the bearing housing 492, or equivalently, relative to the support component 494.) Thus, the motor 92Q may drive the rotation of the input shaft 499a of the Geneva mechanism 493 relative to the support component 494. Since the rigid component 513 is rigidly connected to the output shaft 499b, the rigid component 513 is also constrained to rotate relative to the support component 494 around the axis of the output shaft 499. In summary, the motor 92Q may induce an intermittent rotation of the rigid component 513.

The rotational motion mechanism 405 also comprises a proximity switch 91S fixedly connected to the bearing housing 495 via a connector; and a target 459 rigidly connected to a crank of the Geneva mechanism 493, and two targets 458a and 458b both of which are attached on the rigid component 513. As shown in FIG. 14E, the motor 92Q is connected to the computer 901 via wires 94Q. The computer 901 may be configured to dynamically control the timing and/or speed of the motor 92Q. As shown in FIG. 14E, the proximity switch 91S is also connected to the computer 901 via wires 93S, so the computer 901 may receive electric or electronic signals from the proximity switch 91S. Each time the crank of the Geneva mechanism 493 is rotated to a position where the proximity switch 91S senses the target 459 and the electric or electronic signals of the proximity switch 91S are sent to the computer 901, the computer 901 would send signals to the motor 92Q as to control the rotation of the motor 92Q. At each stop of the rotation, the rotational motion mechanism 405 may complete a corresponding process.

Figure 14G:
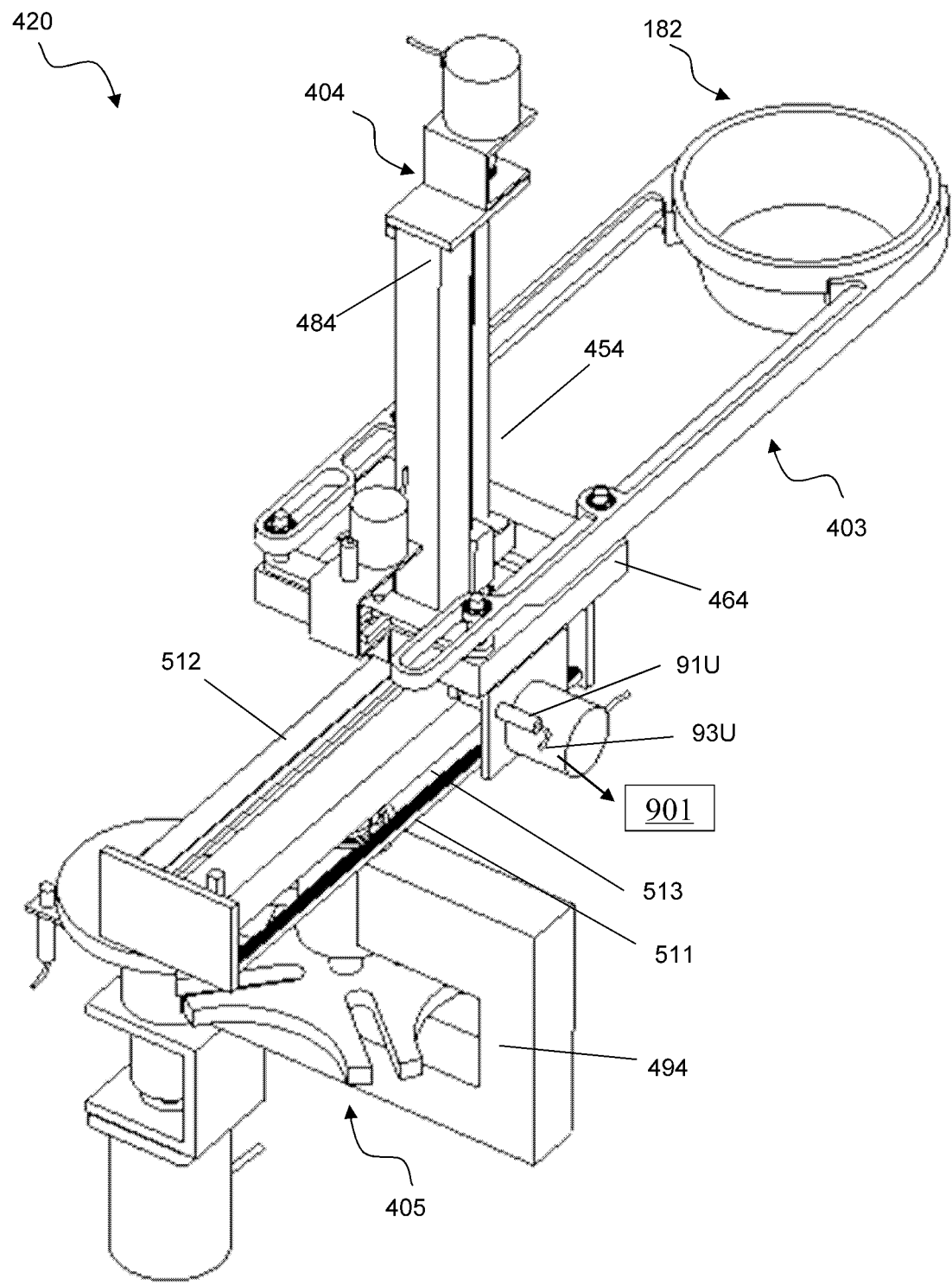
FIG. 14G shows an aerial view of a transfer apparatus comprising the gripping mechanism, the transfer sub-apparatus and the rotational motion mechanism.

Referring to FIG. 14G, a transfer apparatus 420 comprising the gripping mechanism 403, the transfer sub-apparatus 404 and the rotational motion mechanism 405. The screw shaft 482 of the transfer sub-apparatus 404 is configured to be engaged with the screw nut 465 of the gripping mechanism 403 and the linear slider 466 of the gripping mechanism 403 is configured to slide along the linear sliding track 483 of the transfer sub-apparatus 404, so that when the motor 92P of the transfer sub-apparatus 404 produces a rotation of the screw shaft 482, the support component 464 of the gripping mechanism 403 is configured to slide vertically along the linear sliding track 483 relative to the rigid connector 484 of the transfer sub-apparatus 404. The gear 487 of the transfer sub-apparatus 404 is engaged with the rack 511 of the rotational motion mechanism 405 and the linear slider 485 of the transfer sub-apparatus 404 is configured to slide along the linear sliding track 512 of the rotational motion mechanism 405, so that when the motor 92S of the transfer sub-apparatus 404 drives the rotation of the gear 487, the rigid connector 484 is configured to slide horizontally along the linear sliding track 512 relative to the rigid component 513 of the rotational motion mechanism 405.

As shown in FIG. 14D, the motors 92P and 92S are connected to the computer 901 separately via wires 94P and 94S. The computer 901 may be configured to dynamically control the timing and/or speed of the motors 92P and 92S. As shown in FIGS. 14A and 14G, the proximity switches 91R and 91U are also connected to the computer 901 separately via wires 93R and 93U, so the computer 901 may receive electric or electronic signals from the proximity switches 91R and 91U. The proximity switch 91R of the gripping mechanism 403 monitors the targets 457a and 457b when the gripping mechanism 403 is slid along the axis of the screw shaft 482 by the motor 92P. Each time the proximity switch 91R senses the targets 457a or 457b, the computer 901 may send signals to the motor 92P as to stop the rotation of the motor 92P for a time period. Similarly, the proximity switch 91U of the transfer sub-mechanism 404 monitors the targets 458a and 458b when the proximity switch 91U is slid with the transfer sub-mechanism 404 by the motor 92S. Each time the proximity switch 91U senses the targets 458a or 458b, the computer 901 may send signals to the motor 92S as to stop the rotation of the motor 92S for time period. At each stop of the rotation of the motor 92P or 92S, the transfer apparatus 420 would complete a corresponding process. As explained before, the computer 901 may control the rotation of the motor 92Q according to the electric or electronic signals of the proximity switch 91S. Thus, the transfer apparatus 420 may be controlled by the computer 901 to grip a food container 182 and move it linearly in vertical direction of the axis of the screw shaft 482, or linearly in horizontal direction, or horizontally by an intermittently rotation around the axis of the shaft 499b, or by a combination of them, and then it may release the food container 182 at a position which is different from the previous position.

The support component 464 of the gripping mechanism 403 will be referred to as a first support component of the transfer apparatus 420. The rigid component 484 of the transfer sub-apparatus 404 will be referred to as a second support component of the transfer apparatus 420. The rigid component 513 of rotational motion mechanism 405 will be referred to as a third support component of the transfer apparatus 420. The support component 494 will be referred to as a fourth support component of the transfer apparatus 420.

It should be noted that the transfer apparatus 420 comprises the followings:

(1) the gripping mechanism 403 configured to grip or release a food container 182, wherein the gripping mechanism 403 comprises the first support component 464 (of the transfer apparatus 420, same below);

(2) a vertical motion mechanism referred to as a first motion mechanism, configured to produce a vertical linear motion in the first support component 464 relative to the second support component 484 referred to as support component of the first motion mechanism, wherein the first motion mechanism comprises the motor 92P, coupling 477, screw shaft 482, linear sliding track 483, linear slider 466, horizontal board 481, L-shaped rigid component 486, screw nut 465, etc.; and their connections to each other if any, and their connections to the other components of the transfer apparatus 420 if any;

(3) a horizontal motion mechanism referred to as a second motion mechanism, configured to produce a horizontal linear motion in the second support component 484 relative to the third support component 513, wherein the second motion mechanism comprises the motor 92S, gear 487, linear slider 485, rack 511, linear sliding track 512, etc., and their connections to each other if any, and their connections to other components of the transfer apparatus 420 if any;

(4) a rotational motion mechanism referred to as a third motion mechanism, configured to produce an intermittent rotation of the third support component 513 relative to the fourth support component 494, wherein the third motion mechanism comprises the motor 92Q, coupling 496, connecting component 497, Geneva mechanism 493, bearing housings 492 and 495, etc., and their connections to each other if any, and their connections to other components of the transfer apparatus 420 if any. It should be noted that the axis of intermittent rotation of the third support component 513 relative to the fourth support component 494 is vertical.

The transfer apparatus 420 may be used to grip a food container 182 which is positioned upright and may move the said food container 182 linearly in vertical direction, or linearly in horizontally, or horizontally rotation around the axis of the shaft 499b, or by a combination of these, and then it may release the food container 182 at a position which is different from a previous position.

It should be noted that the computer 901 be configured to dynamically control the rotations and/or speed of the motors in the transfer apparatus 420 according to the electric or electronic signals of the proximity switches 91Q, 91R, 91U in the transfer apparatus 420.

Figure 15A:
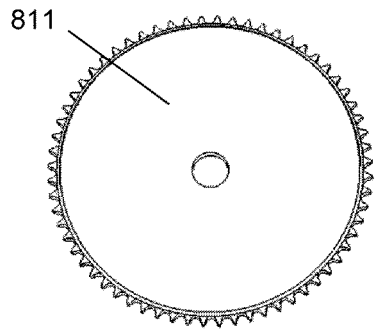
FIG. 15A shows an aerial view of a chain wheel.
Figure 15B:
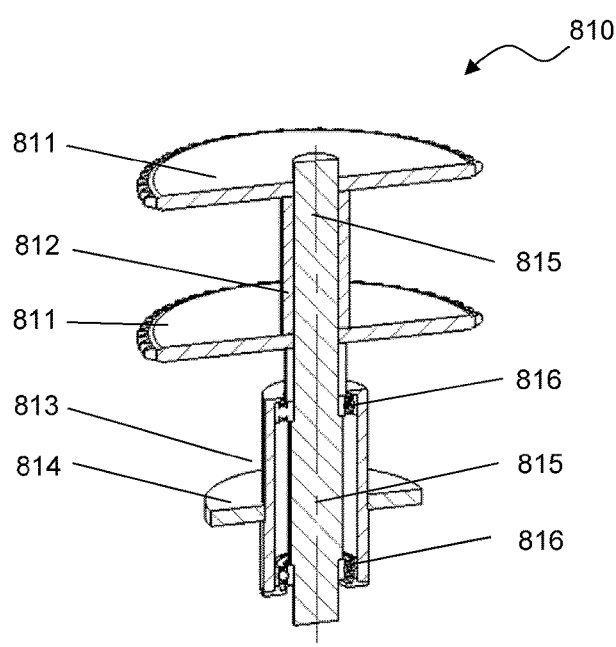
FIG. 15B shows a cut view of a chain wheel sub-mechanism

Referring to FIGS. 15A-15B, a chain wheel sub-mechanism 810 comprises a bearing housing 813, a shaft 815, a ring-shaped support component 814 and a pair of bearings 816. The support component 814 is rigidly joined with the bearing housing 813. The pair of bearings 816 (and accessories) are configured to connect the shaft 815 and the bearing housing 813, so that the shaft 815 is constrained to rotate relative to the bearing housing 813 around the axis of the shaft 815. The chain wheel sub-mechanism 810 also comprises two chain wheels 811, a ring 812 of cylinder shape. The two chain wheels 811 are rigidly connected to the shaft 815. The axes of the two chain wheels 811 and the axis of the shaft 815 are configured to coincide. When the shaft 815 rotates, the two chain wheels 811 are also rotated synchronously around the axis of the shaft 815. The ring 812 is on the shaft 815 and is positioned between the two chain wheels 811 as to separate the two chain wheels.

Figure 15C:
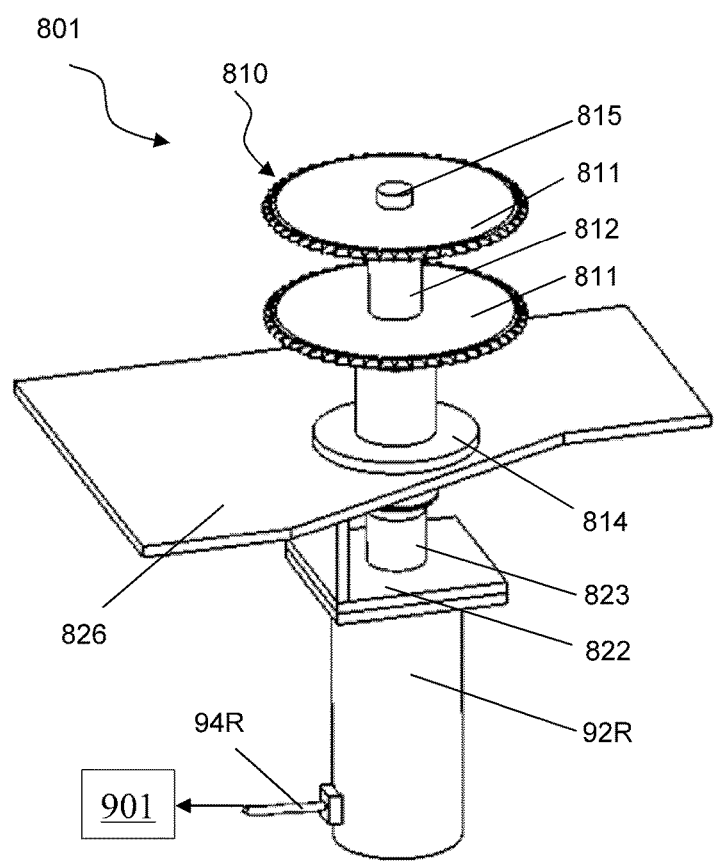
FIG. 15C shows an aerial view of a motion mechanism comprising the chain wheel sub-mechanism.

Referring to FIG. 15C, a chain driving mechanism 801 comprises the chain wheel sub-mechanism 810, a rigid component 826 in the shape of a board, a motor 92R comprising a shaft and a base component, a connecting component 822 and a coupling 823. The support component 814 of the chain wheel sub-mechanism 810 is rigidly connected to the rigid component 826 and the axis of shaft 815 of the chain wheel sub-mechanism 810 is configured to be perpendicular to the top surface of the rigid component 826. The shaft of the motor 92R is fixedly connected to the shaft 815 of the chain wheel sub-mechanism 810, so that the motor 92R may drive a rotation of the shaft 815 around the axis of the shaft 815; wherein the base of the motor 92R is fixedly connected to the rigid component 826 by the connecting component 822. The rotation of the shaft 815 induces a synchronous rotation of the chain wheels 811.

Figure 16:
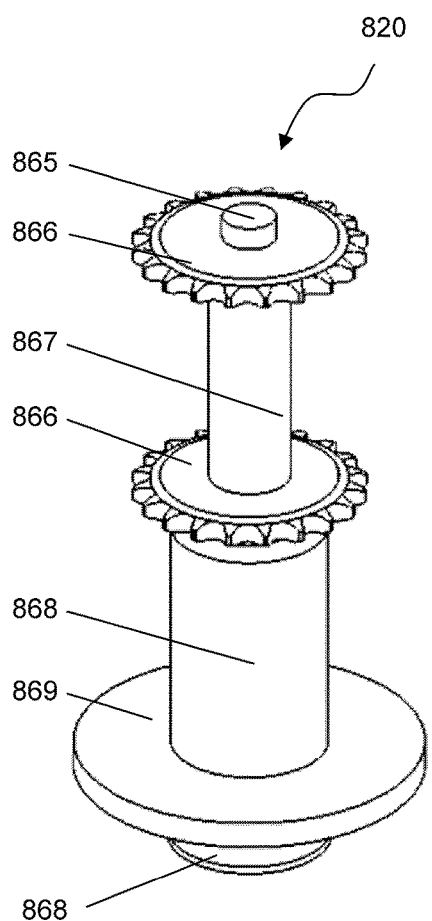
FIG. 16 shows an aerial view of another chain wheel sub-mechanism.

Referring to FIG. 16, a chain wheel sub-mechanism 820 comprises two chain wheels 866, a ring 867, a bearing housing 868, a ring-shaped rigid component 869 and a shaft 865. The rigid component 869 is rigidly joined with the bearing housing 868. A pair of bearings and accessories (hidden in Figure) are configured to connect the shaft 865 and the bearing housing 868, so that the shaft 865 is constrained to rotate relative to the bearing housing 868 around the axis of the shaft 865. The two chain wheels 866 are rigidly connected to the shaft 865 wherein the axes of the two chain wheels 866 and the axis of the shaft 865 are configured to coincide. A ring 867 is on the shaft 865 and is positioned between the two chain wheels 866 as to separate the two chain wheels. It should be noted that the chain wheels 866 are configured to rotate synchronously.

The chain wheel sub-mechanism 820 is similarly configured as the chain wheel sub-mechanism 810. However, the chain wheels 866 in the sub-mechanism 820 may be of smaller size compared with the chain wheels 811 in the sub-mechanism 810.

Figure 17:
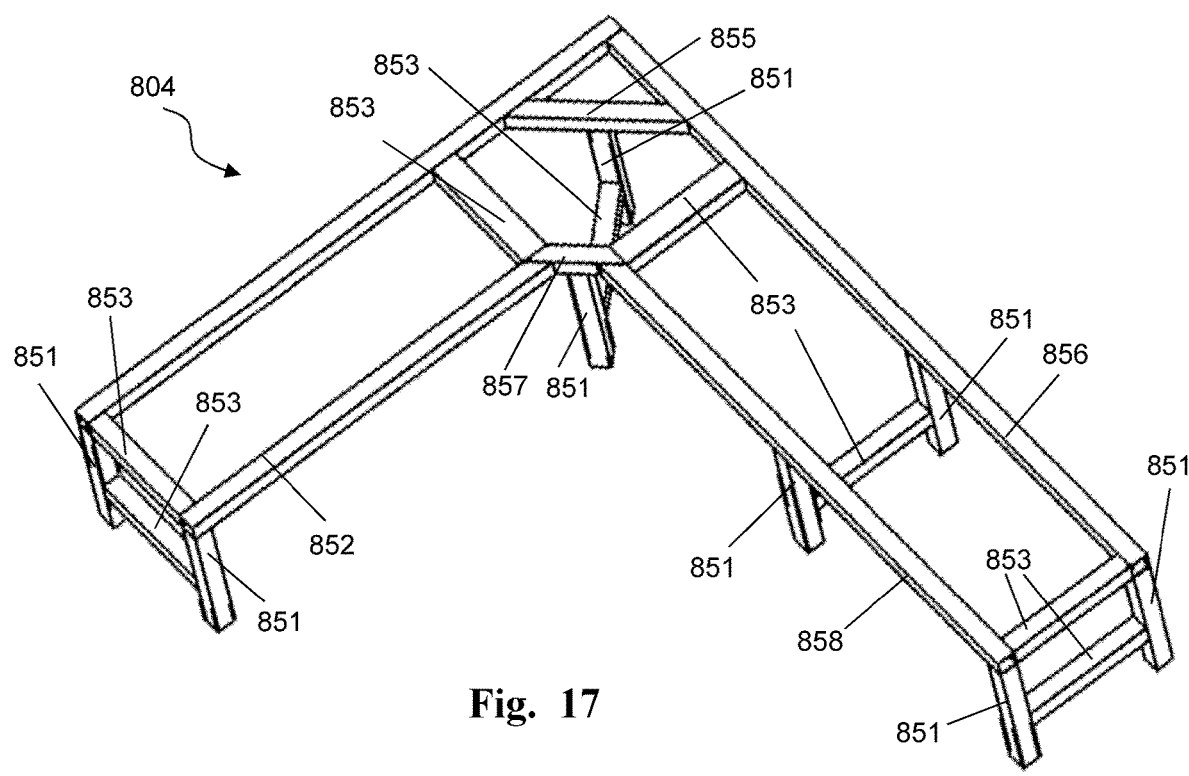
FIG. 17 shows an aerial view of a support frame.

Referring to FIG. 17, a support frame 804 comprises support beams 851, 852, 853, 855, 856, 857, 858, which are rigidly connected.

It should be noted that that support beams in the support frame 804 may comprise aluminum profiles in which case the support frame 804 may also comprise accessories configured to rigidly connect the aluminum profiles. Alternatively, the support beams in the support frame 804 may comprise steel square tubes which are welded together. There are other ways of constructing the support frame 804 using known techniques, e.g. by bolts and nuts.

Figure 18A:
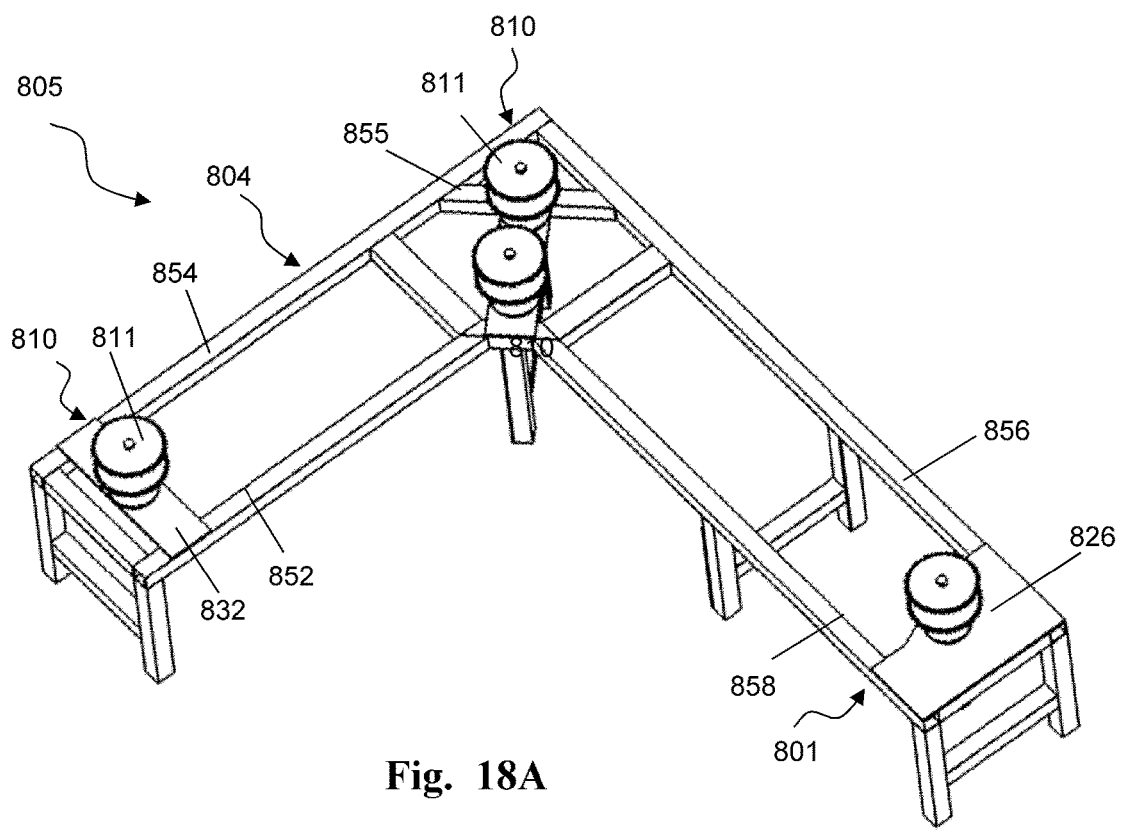
FIG. 18A shows an aerial view of a chain wheel sub-mechanism
Figure 18B:
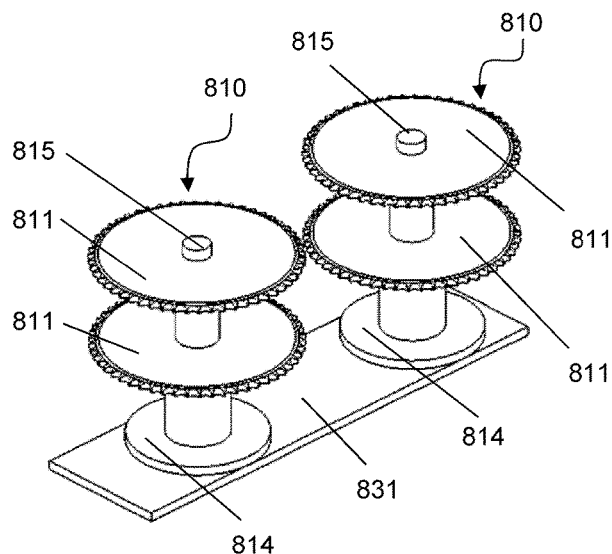
FIGS. 18B-18C show aerial views of some parts of the chain wheel sub-mechanism.
Figure 18C:
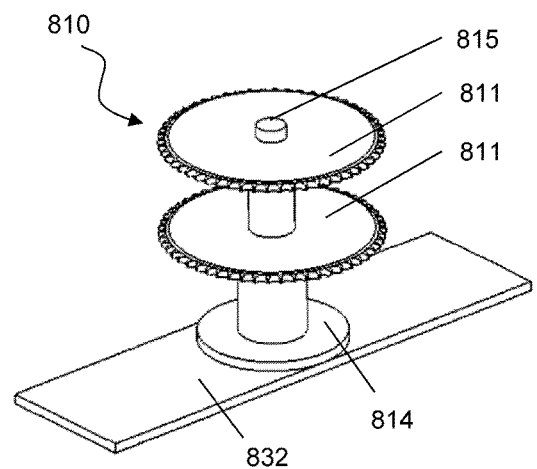

Referring to FIGS. 18A-18C, a chain wheel sub-mechanism 805 comprises the support frame 804, the chain driving mechanism 801, three chain wheel sub-mechanisms 810, and some flat connecting components 831 and 832. The rigid component 826 of the chain wheel driving mechanism 801 is rigidly connected with the support frame 804. The connecting components 831 and 832 are also rigidly connected with the support frame 804. The connecting component 831 is rigidly connected with the support components 814 of two chain wheel sub-mechanisms 810 (see FIG. 18B). The connecting component 832 is rigidly connected with the support component 814 of one chain wheel sub-mechanism 810 (see FIG. 18C). The axis of the shaft 815 of the chain wheel sub-mechanism 801 is configured to be vertical, and the top surface of the flat rigid component 826 is configured to be horizontal. Similarly, the axes of the shafts 815 of the chain wheel sub-mechanisms 810 are configured to be vertical, and the top surface of the flat connecting components 831 and 832 are configured to be horizontal. The higher chain wheels 811 of the chain wheel sub-mechanisms 810, and that of the chain driving mechanism 801 are configured to be positioned at the same height. Similarly, the lower chain wheels 811 of the chain wheel sub-mechanisms 810, and that of the chain driving mechanism 801 are configured to be positioned at the same height.

Figure 19A:
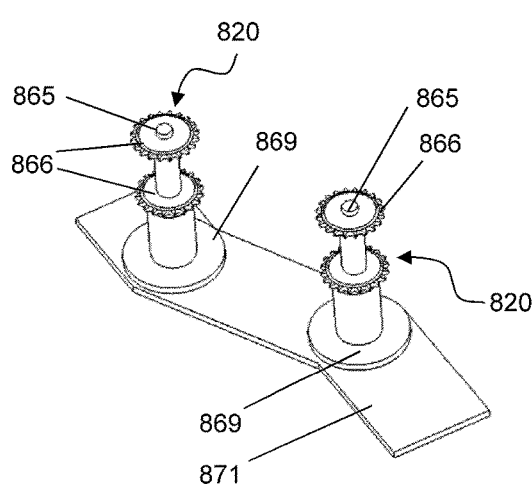
FIGS. 19A-19B show aerial views of parts of a chain wheel mechanism.
Figure 19B:
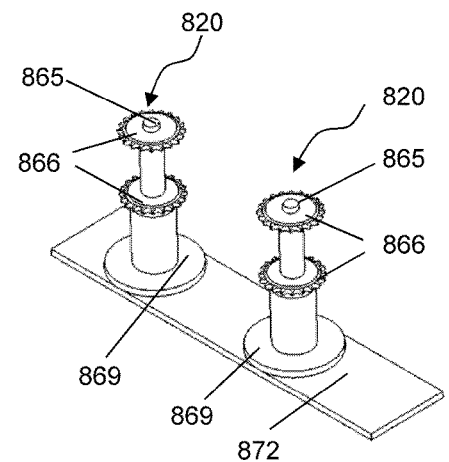
Figure 19C:
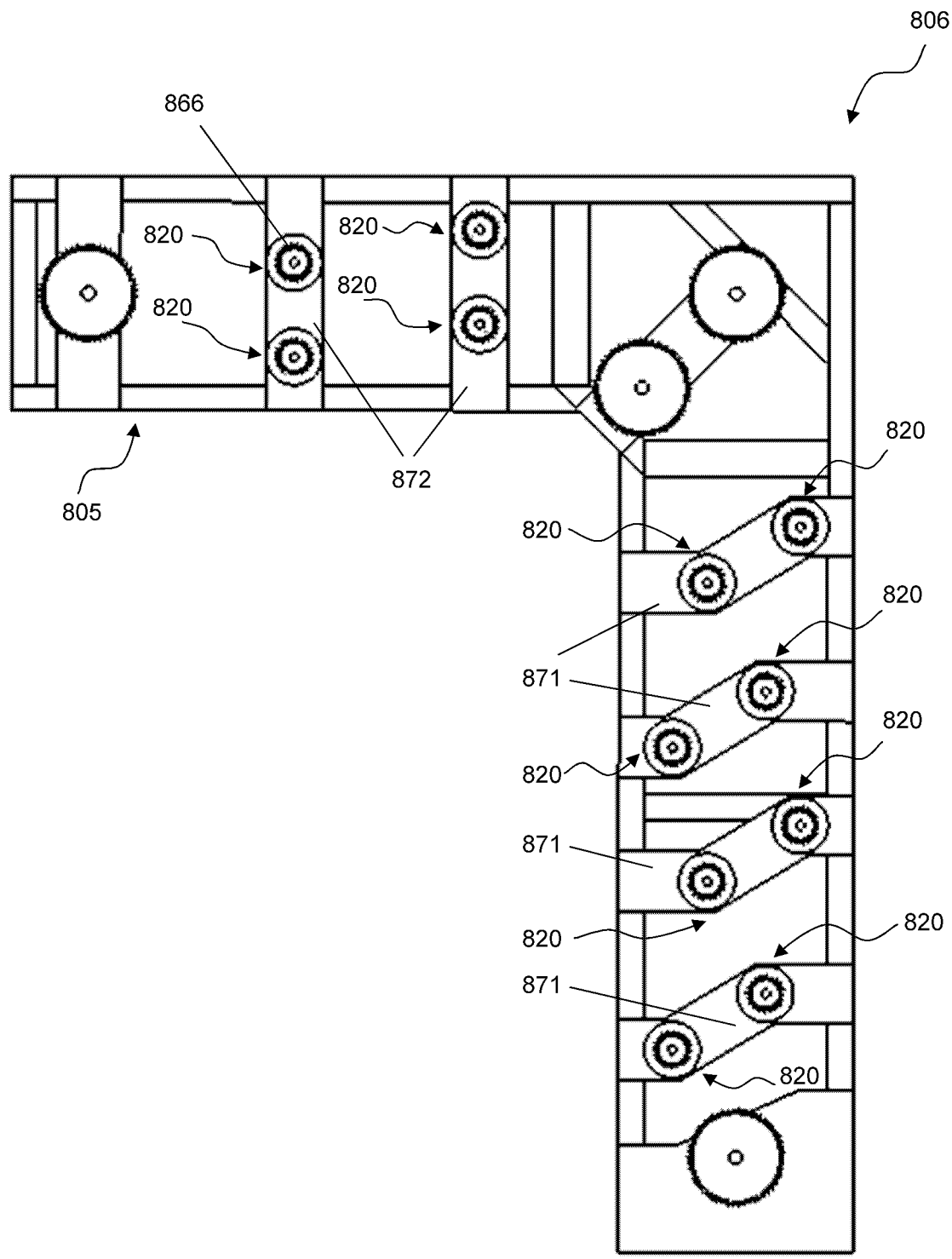
FIG. 19C shows a plane view of the chain wheel mechanism.
Figure 20A:
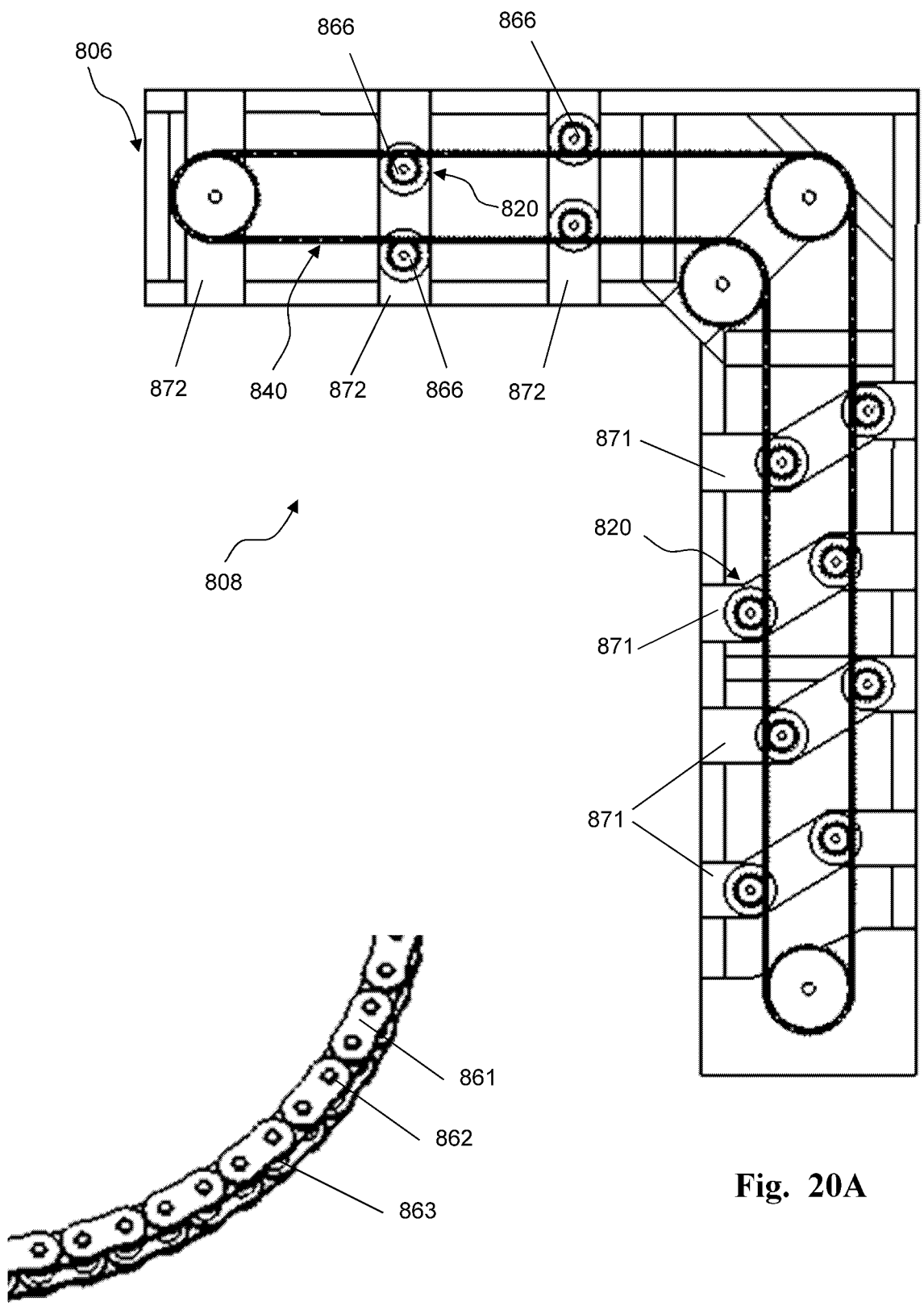
FIG. 20A shows a plane view of a chain transport apparatus.
Figure 20B:
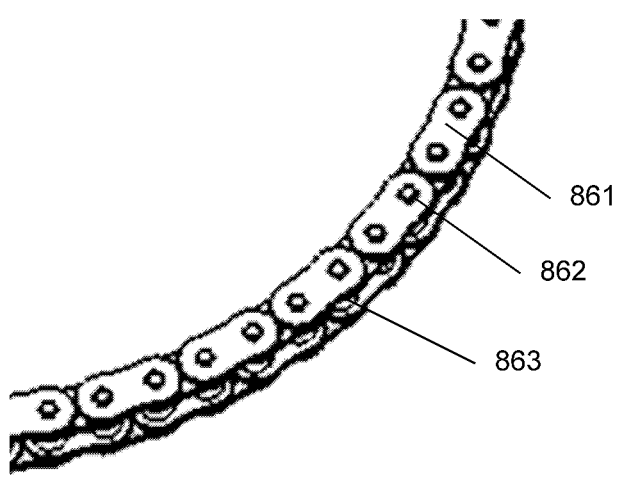
FIGS. 20B-20D show aerial views of parts of the chain transport apparatus.
Figure 20C:
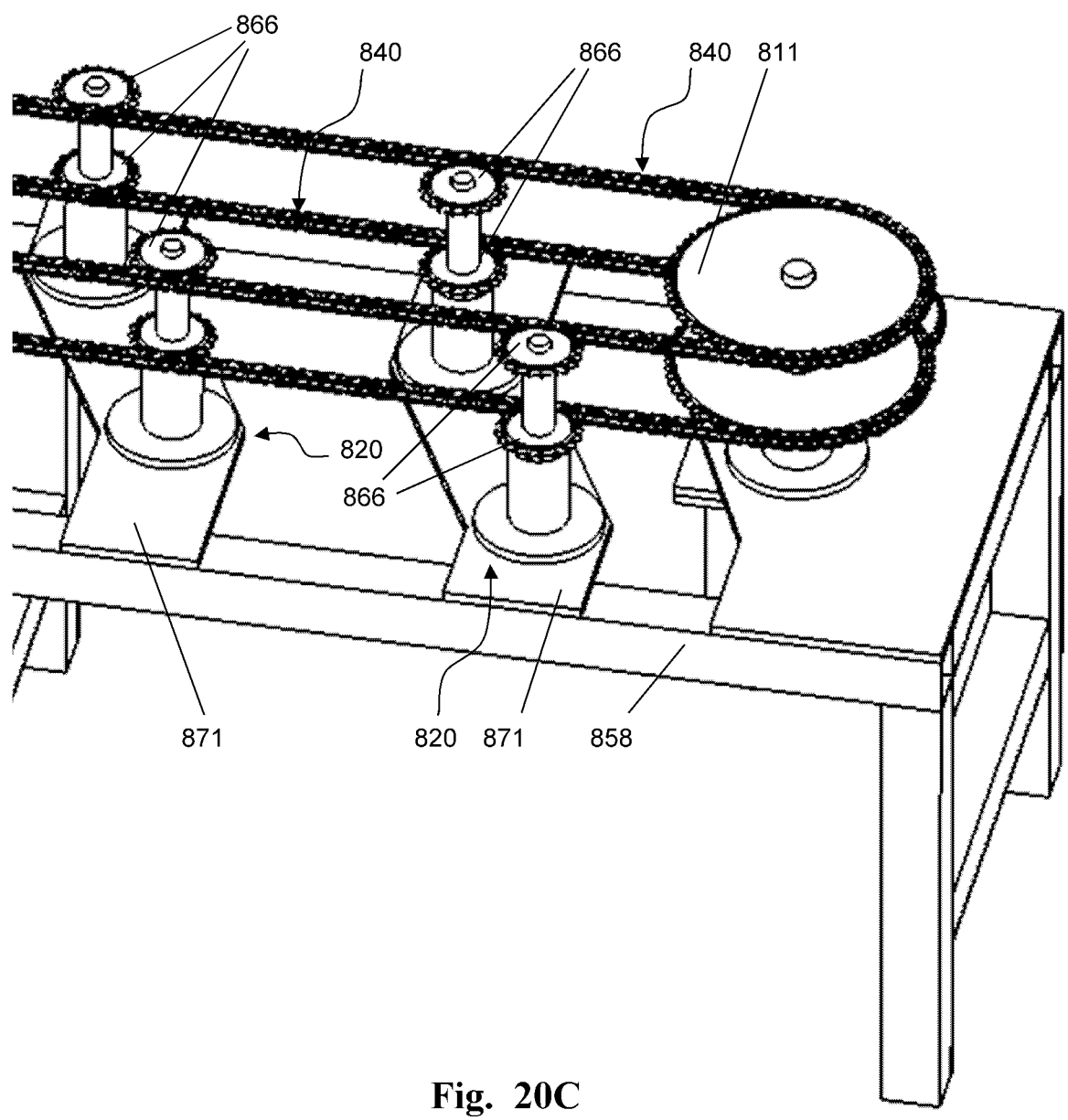
Figure 20D:
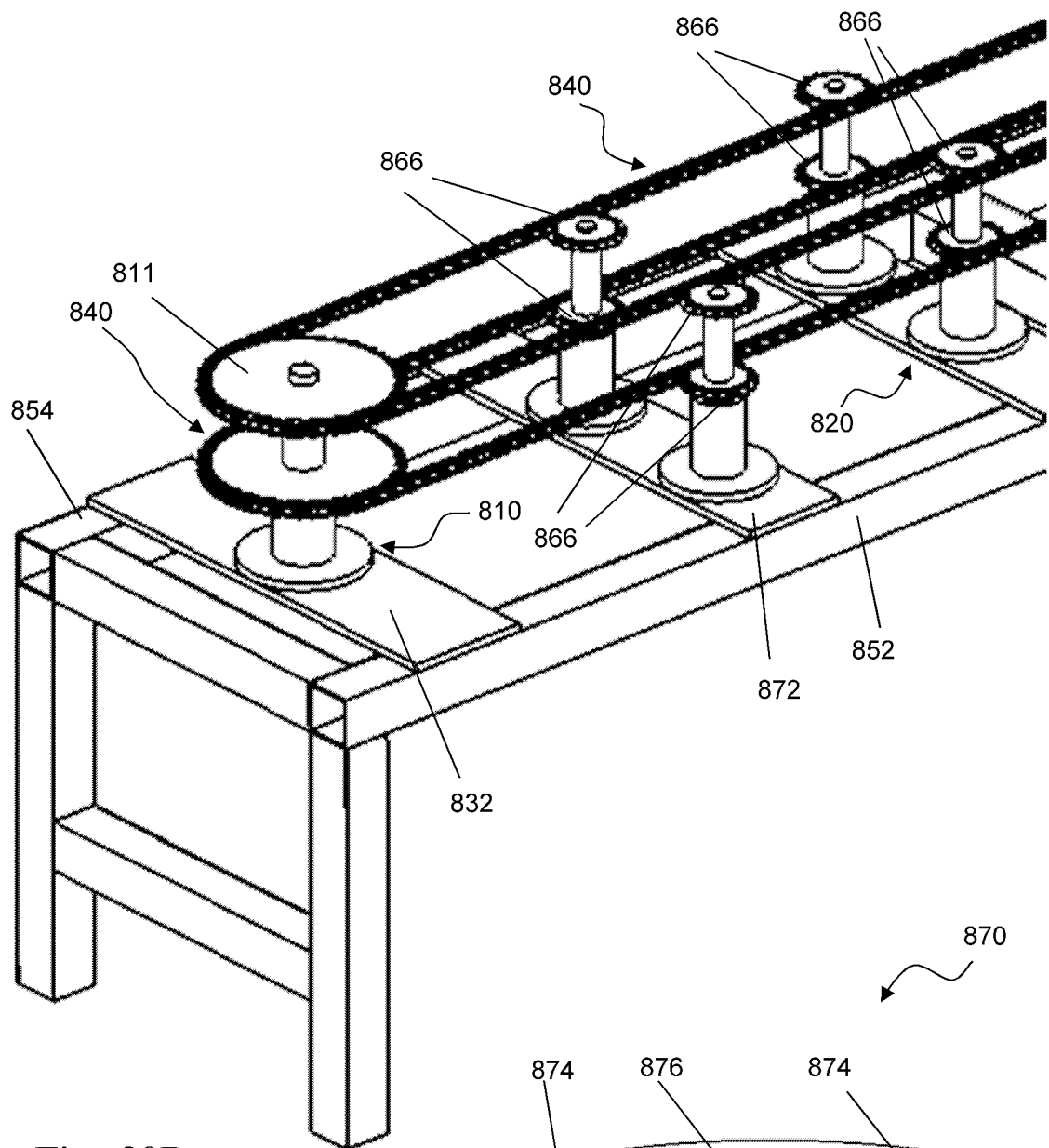

Referring to FIGS. 19A-19C, a chain wheel mechanism 806 comprises the chain wheel sub-mechanism 805, a plurality of chain wheel sub-mechanisms 820, and a plurality of flat connecting components 871 and 872. The flat connecting components 871 and 872 are rigidly connected with the support frame 804 in the chain wheel sub-mechanism 805. The rigid component 869 of each chain wheel sub-mechanism 820 is configured to be rigidly connected with a flat connecting component 871 or 872 (see FIGS. 19A-19B). The axes of the shafts 865 of the chain wheel sub-mechanisms 820 are configured to be vertical, and the top surface of the flat connecting components 871 and 872 are configured to be horizontal. The upper chain wheels 866 of all the chain wheel sub-mechanisms 820 are configured to be positioned at the same height as the upper chain wheels 811 of the chain wheel sub-mechanism 805. Similarly, the lower chain wheels 866 of all the chain wheel sub-mechanisms 820 are configured to be positioned at the same height as the lower chain wheels 811 in the chain wheel sub-mechanism 805.

Referring to FIGS. 20A-20D, a chain transport apparatus 808 comprises the chain wheel mechanism 806, and a chain mechanism comprising a pair of chains 840 which are configured to be parallel to each other. One of the chains 840 of the chain transport apparatus 808 is configured to be positioned above the other. The upper chain 840 of the chain transport apparatus 808 is configured to be engaged with the upper chain wheels 811 and 866 in the chain wheel mechanism 806. Similarly, the lower chain 840 of the chain transport apparatus 808 is configured to be engaged with the lower chain wheels 811 and 866 in the chain wheel mechanism 806 (see FIGS. 20C-20D). The pair of chains 840 are configured to be moved synchronously by the chain driving mechanism 801 of the chain wheel mechanism 806. The pair of chains 840 are configured to be moved cyclically (see FIG. 20A).

It should be noted that a pair of tension chain wheels may be added to the chain transport apparatus 808, as to stretch the chains 840, using known techniques.

Figure 21:
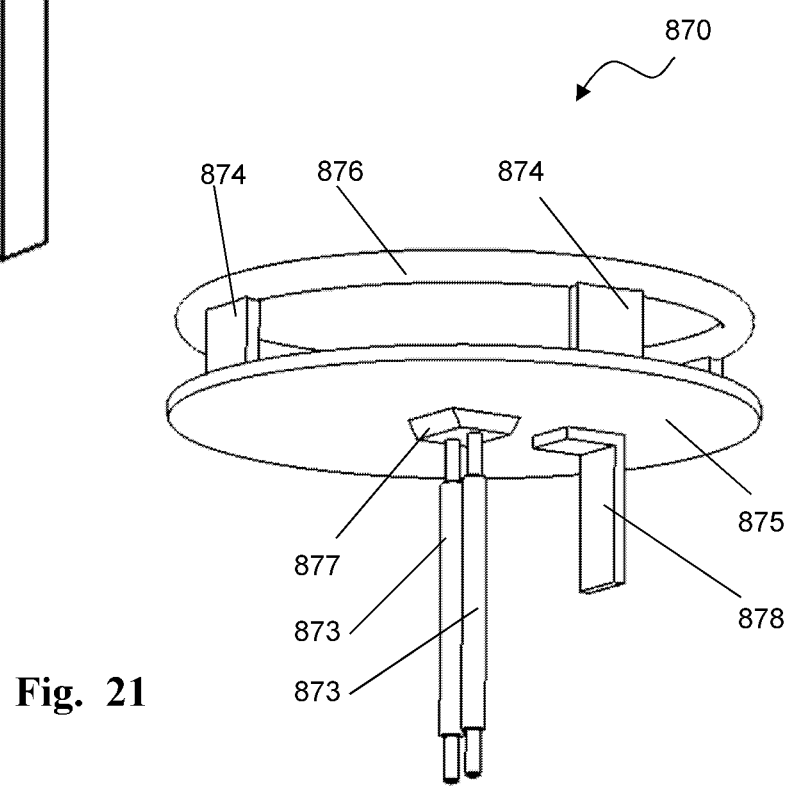
FIG. 21 shows an aerial view of a container holding device.

Referring to FIG. 21, a container holding device 870 comprising a round board 875, a ring 876 and some connectors 874, wherein the connectors 874 are configured to rigidly connect the ring 876 and the round board 875. The axis of the ring 876 and the axis of the round board 875 are configured to be vertical and concentric. The axis of the round board is called the axis of the container holding device 870. The container holding device 870 also comprise a rigid component 877 which is rigidly attached to center of the bottom of the round board 875; two shafts 873 comprising vertical axis; and target 878 which is rigidly connected the round board 875. The two shafts 873 are both fixedly connected to the rigid component 877 and the axes of the two shafts are configured to be perpendicular to the bottom surface of the round board 875.

Figure 22A:
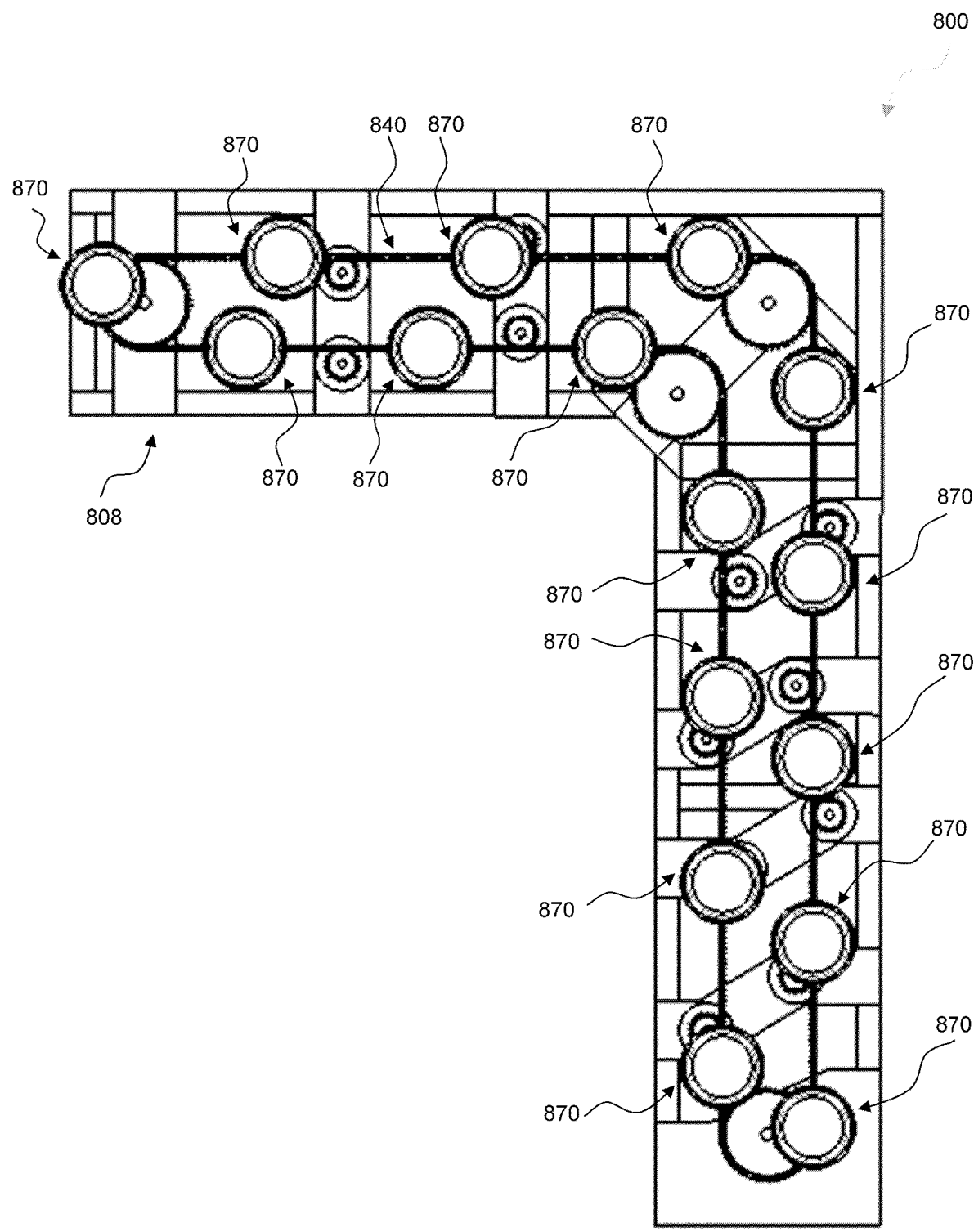
FIG. 22A shows a plane view of a food container transport apparatus.
Figure 22B:
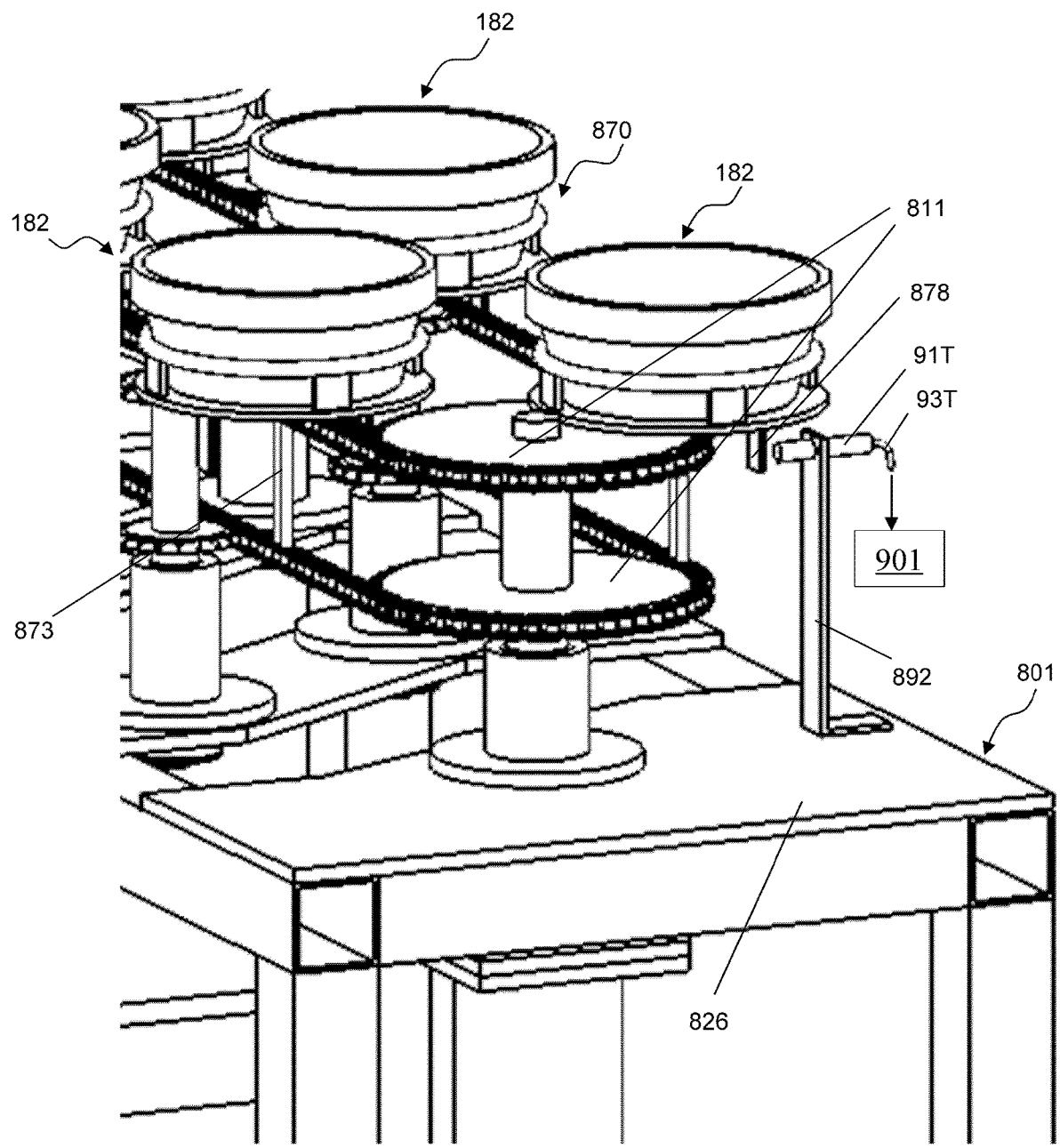
FIGS. 22B-22C shows aerial views of parts of the food container transport apparatus.
Figure 22C:
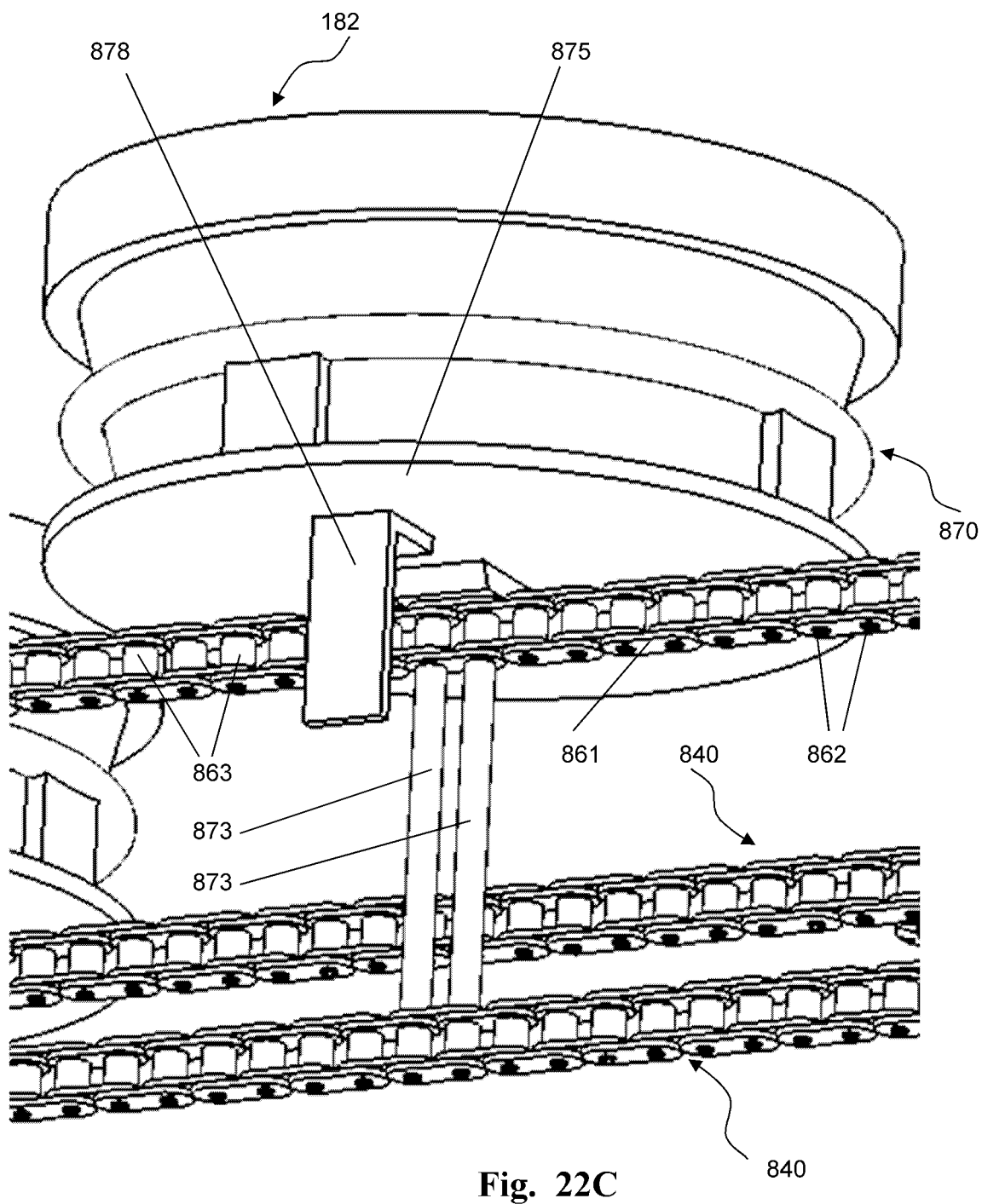

Referring to FIGS. 22A-22C, a food container transport apparatus 800 comprises the chain transport apparatus 808, and a plurality of container holding devices 870 each of which is configured to attach to the pair of chains 840 as follows. Each shaft 873 in each container holding device 870 is configured to substitute a pin in the upper chain 840 and a pin in the lower chain 840. In other words, each shaft 873 is inserted into two inner boards, two outer boards 861, a bushing, and a roller 863, of the upper chain 840; and similarly, each shaft 873 is inserted into two outer boards 861, two inner boards, a bushing, and a roller 863 of the lower chain 840. In particular, the radius of the shaft 873 in the end section is configured to be identical to the radius of a pin in the chain 840. The food container transport apparatus 800 also comprise a L-shaped rigid component 892 comprising a vertical board and a horizontal board; a proximity switch 91T comprising a horizontal detection direction (see FIG. 22B). The horizontal board of the L-shaped rigid component 892 is fixedly attached to the support component 826 of the chain driving mechanism 801. The proximity switch 91T is configured to be mounted on the vertical board of the L-shaped rigid component 892. As shown in FIG. 15C, the motor 92R is connected to the computer 901 via wires 94R. The computer 901 may be configured to dynamically control the timing and/or speed of the motor 92R. As shown in FIG. 22B, the proximity switch 91T is also connected to the computer 901 via wires 93T, so the computer 901 may receive electric or electronic signals from the proximity switch 91T. When a container holding device 870 is rotated by the motor 92R of the chain driving mechanism 801 to a position where the proximity switch 91T senses the target 878 of the container holding device 870, the chains 840 and the container holding device 870 may be stopped for time period during which either a food container 182 in another mechanism is moved and be placed one of the container holding device 870; or a food container 182 on one of the container holding device 870 is moved out of the container holding device 870, and placed on another mechanism by a transfer apparatus. After this period of time, the motor 92R, under the control of the computer 901, may restart as to move the container holder devices 870 so that the food containers 182 held on the container holding devices 870 of the food container transport apparatus 800 are moved intermittent by the chain wheel driving mechanism 801 of the food container transport apparatus 800. The distance traveled in any one period of an intermittent movement is the same.

It should be noted that the distance between the axis of a container holding device 870 and the axis of a neighboring container holding device 870 in the food container transport apparatus 800 may be configured to be the same, wherein the distance is measured along the chains (which may not be the same as straight line distance). It should be further noted that the chains 840 in the food container transport apparatus 800 may be configured to be moved intermittently, wherein the rotation produced by the motor 92R may be configured to be an intermittent rotation, wherein the distance traveled in one period of an intermittent movement of the chains 840 may be configured to be the same as the distance between the axis of the container holding device 870 and the axis of a neighboring container holding device 870, where the distances are measured along the chains.

Figure 23A:
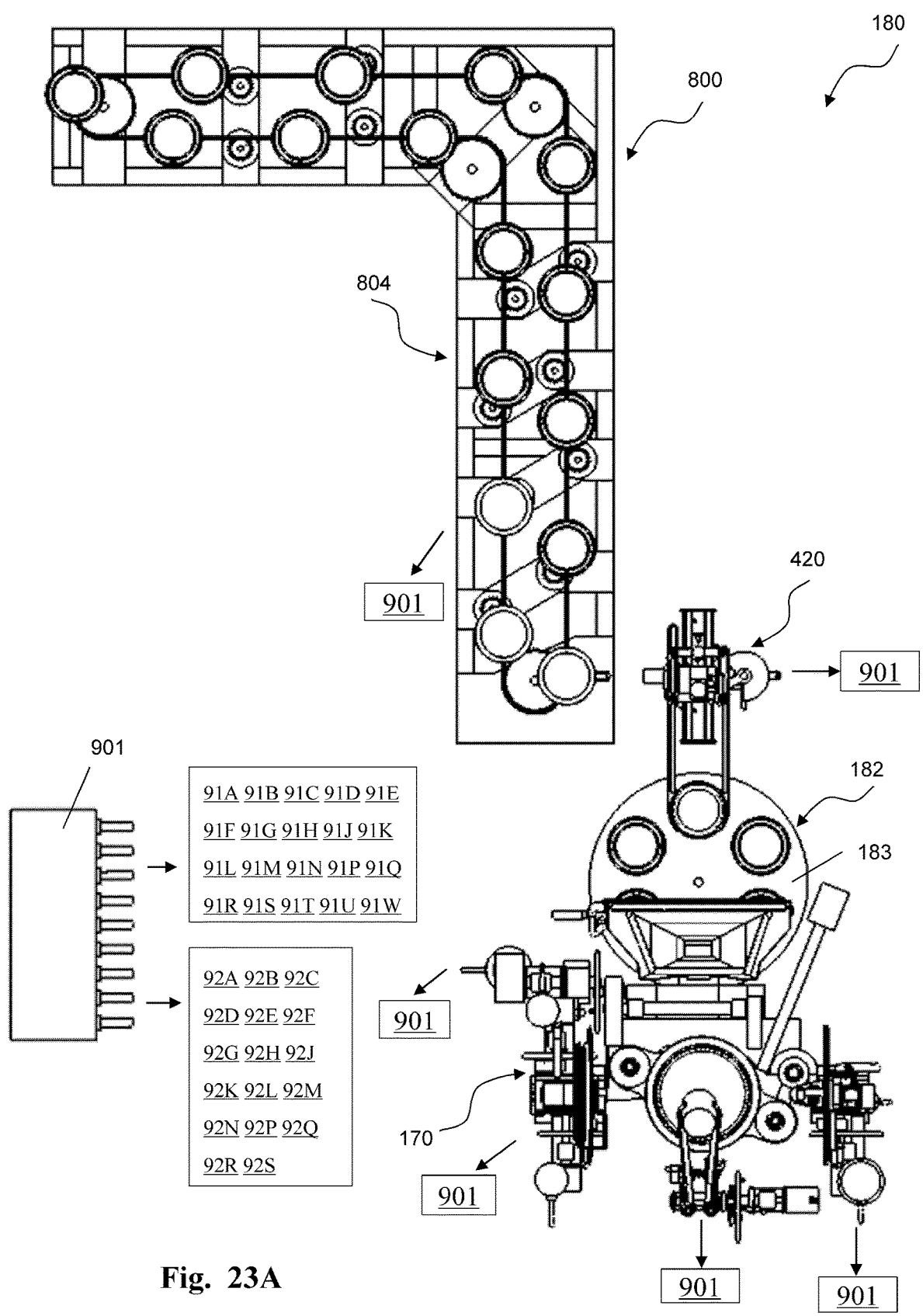
FIG. 23A shows a plane view of our cooking system.
Figure 23B:
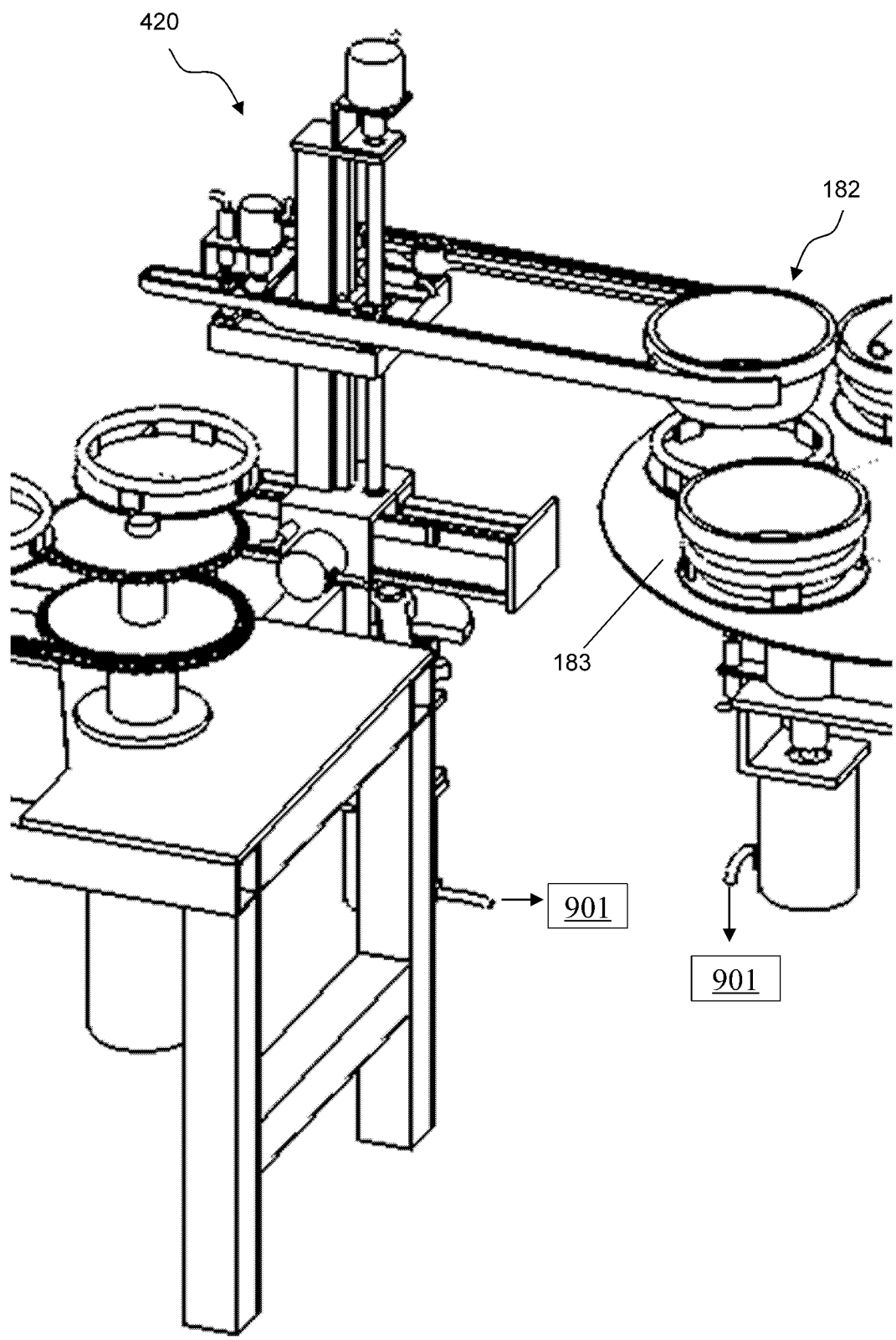
FIG. 23B shows an aerial view of parts of the cooking system.

In some embodiments, referring to FIGS. 23A-23B, a cooking system 180 comprises the cooking sub-system 170, the transfer apparatus 420 and the food container transport apparatus 800. The support frame 804 of the food container transport apparatus 800 and the rigid component 494 of the transport apparatus 420 are configured to be rigidly connected to the second support component 175 of the cooking sub-system 170 (the connections are not shown in figures but can be easily done; for example, the support frame 804, the rigid component 494 and the support component 175 may be fixedly connected to the ground).

As explained earlier, a cooked food in the cooking container 100 of the cooking system 180 may be unloaded into a food container 182 on the turntable 183 (through the funnel 181). The turntable 183 may be rotated as to move the food container 182 to a certain position, and the gripping mechanism 403 of the transfer apparatus 420 may be moved to grip the said food container 182, and then be transferred to a container holding device 870 in the food container transport apparatus 800. The food container transport apparatus 800 can then move the food containers 182 to an area accessible by another mechanism or by a human. Referring to FIG. 1, a computer 901 comprises a plurality of i/o ports. The i/o ports 901a can be connected to a plurality of electric or electronic devices, and to sensors. The computer 901 may send and receive electric or electronic signals to the connected electric or electronic devices and to sensors.

The cooking system 180 further comprises the computer 901 comprising a plurality of i/o ports (see FIG. 23A). The input ports of the computer 901 are connected via wires to the sensors 91A, 91B, 91C, 91D, 91E, 91F, 91G, 91H, 91J, 91K, 91L, 91M, 91N, 91P, 91Q, 91R, 91S, 91T, 91U, 91W, which are sensors in the various apparatuses of the cooking system 180. The output ports of the computer 901 are connected via wires to the electronic devices 92A, 92B, 92C, 92D, 92E, 92F, 92G, 92H, 92J, 92K, 92L, 92M, 92P, 92Q, 92R, 92S, which are electric components in the various apparatuses of the cooking system 180. In other words, the computer 901 is configured to control the functions of apparatus of the cooking system 180 as to cook a food by sending signals to the electric components. The computer 901 may control the electric components and may also record the electric or electronic signals of the sensors at designated times.

It should be noted that a LINUX (or other) server (or workstation) equipped with a MySQL (or other) database (and/or a web server with access to the database), may be used to communicate with and control the computer 901, The recipes may be stored in the database, and a new order may also be input into the database. A program in the server may read the database in every time interval (of duration of some milliseconds), and once a new order is read, the program then schedules the dishes in the order to be cooked at the plurality of cooking apparatus. The server then sends instructions (per recipes stored in the database) to microcontrollers which in turn control the various motors, and/or heaters, and/or other devices. On the other hand, the readings of sensors sent to the computer 901 may be further communicated to the server, and a program may monitor the information for any possible malfunction. In addition, the information may possibly be used in the control of the various devices as mentioned above.

It should be noted that to cook a food, a plurality of ingredient containers of food ingredients may be used. The ingredient containers may have different diametrical sizes.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

A rigid component described in the present patent application can be any type of solid component which has some degree of rigidity in an application, and there is no strict or quantitative requirement for the degree of rigidity. It should be noted that there is no perfect rigid component in our world, as there are always elastic, thermal, and other deformations in any physical subject. A rigid component may comprise one or more of the following: a bar, a tube, a beam, a plate, a board, a frame, a structure, a bearing housing, a shaft. A rigid component can be made by metal such as steel or aluminum, or a mixture of metals, an alloy, a reasonably rigid plastic, a wood, or by other materials, or by a combination of several types of materials.

Similarly, a rigid connection of two or more components can be a connection which has some degree of rigidity in an application, and there is no strict quantitative requirement for the degree of rigidity. A rigid connection may be a welding of two or more metal components. A rigid connection may be a bolting of two or more components; and so on. Clearly, a typical connection of a shaft and a bearing housing by a bearing (and accessories), for example, is not a rigid connection, since the shaft can rotate relative to the bearing housing.

A support component described in the present patent application can be a rigid component of any type, or a plurality of rigid components which are rigidly connected to each other. A support component may be moved or fixed relative to the ground. A link described in the present patent application can be a rigid component of any shape, or a plurality of rigid components which are rigidly connected to each other.

Most common bearings are ball bearings and roller bearings. However, a bearing in the present patent application can be of any type.

Only a few examples and implementations are described. Other implementations, variations, modifications and enhancements to the described examples and implementations may be made without deviating from the spirit of the present invention. For example, the term cooking container is used to generally refer to a device for containing or holding food ingredients during cooking. For the purpose of present patent application, a cooking container can be a wok, a pot, a pan, a cookware, a bowl, a container, a board, a rack, a net, etc. The cooking also is not limited to any particular ethnic styles. The cooking may include but is not limited to: frying (including stir frying), steaming, boiling, roasting, braking, smoking, microwaving, etc. The cooking apparatus may or may not use a heater.

What is claimed is:

1. A cooking system comprising:
  a computer;
  a cooking apparatus comprising:
    a cooking container;
    a stirring motion mechanism comprising a first support component and a motor, wherein the motor is configured to be connected to the computer;
    an unloading mechanism comprising a second support component and a motor wherein the motor is configured to be connected to the computer, said unloading mechanism being configured to produce a motion in the first support component between a first position and a second position relative to the second support component, wherein the unloading mechanism is configured so that a cooked food held in the cooking container is dispensed into a food container when the said first support component is moved by the unloading mechanism from the first position to the second position relative to the said second support component; and
    a braking mechanism configured to brake the motion of the first support component relative to the said second support component when the first support component is moved to the first position relative to the second support component;
    wherein the cooking container is configured to hold food or food ingredients for cooking when the first support component is at the first position relative to the second support component;
    wherein the stirring motion mechanism is configured to produce a motion in the cooking container relative to the first support component, as to stir, mix or distribute the food or food ingredients contained in the cooking container, when the first support component is at the first position relative to the second support component;
a plurality of ingredient containers, each configured to store food ingredients; and
a dispensing apparatus configured to move a said ingredient container as to dispense the food ingredients in the ingredient container to the cooking container, said dispensing apparatus comprising:
a gripping mechanism comprising a support component, said gripping mechanism being configured to grip a said ingredient container, wherein said gripping mechanism is configured to be connected to the computer; and
a motion mechanism comprising a motor, said motion mechanism being configured to move the support component of the gripping mechanism, wherein said motor is configured to be connected to the computer.

2. The cooking system of claim 1, further comprising a transfer apparatus, wherein said transfer apparatus comprises:
a gripping mechanism comprising a first support component, said gripping mechanism being configured to grip and hold a food container;
a first motion mechanism comprising a second support component, said first motion mechanism being configured to produce a vertical linear motion in the first support component of the gripping mechanism relative to the said second support component.

3. The cooking system of claim 2, wherein the transfer apparatus further comprises a second motion mechanism comprising a third support component, said second motion mechanism being configured to produce a horizontal motion in the second support component of the first motion mechanism relative to said third support component.

4. The cooking system of claim 1, further comprising:
a plurality of container holders, each configured to hold a food container;
a chain mechanism comprising a pair of chains, wherein said chains are configured to be positioned parallel to each other;
a motion mechanism comprising a motor, said motion mechanism being configured to produce a synchronous motion in the pair of chains of the chain mechanism;
wherein each container holder is connected to the pair of chains;
wherein the container holders are configured to move with the pair of chains.

5. The cooking system of claim 1, further comprising a lid apparatus comprising:
a blocking device comprising a ring-shaped component;
a first motion mechanism comprising a motor, said first motion mechanism being configured to produce a back-and-forth motion in the blocking device between a first position and a second position relative to the second support component of the cooking apparatus;
wherein the blocking device is configured to not interfere with the cooking container.

6. The cooking system of claim 5, wherein the lid apparatus further comprises:
a cover;
a second motion mechanism comprising a motor, said second motion mechanism being configured to produce a back-and-forth motion in the cover between a first position and a second position relative to the second support component of the cooking apparatus;
wherein the blocking device of the lid apparatus when stopped at the first position relative to the second support component of the cooking apparatus, and the cover of the lid apparatus when stopped at the first position relative to the second support component of the cooking apparatus, are configured to help prevent the food or food ingredients held in the cooking container from escaping from the cooking container during the time periods when the cooking container in the cooking apparatus is moved by the stirring motion mechanism relative to the first support component of the cooking apparatus, and when the first support component of the cooking apparatus is braked at the first position relative to the second support component of the cooking apparatus.

7. The cooking system of claim 1, wherein the motion mechanism of the dispensing apparatus comprises a motion sub-mechanism comprising a motor, said motion sub-mechanism being configured to produce a two-way motion in the support component of the gripping mechanism between a first position and a second position, so that the food ingredients stored in an ingredient container can be dropped out into the cooking container when the ingredient container is gripped by the gripping mechanism and when the support component of the gripping mechanism is moved by the said motion mechanism from the first position to the second position.

8. The cooking system of claim 7, wherein said motion sub-mechanism of is configured to produce a rotation in the support component of the gripping mechanism, wherein the axis of the rotational motion is configured to be horizontal.

9. The cooking system of claim 1, wherein the braking mechanism of the cooking apparatus comprises an electric device.

10. The cooking system of claim 1, further comprising a cleaning apparatus configured to clean the cooking container when the first support component of the cooking apparatus is braked at the first position relative to the second support component of the cooking apparatus, wherein the cleaning apparatus comprises:
a waterproof component;
a first motion mechanism comprising a support component and a first motor, said first motion mechanism being configured to produce a continuous rotational motion in the waterproof component relative to the said support component;
a second motion mechanism comprising a second motor, said second motion mechanism being configured to produce a two-way motion in the support component of the first motion mechanism.

11. A cooking system comprising:
a computer;
one or more food containers, each configured to hold a cooked food;
a transfer apparatus configured to move a food container, said transfer apparatus comprising:
a gripping mechanism comprising a first support component, said gripping mechanism being configured to grip and hold a food container;
a first motion mechanism comprising a second support component and a motor, said first motion mechanism being configured to produce a motion in the first support component relative to the second support component, wherein the said motor is configured to be connected to the computer;
a second motion mechanism comprising a third support component and a motor, said second motion mechanism being configured to produce a motion in the second support component relative to the third support component, wherein the said motor is configured to be connected to the computer; and a cooking apparatus comprising:
- a cooking container configured to hold food or food ingredients for cooking;
- a stirring motion mechanism configured to produce an oscillatory motion in the cooking container as to stir, mix or distribute food or food ingredients contained in the cooking container, said motion mechanism comprising a motor, wherein the said motor is configured to be connected to the computer;
- an unloading mechanism comprising a motor, said unloading mechanism being configured to move the cooking container as to unload a cooked food from the cooking container into a food container in the receiving apparatus, said motor being configured to be connected to the computer.

12. The cooking system of claim 11, wherein the first motion mechanism is configured to produce a vertical linear motion in the said first support component relative to the said second support component.

13. The cooking system of claim 12, wherein the second motion mechanism is configured to produce a horizontal motion in the said second support component relative to the said third support component.

14. The cooking system of claim 11, further comprising one or more container holders, each configured to position a food container.

15. The cooking system of claim 14, further comprising a receiving apparatus, wherein the receiving apparatus comprises:
- a plurality of container holders, each configured to position a food container;
- a cyclic transport mechanism configured to move the plurality of container holders, said cyclic transport mechanism comprising a motor wherein the motor is configured to be connected to the computer.

16. The cooking system of claim 15, wherein the receiving apparatus further comprises a water passage, wherein the cyclic transport mechanism is configured to move the water passage.

17. The cooking system of claim 15, wherein the receiving apparatus further comprises:
- a funnel;
- a water spray mechanism comprising water pipes and a water source, said water spray mechanism being configured to spray water on the funnel.

18. The cooking system of claim 11, wherein the unloading mechanism of the cooking apparatus is configured to produce a back-and-forth motion in the first support component of the cooking apparatus between the first position and the second position relative to the second support component of the cooking apparatus.

19. The cooking system of claim 18, wherein the unloading mechanism of the cooking apparatus is configured to produce a rotational motion in the first support component of the cooking apparatus between the first position and the second position relative to the second support component of the cooking apparatus.

20. The cooking system of claim 11, wherein the stirring motion mechanism comprises ball bearings.

21. A cooking system comprising:
a computer;
a cooking apparatus comprising:
- a cooking device comprising:
  - a cooking container comprising an upright position, wherein the cooking container is configured to be able to hold food or food ingredients when the cooking container is in the upright position,
  - a connection part configured to be rigidly connected to the cooking container, the said connection part comprising a flat surface which is horizontal when the cooking container is in the upright position;
- a stirring motion mechanism comprising:
  - a first support component;
  - a connection part;
  - a motor configured to be connected to the computer;
wherein the connection part of the stirring mechanism comprises a flat surface, the said connection part being configured to be bolted to the connection part of the cooking device;
wherein the stirring motion mechanism is configured to produce a motion in the cooking container as to stir, mix or distribute the food or food ingredients contained in the cooking container.

22. The cooking system of claim 21, further comprising:
- a plurality of ingredient containers, each configured to store food ingredients; and
- a dispensing apparatus configured to move an ingredient container as to unload the food ingredients contained in the ingredient container.

23. The cooking system of claim 21, further comprising one or more food container, each configured to hold a cooked food.

* * * * *